(12) United States Patent
Goetzinger, Jr. et al.

(10) Patent No.: US 10,181,218 B1
(45) Date of Patent: Jan. 15, 2019

(54) VIRTUAL AFFORDANCE SALES TOOL

(71) Applicant: STEELCASE INC., Grand Rapids, MI (US)

(72) Inventors: Stephen E. Goetzinger, Jr., Byron Center, MI (US); Kyle R. Dhyne, Grand Rapids, MI (US)

(73) Assignee: STEELCASE INC., Grand Rapids, MI (US)

( * ) Notice: Subject to any disclaimer, the term of this patent is extended or adjusted under 35 U.S.C. 154(b) by 5 days.

(21) Appl. No.: 15/427,513

(22) Filed: Feb. 8, 2017

Related U.S. Application Data

(60) Provisional application No. 62/296,399, filed on Feb. 17, 2016.

(51) Int. Cl.
*G09G 5/00* (2006.01)
*G06T 19/00* (2011.01)
(Continued)

(52) U.S. Cl.
CPC .......... *G06T 19/003* (2013.01); *G06F 3/0482* (2013.01); *G06F 3/0486* (2013.01);
(Continued)

(58) Field of Classification Search
CPC .............. G06F 3/04815; G06F 3/0482; G06F 3/04847; G06F 3/0486; G06F 3/0488; G06T 1/20; G06T 1/60; G06T 15/40; G06T 15/405; G06T 2210/04; G06T 2200/24; G06T 19/20; G06Q 30/0643
See application file for complete search history.

(56) References Cited

U.S. PATENT DOCUMENTS

| 5,111,392 A | 5/1992 | Malin |
| 5,293,479 A | 3/1994 | Quintero et al. |

(Continued)

FOREIGN PATENT DOCUMENTS

| EP | 1189174 A3 | 11/2002 |
| WO | 9631047 A2 | 10/1996 |

(Continued)

OTHER PUBLICATIONS

Tang, et al., Display and Presence Disparity in Mixed Presence Groupware, In Proceedings of the Fifth Conference on Australasian User Interface, vol. 28, pp. 73-82, Australian Computer Society, Inc., 2004.

(Continued)

*Primary Examiner* — Robert Craddock
(74) *Attorney, Agent, or Firm* — Quarles & Brady LLP

(57) ABSTRACT

A system and method for modeling visual and non-visual experiential characteristics of a work space environment, the system comprising at least a first emissive surface useable to view a virtual world (VW) representation, a processor that is programmed to perform the steps of (a) presenting a VW representation via the at least a first emissive surface, the VW representation including an affordance configuration shown in the VW representation, (b) model at least one non-visual experiential characteristic associated with an environment associated with the VW representation and (c) present at least some indication of the non-visual experiential characteristic to the system user.

21 Claims, 51 Drawing Sheets

(51) Int. Cl.
*G06F 3/14* (2006.01)
*G06T 19/20* (2011.01)
*G06F 3/0482* (2013.01)
*G06F 3/0484* (2013.01)
*G06F 3/0481* (2013.01)
*G06F 3/0488* (2013.01)
*G06F 3/0486* (2013.01)
*G06Q 30/06* (2012.01)

(52) U.S. Cl.
CPC ........ *G06F 3/0488* (2013.01); *G06F 3/04815* (2013.01); *G06F 3/04847* (2013.01); *G06F 3/1446* (2013.01); *G06Q 30/0643* (2013.01); *G06T 19/20* (2013.01); *G06T 2200/24* (2013.01); *G06T 2210/04* (2013.01)

(56) References Cited

U.S. PATENT DOCUMENTS

| | | |
|---|---|---|
| 5,396,583 A | 3/1995 | Chen et al. |
| 5,442,733 A | 8/1995 | Kaufman et al. |
| 5,847,971 A | 12/1998 | Ladner et al. |
| 5,850,352 A | 12/1998 | Moezzi et al. |
| 5,929,861 A | 7/1999 | Small |
| 6,002,855 A | 12/1999 | Ladner et al. |
| 6,052,669 A | 4/2000 | Smith et al. |
| 6,198,852 B1 | 3/2001 | Anandan et al. |
| 6,271,842 B1 | 8/2001 | Bardon et al. |
| 6,522,312 B2 | 2/2003 | Ohshima et al. |
| 6,545,700 B1 | 4/2003 | Monroe |
| 6,813,610 B1 | 11/2004 | Bienias |
| 6,879,946 B2 | 4/2005 | Rong et al. |
| 7,062,722 B1 | 6/2006 | Carlin et al. |
| 7,080,096 B1 | 7/2006 | Imamura |
| 7,246,044 B2 | 7/2007 | Imamura et al. |
| 7,249,005 B2 | 7/2007 | Loberg |
| 7,277,572 B2 | 10/2007 | MacInnes et al. |
| 7,277,830 B2 | 10/2007 | Loberg |
| 7,301,547 B2 | 11/2007 | Martins et al. |
| 7,523,411 B2 | 4/2009 | Carlin |
| 7,567,844 B2 | 7/2009 | Thomas et al. |
| 7,680,694 B2 | 3/2010 | Glazer et al. |
| 7,886,980 B2 | 2/2011 | Nishimura et al. |
| 7,908,296 B2 | 3/2011 | Loberg |
| 8,065,623 B2 | 11/2011 | Bohlman |
| 8,069,095 B2 | 11/2011 | Glazer et al. |
| 8,321,797 B2 | 11/2012 | Perkins |
| 8,326,704 B2 | 12/2012 | Glazer et al. |
| 8,339,364 B2 | 12/2012 | Takeda et al. |
| 8,400,490 B2 | 3/2013 | Apostolopoulos et al. |
| 8,493,386 B2 | 7/2013 | Burch et al. |
| 8,510,672 B2 | 8/2013 | Loberg |
| 8,522,330 B2 | 8/2013 | Shuster et al. |
| 8,611,594 B2 | 12/2013 | Devine et al. |
| 8,654,120 B2 | 2/2014 | Beaver, III et al. |
| 8,671,142 B2 | 3/2014 | Shuster et al. |
| 8,751,950 B2 | 6/2014 | Loberg |
| 8,762,877 B2 | 6/2014 | Loberg et al. |
| 8,762,941 B2 | 6/2014 | Loberg |
| 8,797,327 B2 | 8/2014 | Finn et al. |
| 8,947,427 B2 | 2/2015 | Shuster et al. |
| 9,053,196 B2 | 6/2015 | Ratzlaff et al. |
| 9,087,399 B2 | 7/2015 | Shuster et al. |
| 9,110,512 B2 | 8/2015 | Exner |
| 9,189,571 B2 | 11/2015 | Loberg |
| 9,245,064 B2 | 1/2016 | Loberg |
| 9,245,381 B2 | 1/2016 | Howell |
| 9,852,388 B1 | 12/2017 | Swieter et al. |
| 9,911,232 B2 * | 3/2018 | Shapira ................. G06T 19/006 |
| 9,955,318 B1 | 4/2018 | Scheper et al. |
| 9,983,684 B2 * | 5/2018 | Wang ..................... G06F 3/017 |
| 2002/0065635 A1 | 5/2002 | Lei et al. |
| 2003/0067536 A1 | 4/2003 | Boulanger et al. |
| 2004/0113945 A1 | 6/2004 | Park et al. |
| 2004/0259554 A1 | 12/2004 | Rappaport et al. |
| 2005/0253840 A1 | 11/2005 | Kwon |
| 2006/0210045 A1 | 9/2006 | Valliath et al. |
| 2007/0118420 A1* | 5/2007 | Jung ....................... G06Q 20/06 705/14.12 |
| 2007/0156540 A1 | 7/2007 | Koren et al. |
| 2007/0190496 A1 | 8/2007 | Lamb |
| 2008/0231926 A1 | 9/2008 | Klug et al. |
| 2008/0263446 A1 | 10/2008 | Altberg et al. |
| 2009/0049081 A1 | 2/2009 | Loberg |
| 2009/0161963 A1 | 6/2009 | Uusitalo et al. |
| 2010/0268513 A1 | 10/2010 | Loberg |
| 2010/0306681 A1 | 12/2010 | Loberg et al. |
| 2011/0191706 A1 | 8/2011 | Loberg |
| 2011/0285704 A1 | 11/2011 | Takeda et al. |
| 2012/0046768 A1 | 2/2012 | Raoufi |
| 2012/0249591 A1 | 10/2012 | Maciocci et al. |
| 2012/0268463 A1 | 10/2012 | Loberg |
| 2013/0083173 A1 | 4/2013 | Geisner et al. |
| 2013/0297409 A1 | 11/2013 | Jones et al. |
| 2013/0307842 A1 | 11/2013 | Grinberg et al. |
| 2013/0339074 A1 | 12/2013 | Nagy et al. |
| 2014/0132595 A1 | 5/2014 | Boulanger et al. |
| 2014/0214368 A1 | 7/2014 | Loberg |
| 2014/0222916 A1 | 8/2014 | Foley et al. |
| 2014/0223334 A1 | 8/2014 | Jensen et al. |
| 2014/0267411 A1* | 9/2014 | Fein ....................... G06T 11/00 345/633 |
| 2014/0362075 A1 | 12/2014 | Howell |
| 2015/0062122 A1 | 3/2015 | Takeda et al. |
| 2015/0113581 A1 | 4/2015 | McArdle et al. |
| 2015/0170256 A1 | 6/2015 | Pettyjohn et al. |
| 2015/0242179 A1 | 8/2015 | Benson et al. |
| 2015/0302116 A1 | 10/2015 | Howell |
| 2015/0309705 A1 | 10/2015 | Keeler et al. |
| 2015/0317410 A1 | 11/2015 | Blodgett |
| 2015/0325035 A1 | 11/2015 | Howell |
| 2015/0332496 A1 | 11/2015 | Howell |
| 2015/0356774 A1 | 12/2015 | Gal et al. |
| 2016/0026253 A1 | 1/2016 | Bradski et al. |
| 2016/0110916 A1 | 4/2016 | Eikhoff |
| 2016/0140930 A1 | 5/2016 | Pusch et al. |
| 2016/0180602 A1 | 6/2016 | Fuchs |
| 2016/0217323 A1* | 7/2016 | Takeuchi ............ G06K 9/00342 |
| 2016/0291922 A1 | 10/2016 | Montgomerie et al. |
| 2016/0292925 A1 | 10/2016 | Montgomerie et al. |
| 2018/0060041 A1 | 3/2018 | Williams et al. |

FOREIGN PATENT DOCUMENTS

| | | |
|---|---|---|
| WO | 0131397 A1 | 5/2001 |
| WO | 03026299 A1 | 3/2003 |
| WO | 2004062257 A2 | 7/2004 |
| WO | 2007093060 A1 | 8/2007 |
| WO | 2009100538 A1 | 8/2009 |
| WO | 2009100542 A1 | 8/2009 |
| WO | 2009111885 A1 | 9/2009 |
| WO | 2011066452 A2 | 6/2011 |
| WO | 2012109368 A1 | 8/2012 |
| WO | 2014191828 A1 | 12/2014 |
| WO | 2014193415 A1 | 12/2014 |
| WO | 2015075705 A2 | 5/2015 |
| WO | 2015191112 A1 | 12/2015 |
| WO | 2016165016 A1 | 10/2016 |

OTHER PUBLICATIONS

Windows Mixed Reality Cliff House—YouTube, https://www.youtube.com/watch?v=TDc_ObWkK3g, 2017.

Holoportation: Virtual 3D Teleportation in Real-Time (Microsoft Research), YouTube, https://www.youtube.com/watch?v=7d59O6cfaM0, 2016.

Facebook Spaces Beta—Oculus, https://www.oculus.com/experiences/rift/1036793313023466/, Copyright 2018 Oculus VR, LLC.

Virtualitics, Explore the Power of AI + VR, https://www.virtualitics.com, Copyright 2018 Virtualitics, Inc.

VRGO—The VR Chair, http://www.vrgochair.comi, Copyright VRGO 2018.

(56) References Cited

OTHER PUBLICATIONS

Russell, Why Virtual Reality Will Be the Most Social Computing Platform Yet, https://a16z.com/2016/06/20/social-vr/, Jun. 2016, 10 pages.
Altspacevr Inc., Be There, Together, https://altvr.com/, Copyright 2018 Microsoft.

\* cited by examiner

P0001 Preferences

| Affordance | Instance | VW Location | VW Orientation | VW State | Affordance Attributes | Attribute Value |
|---|---|---|---|---|---|---|
| AF-0001 (Desk Type 1) | IN-0001 | X1, Y1 | 90 degrees | Lower Pos. | Top Finish - Modesty Screen - | Choc. Walnut NONE |
| | IN-0002 | X2, Y2 | 270 degrees | Upper Pos. | Top Finish- modesty Screen - | Choc. Walnut Yes |
| | ... | | | | | |
| | IN-0300 | X300, Y300 | 90 degrees | Lower Pos. | Top Finish - Modesty Screen - | Choc. Walnut NONE |
| AF0085 (Chair Type 2) | IN-0001 | X301, Y301 | 90 degrees | Lower Pos. | Fabric - Base - Adjust Arms | Teal Leather Crome Yes |
| | IN-0002 | X302, Y302 | ... | | | |
| ... | | | | | | |
| AF-0154 | | | | | | |

VIRTUAL AFFORDANCE SALES TOOL

CROSS-REFERENCE TO RELATED APPLICATIONS

This application claims priority to U.S. provisional application Ser. No. 62/296,399 which was filed on Feb. 17, 2016 and which is titled "Virtual Affordance Sales Tool".

FIELD OF THE DISCLOSURE

The field of the disclosure is virtual sales tools and more specifically virtual sales tools that enable users to modify and experience virtual office space including many different types of affordances so that users have a realistic sense of how affordances affect employee experiences.

BACKGROUND OF THE DISCLOSURE

Most users thinking about purchasing a product like to experience the product prior to purchase. This is especially true in the case of expensive products or products that a user will use often and over a long period of time. For instance, a vehicle is one relatively expensive product that many people use regularly and over a period of at least several years after purchase. When purchasing a new vehicle, most users still go to a car dealership to sit in several different vehicle locations (e.g., driver's seat, passenger's front seat, a rear seat, etc.) in different vehicles, feel the materials used to construct the vehicles and play with vehicle features. In many cases the most important consideration for a vehicle user may be how the vehicle performs when driven. For instance, when selecting a vehicle to purchase, many users consider vehicle quickness and speed, smoothness of ride, turning responsiveness, braking responsiveness, engine power and torque, blind spots when driving, engine noise, passenger compartment noise, etc. To test these vehicle characteristics, most vehicle users drive a vehicle in many different environments (e.g., on a highway, on side streets, etc.) prior to deciding on a type of vehicle to purchase.

Once a user has decided to purchase a specific vehicle type, the user selects a desired set of options which, like the vehicle itself, can often be experienced at a dealership as most auto dealers maintain an inventory of different vehicles with different option combinations. After an initial option combination is selected, a dealer can relatively quickly generate a price for a vehicle in inventory or for a vehicle that has to be ordered from a factory. Here, the user can tweak options to see the effect on cost and can ultimately make a decision to purchase a specific vehicle with a specific set of options.

The internet and other technical developments have made it possible to at least visualize different product options where those options cannot be seen in person at an vehicle dealer facility. For instance, in the case of shopping for a vehicle, almost all vehicle manufacturers now maintain websites where users can select vehicle options, materials and colors causing a software engine to render an image or view of a resulting vehicle. For instance, a user may select black leather for a seating material instead of black cloth causing the engine to generate interior vehicle images that show the black leather option. Thus, even if an auto dealer does not have vehicles with all of the options desired by a user, the user typically has at least some way to visually experience how an option value affects a final vehicle's appearance.

Individual office furniture products can typically be experienced in ways similar to a vehicle prior to purchase. To this end, office furniture dealers often maintain samples of most products manufactured by a supplier in inventory at a sales facility to show to perspective users. For instance, where a supplier manufactures five different types of task chairs, a dealer may have one instance of each of the five task chairs in inventory for users to sit in, adjust, feel and experience. To supplement the five chairs, the dealer may maintain an inventory of fabrics and finish samples for the chairs for users to view and feel. A similar sub-set of inventory may be maintained for desks, tables, side chairs, lounges, privacy screens, space dividing partial wall structures, electrical systems, lighting devices, collaboration products, full wall structures, floor structures, ceiling structures, etc. Manufacturers also supplement dealer inventories by providing images of typical office, workstation, conference and common area affordance configurations as well as software applications that allow users to see affordances with different option sets (e.g., material and finish colors, mechanical options (e.g., arms or no arms on a chair, a head rest or no head rest on a chair, etc.).

While some office furniture users purchase affordances on an item by item basis dictated by personal appearance, feel and functional preferences, many office furniture manufacturers and dealers as well as users have recognized that office affordances and systems can have many different profound and valuable effects on office activities if designed and installed in an overall optimized fashion. For instance, a well designed and appealing office space may operate as a branding tool for an enterprise facility to create a positive impression on both users and employees. As another instance, proper placement of refueling stations (e.g., coffee and refreshment stations or spaces) can have an advantageous effect on spontaneous collaboration between employees as employees encounter each other throughout a work day. As another instance, properly placed divider screens can increase employee sense of privacy and result in higher quality focused activity. As yet one other instance, locally available conference spaces or spaces specially configured to support telepresence activities can encourage a greater amount of collaboration between employees. As another instance, the amount of natural light in a workspace can have an advantageous effect on employee sense of well being.

Unfortunately, unlike a vehicle or a single piece of office furniture, there is no easy way to experience an entire enterprise space fitted out with an affordance set in a realistic way without actually manufacturing and installing a full set of affordances. As a simple example, assume that a user intends to provide 80 workspaces on a single floor of her office building along with two refueling stations, 2 large conference spaces and 4 small conference spaces as well as 6 telepresence spaces that are specially fitted out to facilitate telepresence conferencing with remote participants where the 80 spaces are divided among first, second and third departments to include 20 spaces, 25 spaces and 35 spaces, respectively. Here, after the user selects different affordances and options and specifies at least a tentative budget, an interior designer takes the user's requirements and a plan view (e.g. a blue print) of the enterprise space and uses basic rules of thumb to lay out affordances to meet the user's requirements. For instance, one rule of thumb may be that the refueling stations should be spaced apart and yet generally within a couple minutes walk from any workstation or office in the space. Another rule of thumb may be that a receptionist area or desk be near a front entry to the space. Other rules of thumb may require that workspaces for each department be located proximate each other, maximum travel time to a rest room from any workstation, maximum exposure to natural light, a minimum distance between adjacent workstations, etc.

In the above example, after a designer lays out affordances based on user requirements or preferences and general rules of thumb, the designer may be able to generate a top plan view of the enterprise space with affordances installed along with some space typical images including a perspective view of an exemplary executive's office, an exemplary manager's office, an exemplary workstation used by a general employee, an exemplary refueling station and exemplary perspective views of a large conference space, a small conference space and a telepresence space. In particularly sophisticated cases, an architect, often times with help from a software programmer, may also generate a video that simulates a virtual walk through the enterprise space so that a user can see a scripted perspective of the space design. For instance, the simulated video may present a point of view that travels by a receptionist's station, by several workstations, into an executive's office, and so on.

While the above described tools for a designed enterprise space can give a perspective user some sense of what an installed design may look like, the experience afforded by these tools is nowhere near realistic. For instance, none of the tools described above enables a user to sense a noise level at any location in the designed space. As another instance, none of the tools enables a user to experience how natural light subtends different affordances or workstations or offices in the space. As still one other instance, none of the tools enables a user to view the space and affordances from any locations off a scripted video path to experience, first hand, how affordances provide privacy to employees in different spaces or other space characteristics.

In many cases large office space and furniture manufacturers maintain their own facilities or even a campus of buildings where their products and services are staged to be seen and experienced by perspective users. Here, many different affordance settings including different materials, finishes and affordance combinations are staged so that users can experience many different arrangements and combinations. Unfortunately, most users cannot travel to a manufacturer's facility to experience staged affordance settings first hand and, even where a user can travel to a manufacturer's facility, the staged affordances cannot possibly represent all affordance settings and option combinations.

In addition, operating characteristics of an affordance setting are highly dependent on location and facility specific environmental parameters that vary appreciably from the parameters at a manufacturer's staged location. For instance, sound travel is greatly affected by the locations of structural walls at a user's facility that are almost always different than the wall locations at a manufacturer's facility. As another instance, window locations and configurations at a user's facility that directly affect the amount and pattern of natural light that enters a space are usually different than the window locations and configurations at a manufacturer's facility. For this reason, even where a user likes the operating characteristics of an affordance set at a manufacturer's facility, the operating characteristics cannot reflect characteristics of the same affordance set once installed at the user's facility.

Moreover, even if an affordance configuration can present an environment where a user can experience at least some space characteristics e.g., sound travel, light intensities, lines of sight, etc.), where the sources of those characteristics routinely change over time, an employee's perception of those characteristics in a contrived and controlled setting at a manufacturer's facility may not reflect reality and in fact may be misleading. To this end, in most real world environments sound volume within common spaces or travel paths through a space vary during the course of a day. For instance, in the morning when employees arrive at work and at lunch time, the number of sounds and sound volume within common and travel spaces are typically higher than at other times. For this reason, while a user may like sound characteristics while located at a real world affordance configuration within a manufacturer's facility at one time, if the user were to experience the same space during a high sound period, the user may be completely dissatisfied. Similar dissatisfaction can occur as a result of changing lighting, visual characteristics and other characteristics during the course of a typical day in any real world space.

In addition to not providing a realistic experience, none of the above described tools enables a user to easily change affordances or affordance options and see how those changes affect the visual appearance of the space, space operating characteristics (e.g., distribution of natural light, sound level, traffic patterns in the space, unscheduled collaboration, etc.), privacy, etc. As a simple example, where all task seating material in a space is initially teal and a user wants to view the space with brown material instead of teal, changing out the materials in the space is a complex and arduous process and, in known systems, may require input from or the expertise of a software programmer and/or a designer. Because the task is complex and coordination of the task would be time consuming, in most cases a user simply foregoes the process of generating new images or views or a new walk through video and instead relies on their imagination to develop a sense of how a color change may affect a space experience. Even where a user commences the process of generating tools to show the visual and other effects of a few changes, in most cases no user would waist her time or effort on generating tools to visualize more than a small number of affordance and option changes. In addition, in no case would changing appearance or options of affordances result in a system where a user's experience of a designed space approaches reality.

SUMMARY OF THE DISCLOSURE

It has been recognized that virtual world software engines ("VW engines") can be used to generate virtual representations of affordance arrangements within a virtual space so that office affordance users can experience a realistic representation of product configurations prior to actually purchasing and having those configurations installed in their facility spaces. Here, actual user preferences can be used to instantiate the virtual representations so that a user can see all affordances with all selected options in a personalized set in the virtual world substantially exactly as they would be provided in the real world thereafter if the user purchases those affordances. Thus, teal material would appear teal, dark cherry wood desk tops would appear dark cherry, the relative juxtapositions of first, second and third workstations and a large conference space with respect to each other in the virtual world would be identical to the relative juxtapositions of the workstations and conference space in the real installation, etc. A gaming engine may be employed to provide the virtual world software engine in at least some embodiments.

In addition, a VW engine may be programmed to allow a user to quickly change affordances selected for a configuration or to modify affordance options resulting in changes to the appearance of one or more affordances within the VW representation. For instance, a user may be able to change seat material color on a first task chair within a VW representation from brown to teal causing the first chair representation within the VW to be shown as teal thereafter unless subsequently modified by the user. As another instance, a user may be able to change all seat material colors within a VW at the same time from brown to teal to cause all chair seats in the VW to be shown as teal thereafter unless subsequently modified. As yet one other instance, where all task chairs in a configuration are of a first chair type, a user may be able to change all of the chairs out for a second chair type via a minimal sequence of commands or system activities.

In addition to enabling a user to see virtual configurations from a perspective or top plan view, the virtual world representation will allow a user or a sales representative to move about within the virtual world to many different locations to experience a virtual point of view from any assumed virtual positions within or about a virtual affordance configuration. Thus, for instance, where a virtual world engine presents an affordance configuration that includes 80 workstations arranged in specific juxtapositions within a virtual space and with respect to a high traffic path through the space, a user may be able to move about within the virtual space to any of the 80 workstations or to any other location within the virtual space and assume a standing or seated point of view at a station or other location to get a realistic sense of what it would be like to use the station or be at the location within the larger affordance configuration.

In addition to enabling a user to assume different viewpoints relative to a VW affordance configuration, the VW engine may also be configured to simulate other visual space characteristics. For instance, a VW engine may be controllable to simulate different lighting characteristics within an affordance configuration so that a user can obtain a visual sense of how different configurations affect light patterns. As another instance, where a virtual facility includes one or more exterior windows, the way natural light enters a window and is affected by virtual affordances within a presented configuration can be simulated.

In addition to simulating visual space characteristics, in some cases the VW engine may be configured to simulate non-visual space characteristics. For instance, a VW engine may simulate exemplary sounds within a VW and how different affordance sets affect sound travel within a VW at different VW locations (e.g., at different workstations within a VW representation). Thus, for instance, a VW engine may simulate typical sounds and sound volumes within a high volume travel path through a VW space which are affected by a user's location within a VW space such that the volume of the sounds is higher when a user is located at a first workstation near the travel path than when the user is located at a second station that is relatively remote from the path. Here, where a user modifies first workstation affordances to include additional privacy screens, the VW engine may automatically change the volume or other sound characteristics (e.g., filter high frequencies to simulate the effects of real world screens on sound).

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE DRAWINGS

FIG. 7 is an example of one of the affordance preference specifications that make up part of the database in FIG. 6;

FIG. 30 is an interface that may be presented via the top surface of the table shown in FIG. 23 of via any touch sensitive interface surface that enables a user to specify aspects of a real world space required for a server to generate a VW space layout that is at least similar to the real world space;

DETAILED DESCRIPTION OF THE DISCLOSURE

Figure 1:
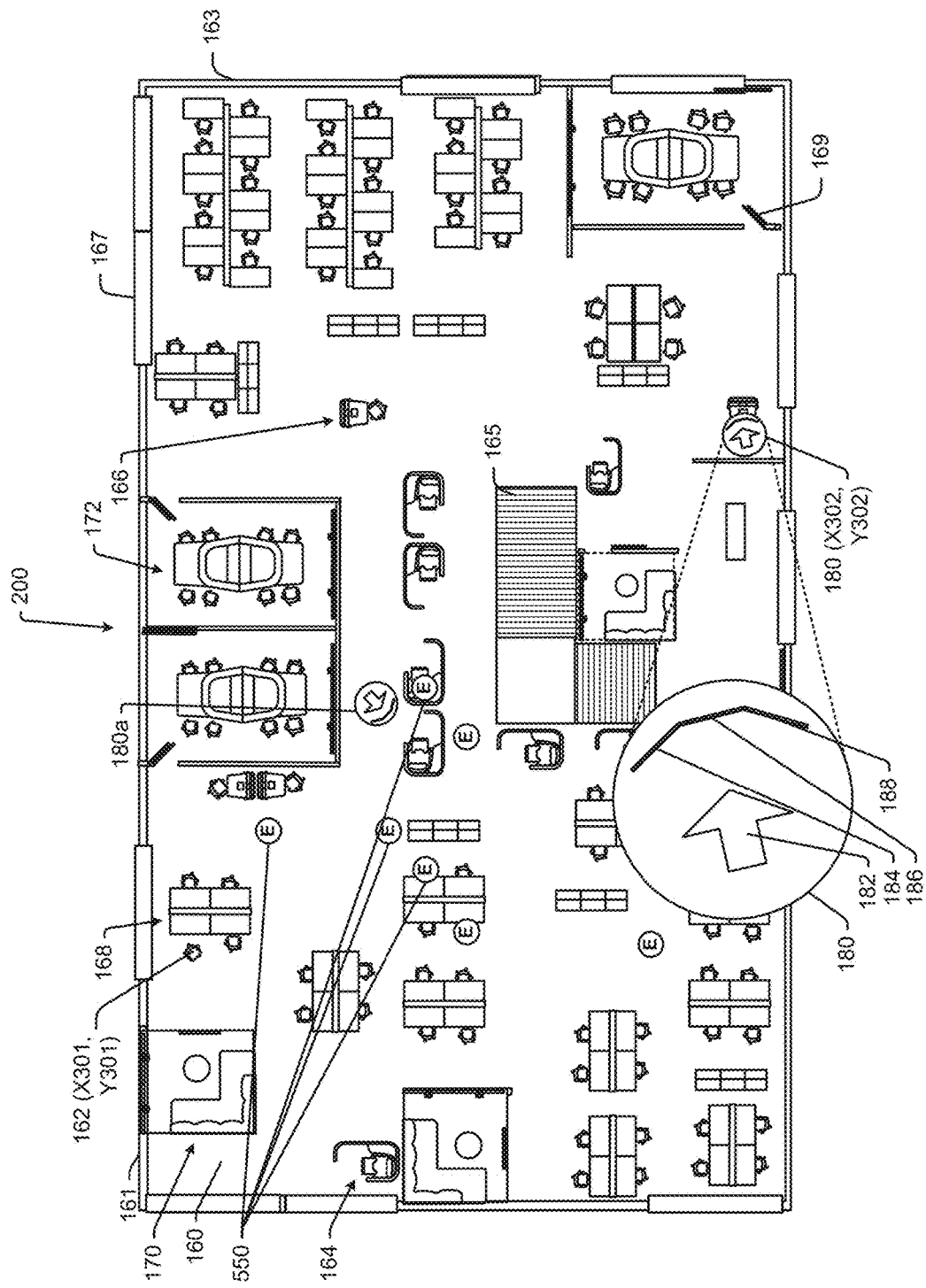
FIG. 1 is a top plan view of a virtual affordance configuration layout that is consistent with at least some aspects of the present disclosure.

In the following detailed description, reference is made to the accompanying drawings which form a part hereof, and in which is shown by way of illustration, specific embodiments in which the disclosure may be practiced. These embodiments are described in sufficient detail to enable those of ordinary skill in the art to practice the disclosure. It should be understood, however, that the detailed description and the specific examples, while indicating examples of embodiments of the disclosure, are given by way of illustration only and not by way of limitation. From this disclosure, various substitutions, modifications, additions rearrangements, or combinations thereof within the scope of the disclosure may be made and will become apparent to those of ordinary skill in the art.

In accordance with common practice, the various features and aspects illustrated in the drawings may not be drawn to scale. The illustrations presented herein are not meant to be actual views of any particular method, device, or system, interface, but are merely representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device), method or interface. In addition, like reference numerals may be used to denote like features throughout the specification and figures.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the disclosure may be implemented on any number of data signals including a single data signal.

The various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and acts are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments of the disclosure described herein.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on a computer-readable medium. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

For purposes of description herein, the terms "upper," "lower," "right," "left," "rear," "front," "vertical," "horizontal," and derivatives thereof shall relate to the orientation experienced as follows: 1) if referring to a virtual environment, then the terms shall be relative to the virtual view point; 2) if referring to a real-world environment, such as a user viewing one or more screens, then the terms shall be relative to the view point of the user. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise. Various elements of the embodiments disclosed herein may be described as being operably coupled to one another, which includes elements either directly or indirectly coupled to one another.

As used herein, the term "fixture" will be used to refer to generally permanent structures within a facility space. For instance, exemplary fixates may include wall structures, door members, windows, ceilings, permanently installed lights, stairs, etc.

The term "affordance" shall refer to a piece of equipment, furniture or structure located within a space and that typically is not permanently installed. Examples of affordances include, without limitation, chairs, desks, lighting fixtures, couches, lounges, beds, shelves, cabinets, chests, monitors, printers, area dividers (e.g., screens, installed non-permanent wall structures, whiteboards, projectors, display screens or emissive surfaces, etc.

The term "attribute" will be used to refer to a characteristic of an affordance or, in at least some cases, a fixture, that may be modified. For instance, a typical task chair may have several characteristics that can be changed to customize the chair within a range of possible attribute values. For example, there may be 100 different color and fabric or material options for a cover on a seat and a backrest of a first chair type where a user can select any of the 100 different options. As another example, there may be 50 different material and finish options for the top surface of a desk or a table type affordance.

The phrase "affordance configuration" or "configuration typical" will be used to refer to a combination of affordances that is grouped together and sold as an arrangement (e.g., a teleconference station including a table assembly, a privacy screen, a display screen, a camera, speakers and a task chair).

The phrase "virtual world representation" or "virtual world", also referred to as a "VW" in at least some cases, will be used to refer to a virtual representation of a facility space that includes at least one affordance and that typically includes one or more affordance sets and/or configuration typicals arranged within a virtual space, typically to simulate real world affordances and configuration typicals. In at least some cases a VW will also include virtual representations of fixtures that generally define a virtual space. Thus, for instance, in at least some cases a VW will include wall structure representations that virtually define a space in which affordances and configuration typicals are located. In addition to including visual representations of affordances and configuration typicals, in at least some cases a VW will include other affordance, configuration typical and fixture characteristics such as, for instance, a light transmission characteristic indicating how light is filtered as it passes through a specific type of screen material, how a specific wall type affects sound as the sound travels there through (e.g., is the sound completely blocked, are high frequency sounds filtered out, to what extent does the wall structure attenuate sound volume, etc.). In still other cases a VW will include other ambient characteristics information that can be used to simulate ambient characteristics within a VW representation. For instance, natural light at a specific time in a specific geographic location on a sunny day at a specific time of year may be represented within a VW dataset so that when there is a north facing window fixture within a VW representation, natural light effects at a specific time and VW location for the window fixture can be simulated. Other ambient characteristics can be related to synthetic light, sound, wireless system field strength, etc.

While the systems described herein may be used by anyone including a potential affordance user, a sales representative, a space designer or decorator, etc., in order to simplify this explanation, unless indicated otherwise, the term "user" shall be used to refer to a system user.

In the description that follows, various systems and components are described where some inventive aspects or functions are described in the context of some systems and components and other aspects and functions are described in the context of other systems and components. Nevertheless, it should be appreciated that any of the aspects, features or functions that are described in one system or in relation to one component may be implemented in other systems or with other components. For instance, there are several different types of interface devices described hereafter including a gaming controller device, an emissive touch sensitive table top surface, a tablet type computing device, etc., where different interface functions are described in the context of one or another of the interface devices. Any interface functionality may be implemented using any of the interface devices, albeit manifest in a different specific form.

In general this disclosure describes a system that enables a user to virtually move about within a three dimensional software generated virtual world (hereinafter "VW" unless indicated otherwise) that models possible real world affordance configurations so that the user can experience a visual appearance of those configurations as well as, in at least some cases, other configuration characteristics (e.g., how synthetic or natural light patterns are affected by affordances and configurations, how sound travels within the VW environment, etc.) prior to purchasing and installing affordances. One important end result of a system that is consistent with the present disclosure is that users are able to make better informed decisions regarding affordance configurations and space utilization planning and therefore user satisfaction with final installed configurations is expected to increased appreciably.

Referring to FIG. 1, at a high level, a 3D VW dataset 200 that models exemplary affordance configurations may be generated and stored and used to drive a virtual reality software engine causing the engine to present virtual views of the exemplary configurations via one or more emissive surfaces (e.g., electronic display screens). With the VW presented via emissive surfaces, a user can use an interface device to move about within the VW representation to, in effect, move to different VW locations and, in some cases, to essentially any VW location, to experience the configurations from any virtual perspective view.

In FIG. 1, the VW dataset 200 is represented as a 2D top plan view of an affordance configuration in the interest of simplifying this explanation. Nevertheless, it should be appreciated that dataset 200 has a depth dimension into the figure as illustrated that is at least as deep as a typical wall height (e.g., the dimension between a VW floor and a VW ceiling structure) within a space modeled by dataset 200. Each point within the 3D dataset 200 corresponds to a single voxel that has each of X, Y and Z dimensions. Each voxel is either associated with open space (e.g., air) or a solid structure (e.g., a desktop surface, a door structure or surface, etc. Air voxels are generally transparent while solid structure voxels are at least somewhat opaque in most cases so that when viewed in the virtual world, those voxels and associated structure can be distinguished from air voxels and affordances associated there with can be seen. In some cases glass panels or windows may be presented within a VW representation and in that case, while voxels may correspond to solid window panes or the like, those voxels may nevertheless be represented with some type of simulated frosting or other distinguishing characteristic so that a user viewing the glass pane in the virtual world can clearly distinguish glass from air voxels.

In addition to having color or opacity characteristics, each voxel within a VW dataset may have other characteristics associated therewith. For instance, solid voxels, both colors and transparent (e.g., a window) may be assigned a movement blocking or physical barrier attribute so that a user cannot virtually move through the voxel and hence an associated fixture or affordance within the VW. As another instance, a sound filter attribute value may be ascribed to voxels of a certain type and the sound filter attribute may be used to simulate how the affordance blocks or attenuates sounds in the real world. As still one other instance, a wireless signal filter attribute may be assigned to each voxel in a VW to indicate how that voxel attenuates or blocks wireless signals within a VW.

Instead of assigning sound, wireless signal and light filter attributes to voxels within a VW, in at least some cases those attributes and others (e.g., a physical barrier attribute) may be assigned to at least a subset or each different type of affordance and/or at least some of the fixtures represented in a VW. Thus, for instance, a floor supported privacy screen type affordance may be assigned a first set of light, sound and wireless filter attribute values while a glass dividing wall is assigned a second filter attribute set different than the first.

Referring again to FIG. 1, in at least some embodiments, once a user "enters" a VW dataset 200, the user is presented with views into the dataset that are consistent with an instantaneous current VW location of the user. To this end, in FIG. 1, an instantaneous user VW location is indicated by user location icon 180 which includes a perspective arrow 182 and an emissive surface representation including first, second and third display screen representations 184, 186 and 188, respectively, in front of the pointed end of the perspective arrow 182 that represent an exemplary three display/emissive surface workstation as shown in greater detail in FIG. 3. Here, the perspective arrow 182 indicates the direction within the VW associated with dataset 200 in which a user is facing. If the user rotates within the VW to face a different direction, arrow 182 would rotate accordingly. If the user moves within the VW to a different location, icon 180 would be shown at a different location. A second exemplary user location and perspective trajectory are shown at 180a in FIG. 1.

Referring yet again to FIG. 1, exemplary dataset 200 includes a set of fixtures including walls 161, 163, stairs 165, windows 167 and door members 169 that define a VW space 160 as well as a set of affordances including chairs 162, personal lounge stations 164, telepresence stations 166, table configuration typicals 168, small conference space typicals 170 and large conference space typicals 172, among other affordances and configurations that are arranged in a specific way within the space 160. Here, in at least some cases space 160 defined by the VW fixtures may be a generic space that has nothing to do with a user's specific facility space. In other cases the fixtures that define space 160 may be driven by some type of a space specification that reflects a user's facility space layout. For instance, in some cases a user may provide a space specification that defines space dimensions, window, door and stair well locations, ceiling height, and other fixture characteristics and that information may be used to generate the VW space representation 160. In still other cases a user may be able to provide a small subset of generally accurate information representative of the user's facility space that can be use to generate the VW space representation 160.

Figure 2:
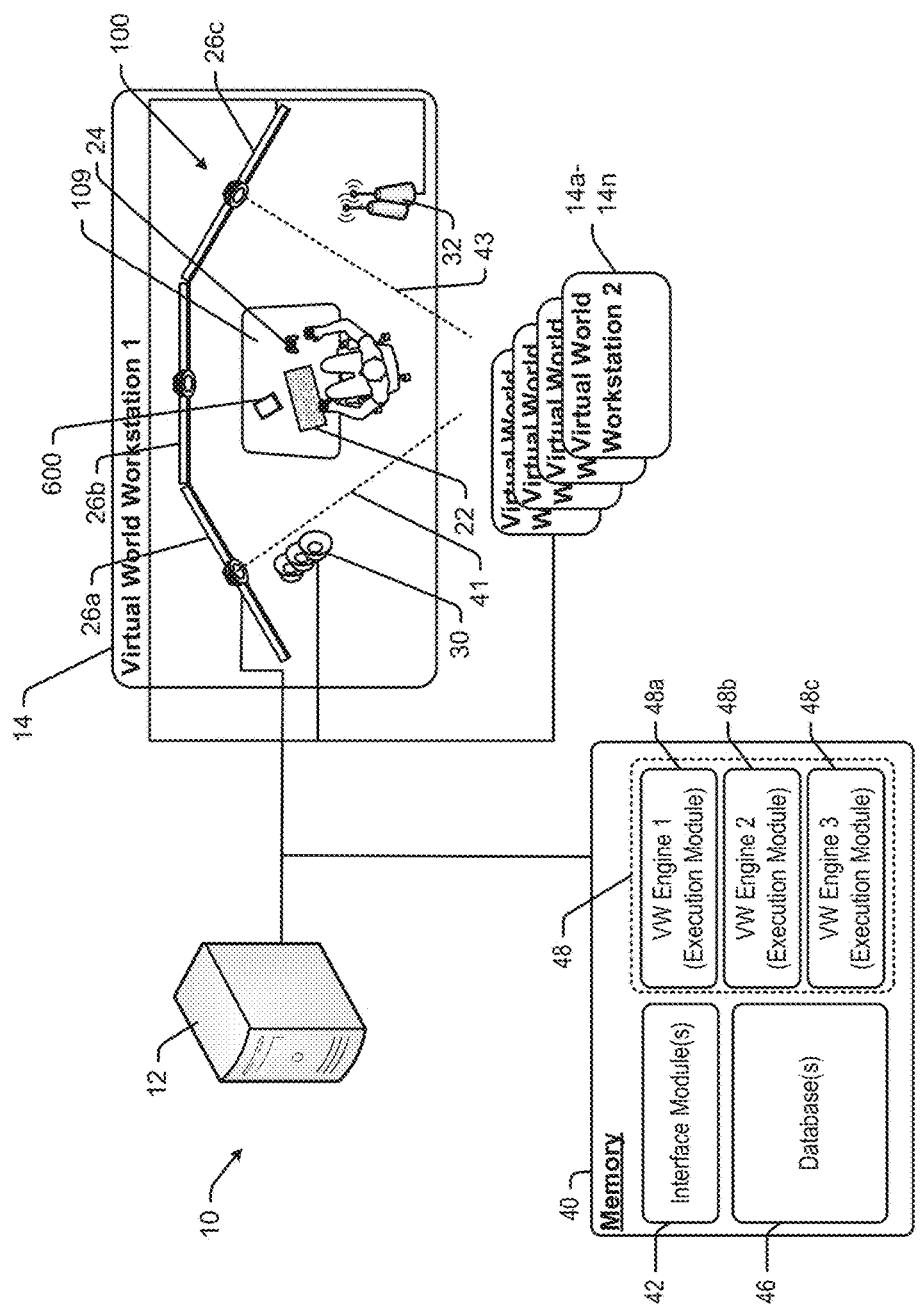
FIG. 2 is a schematic diagram illustrating an exemplary VW presentation system that is consistent with at least some aspects of the present disclosure.

Referring now to FIG. 2, the present disclosure will be described with reference to a virtual sales system 10 including a server 12, a plurality of virtual world (VW) workstations 14, 14a through 14n and a memory system or database 40. While server 12 is shown as a single computing device, it should be appreciated that server operations may be performed by any capable computing device or combination of linked or associated devices or servers. Thus, for instance, in some cases server 12 may include a network of computers, workstations or other computing devices that operate together to perform the processes claimed here or where each computer or server operates to perform a different subset of all of the operations or functions of the overall system.

In at least some embodiments each of workstations 14, 14a through 14n is similarly constructed and operates in a similar fashion and therefore, in the interest of simplifying this explanation, unless indicated otherwise, only workstation 14 will be described in some detail. Referring still to FIG. 2 and also to FIG. 3, exemplary workstation 14 includes, among other components, a set of emissive surface assemblies 100, a server or local computing device 12, a table assembly including a table top 109, a task chair 104, one or more interface devices 22, 24, 17, 110, etc., and an audio system that includes and is generally represented by a set of speakers 30. In the exemplary embodiment shown, assembly 100 include three separate flat panel emissive surface assemblies 112, 113 and 114 where each of the assemblies is similarly constructed and operates in a similar fashion. Exemplary assembly 112 includes an emissive forward facing surface 26a that is supported by a support or leg structure 124 in a substantially upright orientation where the forward facing surface 26a is substantially vertically oriented. Surface 26a has height and width dimensions H and W, respectively. In at least some embodiments the height dimension is between one and seven feet and the width dimension is between one and eight feet. In particularly useful embodiments, the height dimension will be within a range between two and four feet and the width will be within a range between two and five feet. Each assembly 113 and 114 also provides a large emissive surface 26b and 26c, respectively.

Figure 3:
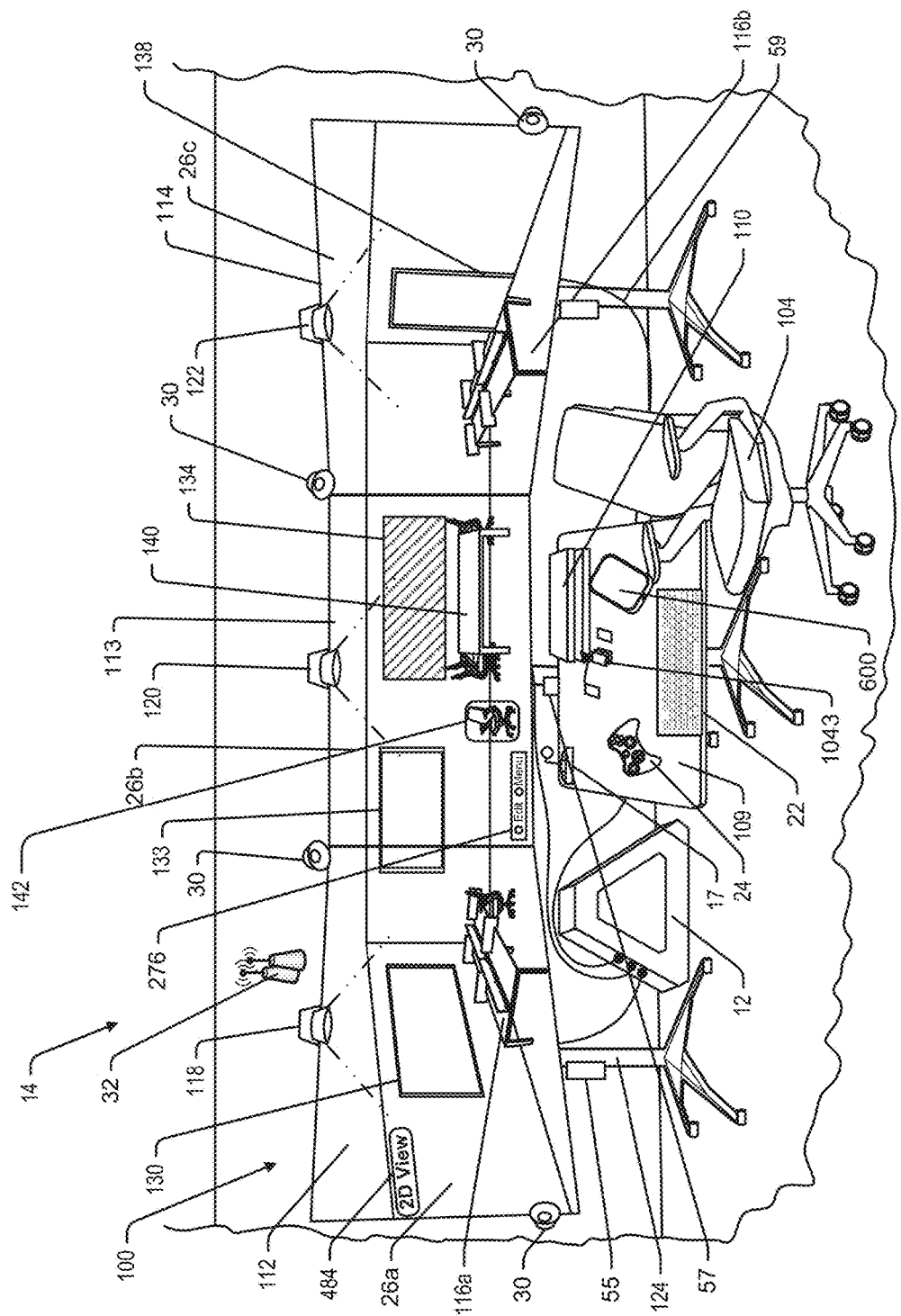
FIG. 3 is a partial perspective view of the VW station shown in FIG. 2.

Referring still to FIG. 3, in addition to including members that support surface 26a in the upright position as shown, in at least some embodiments, leg structure 124 includes casters or rollers at its lower end so that the leg and supported surface 26a can be moved about within a workstation space. In other cases leg structure 124 will not include casters and the assembly 112 will be positioned for stationary use at the station 14.

In at least some embodiments a lower edge of surface 26a may be generally located at a typical table top height (e.g., 22-26 inches) while in other cases the lower edge may extend further toward an ambient supporting floor surface (e.g., to within 12 inches of the floor surface). In some cases the support structure 124 will include components that enable height adjustment of surface 26a that surface 26a can be raised and lowered to suit a user's preference.

Referring still to FIGS. 2 and 3, emissive surface assemblies 112, 113 and 114 are arranged lateral edge to lateral edge with surface 26b centrally located between surfaces 26a and 26cc and so that the surfaces 26a and 26c form obtuse angles with surface 26b as best seen in FIG. 1 so that the surfaces 26a, 26b and 26c together form a concave emissive surface arrangement along one side of the station 14. The angle between adjacent surfaces 26a and 26b is within a range between 90 degrees and 160 degrees. In particularly useful embodiments the angle between adjacent surfaces 26a and 26b is within a range between 120 degrees and 140 degrees which has, through empirical testing, been shown to cause a particularly immersive feeling for users. The angle formed between surfaces 26b and 26c is similar to the angle between surfaces 26a and 26b in most arrangements.

Referring yet again to FIG. 2, while surfaces 26a, 26b and 26c are generally arranged about a location to be occupied by a user using station 14, in at least some cases only the central surface 26b will directly face the user position and the other two displays will face a location behind the user's station position as indicated by phantom lines 41 and 43. Here, it has been recognized that the human eye only permits 100% visual acuity centrally along a person's central field of vision. The area in which a person has 100% visual acuity is generally referred to as the person's foveal view and area outside that view is referred to as peripheral view. In most cases a user will use central surface 26b to view a virtual world representation and the lateral surfaces 26a and 26c will present views that are sensed peripherally to provide an immersive experience to a user. By having surfaces 26a and 26c aligned along trajectories that are behind the user station location, the overall immersive effect may be enhanced for at least some users.

Thus, the overall width dimension of the three surfaces 26a, 26b and 26c between opposite edges of surfaces 26a and 26c may be between about 2 and one half and 20 feet given the dimension ranges and angle ranges above and, in particularly advantageous embodiments, may be between five and fifteen feet.

While many types of displays may be useful in assembly 25, in particularly advantageous embodiments thin or minimal dimensioned bezel displays should be employed so that the bezels only minimally disrupt VW views during use. While thin or minimal bezel displays are particularly useful, it has been recognized that the human brain can take two images that are separated by bezels or even larger spaces (e.g., a two foot space between adjacent surfaces 26a and 26b) and stitch the two images together to, in effect, virtually fill in some missing detail. This is particularly true in cases where one image is centrally located in a user's foveal view and other images are located in peripheral views. For this reason, some embodiments may include standard sized bezels or even emissive surfaces 26a, 26b and 26c that are spaced apart (e.g., 1-2 feet) somewhat.

In some cases a subset or each of the emissive surface assemblies 112, 113 and 114 may be moveable either manually or in an assisted fashion (e.g., via a motor or other drive mechanism) to change the angles between surfaces 26a, 26b and 26c to support user preferences. Thus, for instance, where support 124 is castered, a user may manually move assembly 112 to change the angle between surface 26a and 26b to meet a preference. In other cases system 10 may include an automatic orientation adjustment system of some type so that the relative juxtapositions of the surfaces 26a, 26b and 26c may be modified automatically based on an optimized orientation specification and the location of a user at station 14. For instance, where a user location at station 14 changes (e.g., either the actual location of a user as detected via camera images or other system sensors or a location to be occupied by a user such as adjacent a rear edge of table top 109), the locations of surfaces 26a, 26b and 26c or a subset thereof may be modified to change orientation with respect to a dynamic user location. For instance, referring again to FIG. 2, if a user moves table 109 rearward away from surface 26b, to maintain the orientation of surfaces 26a and 26c with respect to the location of a user adjacent a rear edge of table top 109, assemblies 112 and 114 may be automatically rotated about edges that abut surface 26b to increase the angles between surfaces 26a and 26c and central surface 26b.

To adjust the orientations of surfaces 26a, 26b and 26c, any type of control and movement system may be employed as represented by blocks 55, 57 and 59 in FIG. 3. For instance, block 55 may include a motor linked to one or more casters and a wireless transmitter that receives control commands from a system server 12 for driving the casters and changing orientation of the entire assembly 112. As another example, block 55 may include a system for adjusting the orientation of surface 26a with respect to supporting structure 124 so orientation of surface 26a with respect to user location or other assembly 100 surfaces 26b and 26c can be changed.

While surface configuration 100 includes three large flat panel display surfaces arranged in an angular relative juxtaposition as illustrated generally in FIGS. 2 and 3, it should be understood that other emissive surface configurations are contemplated. For instance, each of the three surfaces 26a, 26b and 26c may include a curvature that curves about a vertical axis spaced in front of the surfaces so that the surfaces provide a uniformly curved front surface that is generally concave toward table assembly 109. In other cases central surface 26b may have a different curvature than each of the side or lateral surfaces 26a and 26c or may be flat while each of the lateral surfaces 26a and 26c are curved. In still other cases a single contiguous emissive surface may be presented that curves about table 109 to provide a single contiguous VW view. In still other cases one or each of the surfaces 26a, 26b and 26c may also have a curvature about one or more horizontal axis in front of the surface so that when viewed in vertical cross section, the surface is concave forward toward table assembly 109. In other cases a surface configuration 100 may include other surface numbers including two, four, five, six, etc., arranged about table assembly 109, each independent surface driven with a different VW view.

Referring still to FIGS. 2 and 3, table assembly 109 is typically aligned with central surface 26b and space therefrom by a distance within a range between two feet and ten feet and, in particularly useful embodiments, within a range between three and five feet (e.g., the distance between a front edge of table top 109 and surface 26b is within the specified range). Table top 109 is dimensioned to support input devices provided at the station and to provide some area for a user to lay out and use design materials (e.g., a pad of paper, material swatches, brochures, etc.). In at least some embodiments a depth dimension between the front edge (e.g., adjacent surface 26b) and rear edge of table top 109 should be small enough that a typical height adult can see the lower edge of surface 26b over the front table top edge to get a full view of surface 26b (see the view in FIG. 2). In other embodiments the table top depth dimension and relative juxtaposition of the table 109 to the emissive surface assembly 100 should be such that a typical height adult cannot see the lower edge of surface 26b over the front edge of the table top 109 so that a user adjacent the rear edge of table top 109 sees a portion of the virtual world immediately over the front table top edge.

In some cases the table assembly will include casters or wheels so that the table can be moved to different locations at station 14. For instance, in some cases the table may be moved toward surface 26b so that the lower edge of surface 26b is blocked from a standard height person's view by the front edge of table top 109 or may be moved back away from surface 26b so that the standard height person can see the lower edge of surface 26b over the front edge of table 109. In this way a user may be able to rearrange the table location with respect to the surface assembly 100 to provide an arrangement that the user perceives as optimal.

In at least some cases one or more cameras 118, 120 and 122 may be mounted to assemblies 112, 113 and 114 adjacent emissive surfaces 26a, 236b and 26c. The cameras may be used to capture images of a user using station 14 for various purposes including teleconferencing, sensing activities performed by the user, sensing where the user is instantaneously looking, etc. A shown, in at least some cases a camera 120 may be centrally mounted proximate an upper edge of surface 26b so that when a user gazes at surface 26b, the user's gaze is directed at the camera 120. In the illustrated embodiments assemblies 112 and 114 each have a similar camera 118 and 122, respectively, mounted centrally along their upper edges for similar effect. In some cases each camera may be aligned along a trajectory that forms a right angle with the front surface of an associated emissive surface. In other cases each camera 118, 120 and 122 may be aligned along a trajectory aimed at a location adjacent table top 109 to be occupied by a user 69 (see FIG. 2) at the station 14.

In some cases each camera 118, 120 and 122 may be mounted to a swivel plate that can be controlled to change the trajectory along which the camera is aligned. Here, for instance, where the cameras are to be aimed at a location used by a user, as a user moves table 109 forward and rearward with respect to surface 26b, the camera angles may be adjusted so that the cameras remain aimed at the user location. Camera adjustment may be manual or may be automatic. In the case of automatic camera alignment, images from one or more of the cameras may be used to determine the location of table top 109 and hence the location to be occupied by a user at station 14 and may adjust camera orientation to align with a location proximate the rear edge of the table top. In other cases where one user is at a station 14, camera images may be used to determine a current location of the user and therefore the location of the user's head and the camera orientations may be automatically adjusted to continually aim at the user's location at station 14. In some cases one or each of the cameras 27, 28 and 29 may include a wide angle or even a 180 degree or larger FOV and, instead of swiveling the camera to track a user's location, a system server may simply select a portion of the camera's FOV that is aligned with a user's location for processing.

While often times station 14 is only used by one user at a time, in some cases two or more users may use station 14 together. For instance, at times a sales representative and another user may use station 14 together to experience various configuration typicals tithing a VW. For this reason, in at least some cases the table top 109 should be large enough to accommodate two or more persons proximate the rear edge at one time. Thus, table top 109 may have a width dimension perpendicular to its depth dimension within a range between 2 feet and seven feet and, in particularly useful embodiments the width dimension may be between three and five feet.

Referring still to FIGS. 2 and 3, speakers 30 may include any type of audio system. In particularly advantageous embodiments speakers 30 include a high fidelity 5.1 or 7.1 channel speaker system that is arranged within the station 14 so that three dimensional immersive sound can be presented within station 14 so that a user at station 14 can sense different sounds and sound characteristics from different directions about the user's location at station 14.

Wireless access points 32 are located proximate station 14 so that one or more of the components located at the station may be wireless. For instance, each of the cameras 118, 120 and 122, each surface 26a through 26c, speakers 30, input devices, motors and other drive mechanisms may include a transceiver for receiving information and control commands from one of the access points 32 proximate station 14. In at least some cases access points 32 are linked or networked to server 12 or some other controlling computer that is linked to the server 12.

User input/interface devices may take any of several different forms. In at least some particularly advantageous embodiments a standard gaming system controller device may be used to provide user input to a system 100. By using a gaming controller, an already existing and robust control device is leveraged to facilitate user input to system 100. In addition, by using a gaming controller, a device already familiar to many perspective users can be employed which should result in faster learning times and system adaptation. Moreover, gaming controllers have been developed with virtual worlds in mind and have been iterated for decades to come up with control interfaces that are optimized for moving about within a VW environment.

Figure 4:
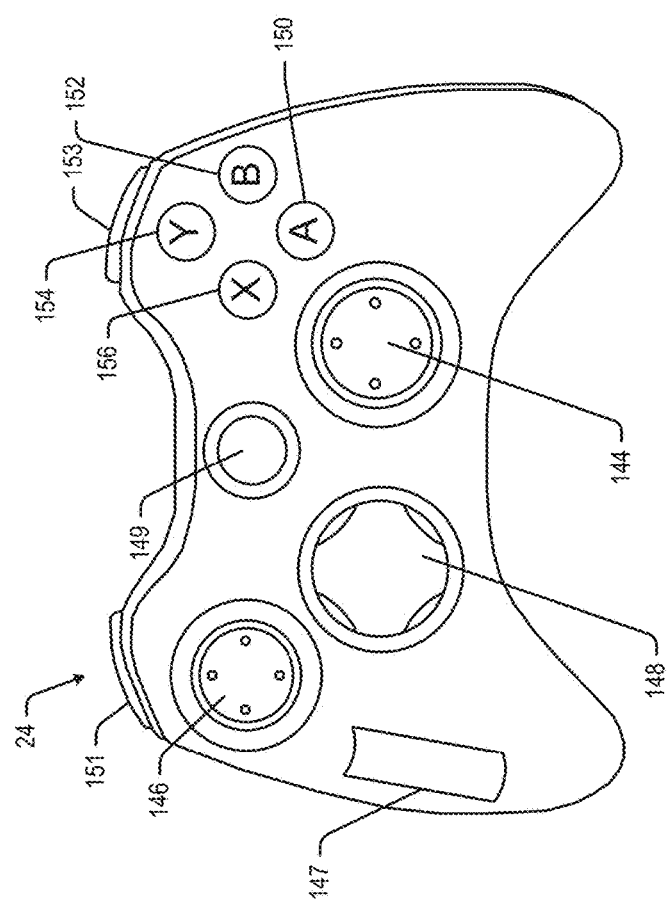
FIG. 4 is a top plan view of a gaming control device that may be used as an interface device with the station shown in FIG. 3.

An exemplary gaming controller 24 shown in FIGS. 3 and 4 that includes several top surface input buttons 150, 152, 154 and 156 (as well as others not separately labeled), left and right front surface input buttons 151 and 153, respectively, as well as one or more joysticks and/or toggle buttons 144, 146, 148, etc., that can be used to, at a minimum, issue different VW control commands for moving to different VW locations. In some embodiments the control device 24 may also be used to issue commands to change some aspect or feature of a VW. For instance, in some cases device buttons or other input components may be controllable to obtain information about one or any of the affordances within a VW representation (e.g., information about a selected chair type, about a height adjustable desk, etc.). As another instance, in at least some cases device 24 may be used to swap out one affordance for another or to change affordance characteristics such as material type, attribute values (e.g., the length of a desk top), selected options (e.g., a height adjustable or stationary arm support on a task chair, etc.).

Figure 9:
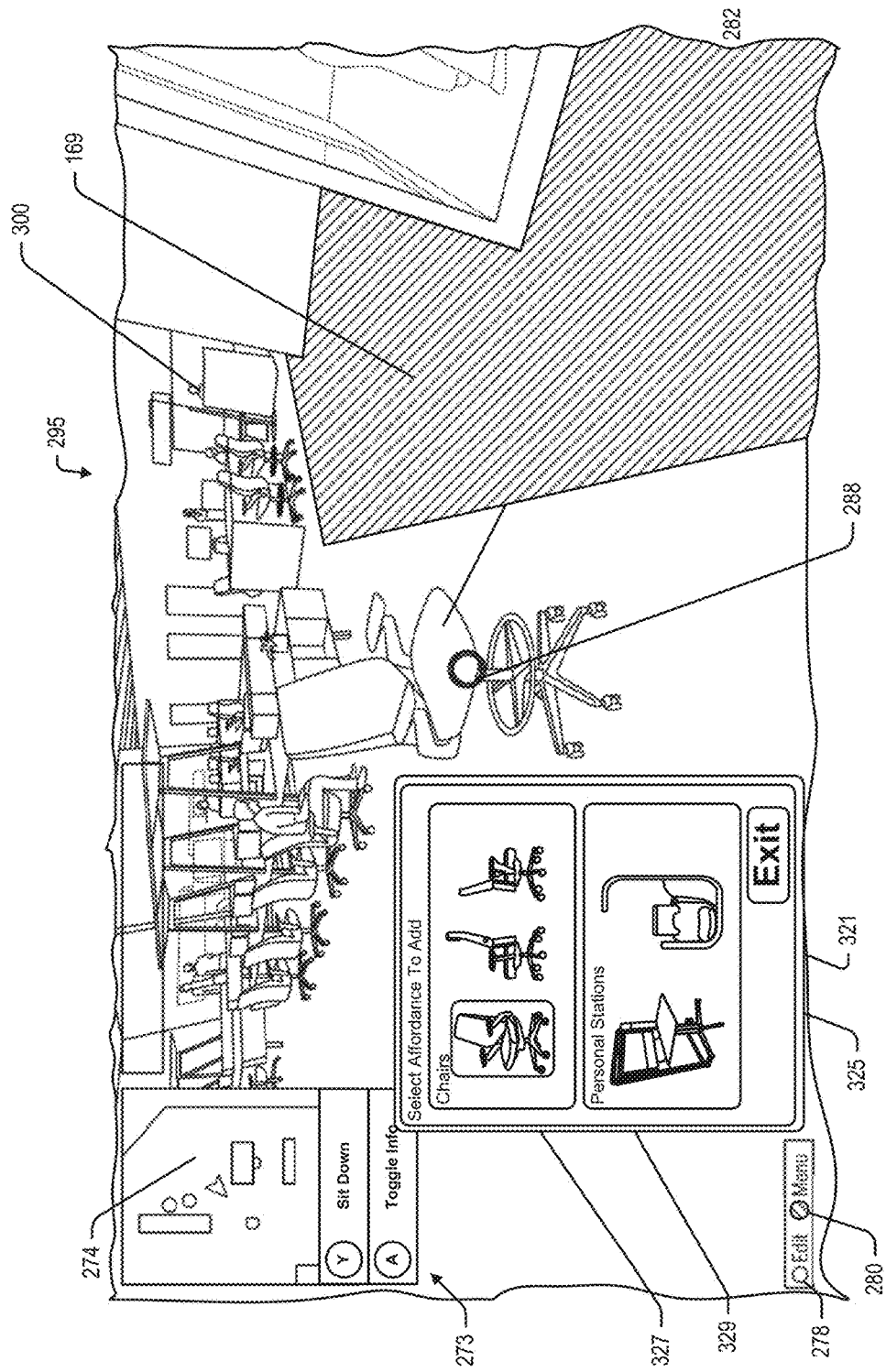
FIG. 9 is a is similar to FIG. 8, albeit showing a different view into the VW representation where a user is selecting an affordance from a pop up on screen window to add to the view.
Figure 14:
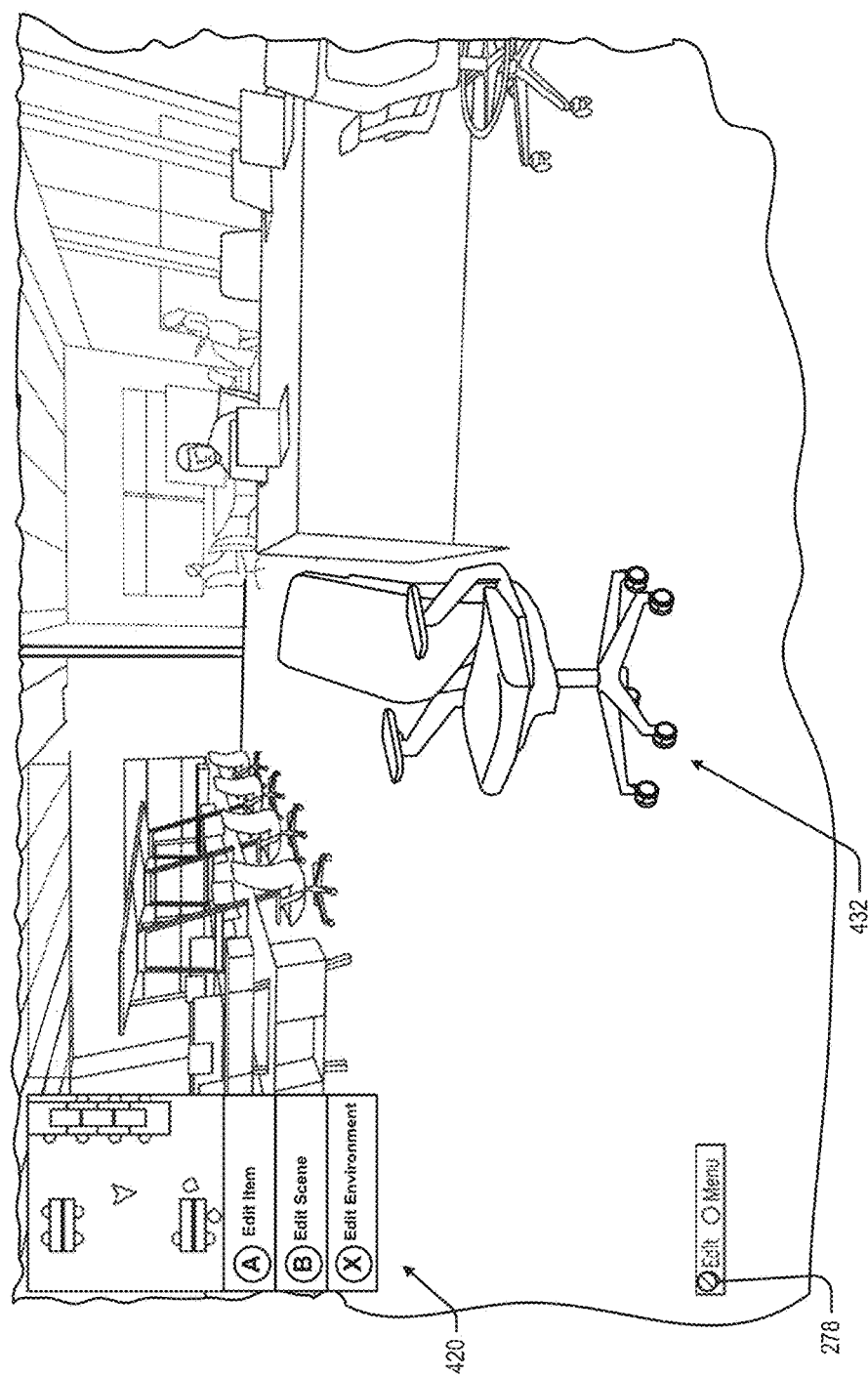
FIG. 14 is a VW view including a menu of options that may be selected by a user to edit various aspects of the VW representation.

Exemplary buttons 150, 152, 154 and 156 are labeled A, B, X and Y and the labels will be used hereinafter to refer to those buttons. While selection of the buttons A, B, X and Y is described as having specific effects hereafter, it should be understood that the system server or computer 12 may be programmed to perform any function described herein in response to any specific button selection or sequence of selections and that the disclosure herein should not be limited to which device button has been selected to initiate an activity unless indicated otherwise. Consistent with gaming controller devices on the market, in at least some cases instructions or a guiding control panel that indicates system commands associated with specific controller buttons may be presented on a section of at least one of the emissive surfaces (e.g., 26b in FIG. 3) as an aid to a user using the system. An instruction panel is particularly helpful in cases where commands associated with controller buttons are dynamic and change as a function of what a user is doing with the system 10. Exemplary instruction panels of fields are shown in FIGS. 9 and 14 indicating commands or functions associated with different controller buttons. See that the Y button has different functions in each of FIGS. 9 and 14 as different functions are available at different points in system operation.

Referring still to FIG. 4, unless indicated otherwise it will be assumed that joystick 146 is useable to move in different directions within a VW including forward, reverse, left, right and other directions there between. Controller 24 is directional meaning that it has a mechanical forward direction such that when the joystick 146 is pushed forward, a forward command is issued regardless of the orientation of controller 24 within the station 14. Thus, for instance, in FIG. 2, even if controller 24 were positioned so that the forward direction is to the left as station 14 is illustrated as opposed to toward surface 26b, controller 24 would issue a forward command causing movement forward within a virtual world representation presented on surfaces 26a, 26b and 26c. In addition, unless indicated otherwise it will be assumed that rocker button 148 is controllable to cause a user's VW perspective to rotate about an instantaneous VW location. Thus, for instance, by pushing down on the left side of button 148 the perspective may rotate left and by pushing down on the right side of button 148 the perspective may rotate right. Other perspective control schemes are contemplated. In addition, pressing the front and rear sections of rocker button 148 will cause a user's VW view to angle upward and downward, respectively, to simulate looking up and down at a VW location.

Figure 17:
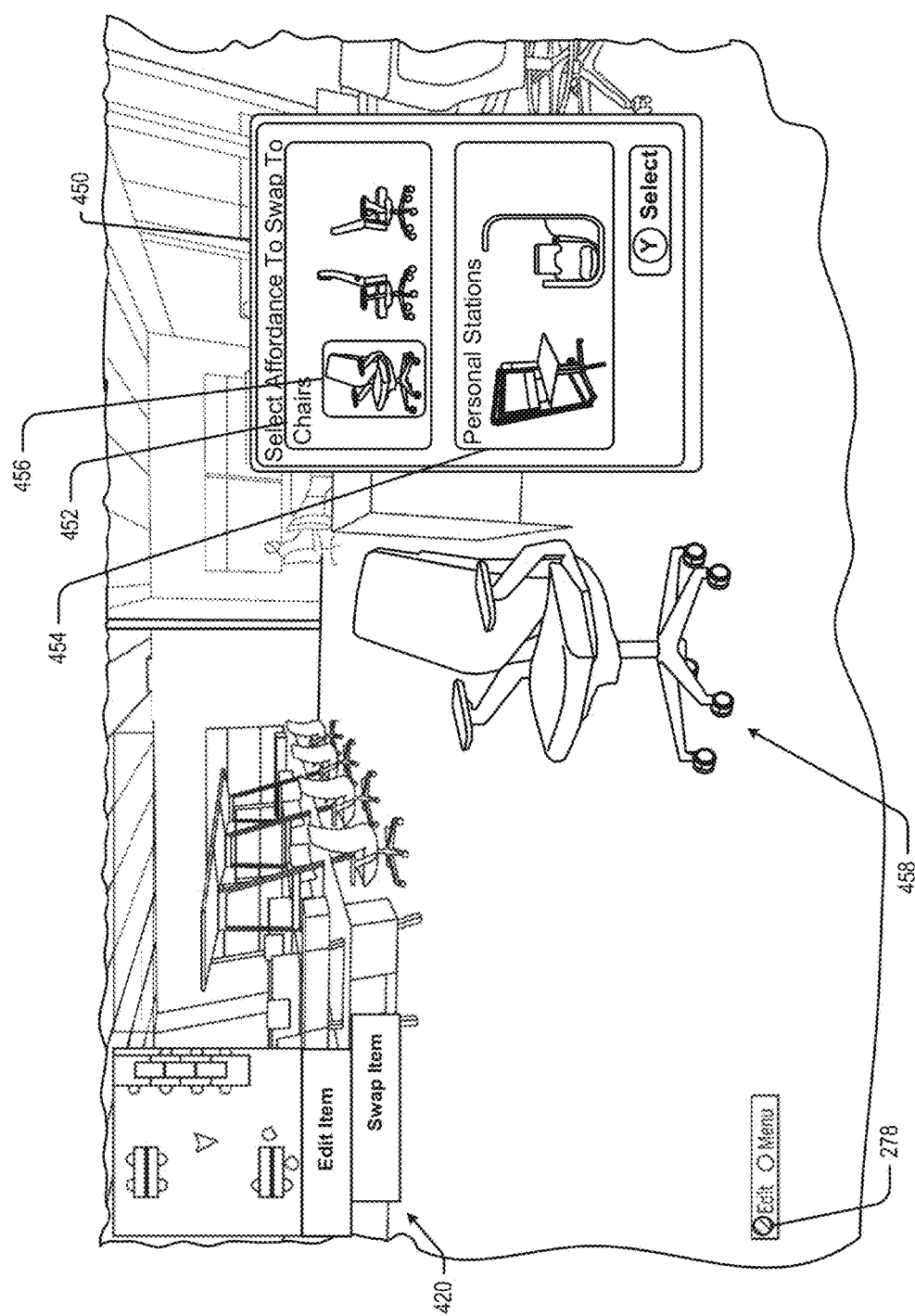
FIG. 17 is a view similar to the FIG. 16 view, albeit where a pop up window allows a user to swap any of several different affordances for an affordance that has been selected in the VW representation.

Moreover, unless indicated otherwise, it will be assumed that joystick 144 is reserved for moving about within at least some selection options presented on one of the emissive surfaces in at least some embodiments. For instance, see FIG. 17 where a selection field 452 includes three graphical representations of chair options and another field 454 that includes two other graphical representations of other affordance options. In FIG. 17 joystick 144 may be used to move a selection box 456 about from one option to the next or from field 452 to field 454 to select an option from any of the presented fields and then the Y button can be selected to enter the affordance command into the system. The ability to move about within on screen options enables the system to present more than four options (e.g. A, B, X and Y) within an option list for selection by a user so that, for instance, where 10 chair options exist within field 452 in FIG. 17, a user can scroll to other options within the field 452 for selection via the Y button.

As described above, the A, B, X and Y buttons will be associated with different control commands or functions as described hereafter and the input buttons 151 and 153 will also be sued to generate control commands as described hereafter.

In addition to including the control buttons and other input components described above, in at least some cases device 24 may also include a haptic feedback components such as a vibrator 147 controlled to operate as a user output or feedback device. For instance, if a user moves into an affordance or a fixture within a VW, in addition to being stopped at the affordance or fixture in a way which simulates the real world where persons cannot move through solid objects, the haptic feedback device may vibrate to further indicate the movement limiting effect. Other output or feedback components on device 24 may includes a speaker 149 or the like, one or more LEDs, light bulbs or other light generating devices, etc., any of which may be controlled to indicate some condition to a user using the device 24.

Other user input/interface devices include but are not limited to a keyboard 22 (see FIG. 3), a microphone 17, cameras (e.g., 120) that can sense Chair Type 1s, flat panel input devices like tablet computing devices or an emissive touch sensitive table top surface 109, card or bar or other code (e.g., matrix) readers, etc. For instance, microphone 17 may receive voice signals from a user at station 14 to allow verbal communications with other persons (e.g., a remote sales person). In addition, in at least some embodiments voice commands may be issued by a user to the system 10 via microphone 17. Keyboard 22 is a standard wireless QWERTY keyboard in at least some embodiments and may allow a user to enter system commands or to enter information related to the user's experience with system 10 and the affordances represented by the virtual system 10 as explained in greater detail hereafter. Other input devices are described in greater detail hereafter.

Referring again to FIGS. 2 and 3, computing device 12 is a high powered computer that, in some embodiments, is provided as a component of station 14 and that runs many of the programs described herein. In some cases device 12 is a gaming computer with several high definition graphics cards that are capable of driving surfaces 26a, 26b and 26c with high definition graphics VW representations. In some cases device 12 includes three processors, a separate processor for driving each of surfaces 26a, 26b and 26c in a manner consistent with commands received from a user using station 14. In other cases device 12 may include a single processor that drives each of the system displays with a different VW view.

To drive surfaces 26a, 26b and 26c, device 12 generates first, second and third separate views into a VW and simultaneously presents those views via surfaces 26a, 26b and 26c. Where surfaces 26a, 26b and 26c are arranged edge to edge as shown in FIG. 3, the first, second and third views are selected such that adjacent views are generally contiguous. Thus, the first view on surface 26a is taken immediately adjacent the second view on surface 26b so that when the two views are presented simultaneously, the first view and affordances and fixtures therein appear to continue into the second view. Similarly, the third view on surface 26c is taken immediately adjacent the second view on surface 26b so that when the two views are presented simultaneously, the third view and affordances and fixtures therein appear to continue into the second view. Because the first, second and third views are contiguous and fill not only the foveal but also the peripheral views of a user, a user at station 14 has a sense of being immersed in the VW presented via surfaces 26a, 26b and 26c.

Figure 5:
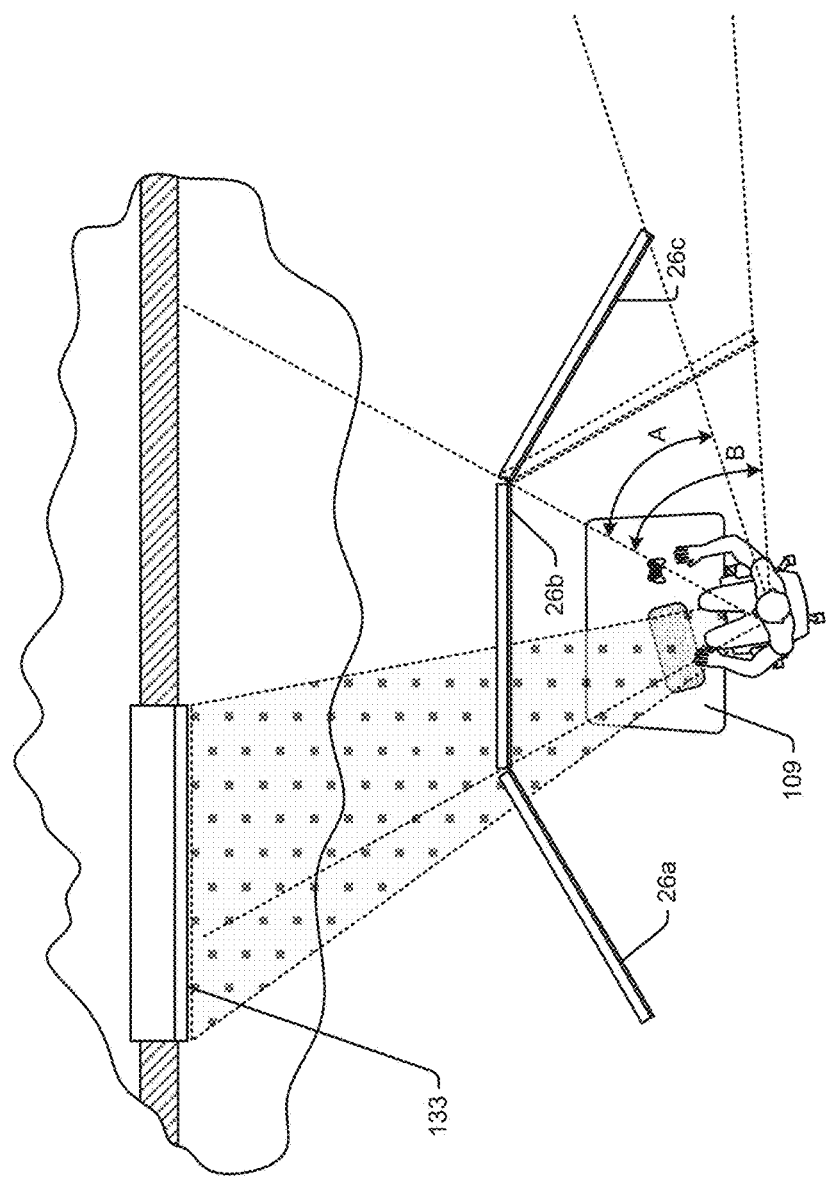
FIG. 5 is a top plan schematic view of a user at a station like the one shown in FIG. 3 illustrating how the user's perspectives on emissive surfaces at the station align in a virtual world representation.

In some cases the views presented are contiguous rectangular plan views into the VW that are taken within the same plane in the VW dataset. In other cases the first, second and third views are aligned with the real world positions of the surfaces 26a, 26b and 26c from the perspective of a likely user station location (e.g., a location adjacent a rear edge of the table top 109 in FIG. 1) where lateral edges of adjacent views are immediately adjacent each other. To this end, see again FIG. 3 and also FIG. 5 where an exterior window in the VW at 133 is shown in perspective on adjacent sections of surfaces 26a and 26b from a user's viewpoint adjacent a rear edge of table top 109. As shown best in FIG. 3, exterior window 133 appears on both screen surfaces 26a and 26b which, despite the different planes occupied by the real world surfaces 26a and 26b, appears to be in a single continuous window located in a single plane spaced behind surfaces 26a and 26b. In this case, the perspective views are keyed to an intended or likely location of the user as opposed to the actual location of the user at station 14.

In still other cases where one or more cameras (e.g., 118, 120, 122) or other station sensors track the location of a user's eyes or head within a station space, the first, second and third views may be perspective views into the VW from the instantaneous location of the user at station 14. Thus, here, the user's VW views on surfaces 26a, 26b and 26c would be altered to change as a function of the user's perspective with respect to the emissive surfaces and would give a windowing effect to the user's VW experience where a greater amount of the VW space could be observed as the user moves closer to surfaces 26a through 26c.

Where the angles of the emissive surfaces at a station 14 can be changed, in at least some cases the perspective view into the VW presented via a surface may be automatically changed accordingly. For instance, see again FIG. 5 where emissive surface 26c is shown in full line in a first angular orientation and in a phantom in a second orientation. Here, as shown, a user's perspective VW view through surface 26c in the first orientation is represented by angle A and the user's perspective VW view through surface 26c in the second orientation (e.g., the phantom representation) is represented by larger angle B. Other surface angles would cause other angular perspectives to be presented in this embodiment.

Referring again to FIG. 2, memory 40 is an electronic memory device or set of devices that may be local to a facility that includes stations 14, 14a through 14n or that may be remote and accessed via the Internet or some other network system. Memory 40 includes interface modules 42, one or more databases 46 and a plurality of virtual engine execution modules 48a, 48b, 48c that are collectively identified by numeral 48.

Interface modules 42 include software programs in addition to the VW engines for user interfacing with system 10. For instance, one interface module may include software for defining a virtual space as well as affordances and affordance arrangements to be presented within that virtual space. As another example, another interface module may include software for accessing and presenting information about an affordance or a configuration typical presented within a VW view. As still one other instance, another interface module may include software that enables a user to express materials or color preferences for a VW space arrangement or to express required space characteristics (e.g., importance of natural light, visual privacy, etc.) that are useable by a VW to configure optimized affordance layouts keyed to specific user preferences or requirements. Many other interface modules are contemplated which are described in greater detail hereafter.

Referring still to FIG. 2, VW engines 48 include software programs that use a 3D VW dataset like 200 in FIG. 1 to generate and present VW views on emissive station surface 26a through 26c that are keyed to specific user VW locations so that the user can experience affordance configurations within the VW as opposed to the real world. Thus, for instance, in FIG. 3, an engine 48 may generate each of the three views presented on surfaces 256a, 26b and 26c that include, among other affordance and fixture representations, first and second window representations 130 and 133, a door representation 138, an VW emissive surface representation 134, a conference table representation 140, first and second four pack workstation representations 116a and 116b, respectively, and fixture (e.g., VW walls, not labeled) representations. As a user moves about within the VW, the engine 48 changes the VW views in a fluid fashion to represent new views consistent with the changing VW location of the user.

While system 10 may be used to present configuration typicals or standard affordance configurations within a generic VW space in at least some embodiments, herein, unless indicated otherwise, it will be assumed that user specific VW spaces and affordance configurations will be presented via system 10. Thus, for instance, referring again to FIG. 1, it will be assumed that space 160 corresponds to a first real world space SP-0001 that is owned or at least used by a first user/user 00001 and that the affordances and typicals represented by dataset 200 are consistent with an affordance specification/preferences P-0001 that have been specified by the user 00001 in some fashion for the space SP-0001.

Figure 6:
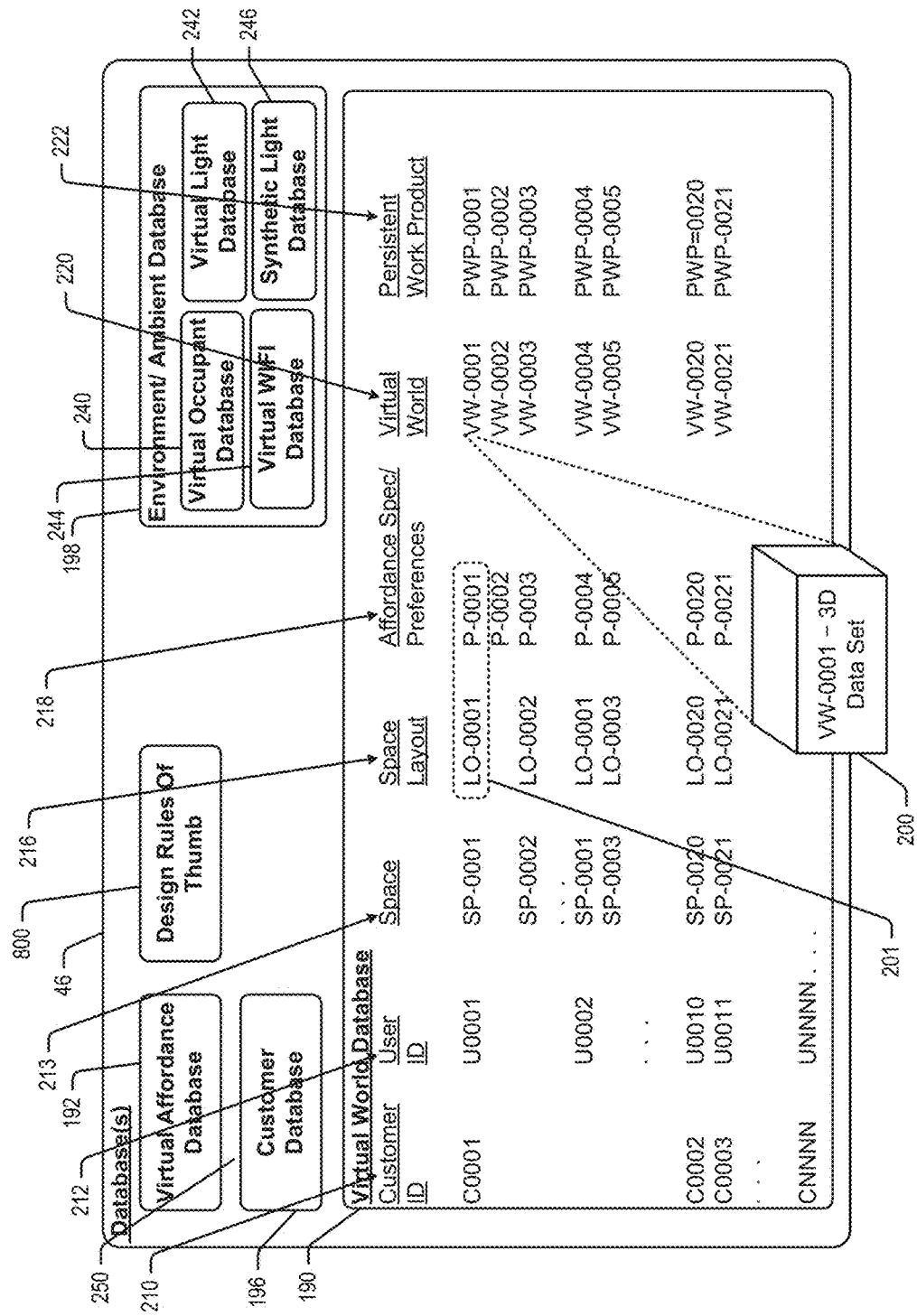
FIG. 6 is a schematic view of a simplified database that is consistent with at least some aspects of the present disclosure.

Referring yet again to FIG. 2 and now also to FIG. 6, database(s) 46 includes several different sub-databases that together provide information useable by the VW engines 48 to generate the VW views and other VW characteristics to present user experiences. To this end, most embodiments will include at least an abbreviated virtual world database 190 that includes, among other information, at least a first space layout LO-0001 and a first affordance specification/preferences dataset P-0001 as indicated at 201. Here, the space layout LO-0001 specifies VW fixtures that define a space including, for instance, relative juxtapositions of space defining VW walls, windows, doors, staircases, etc., as well as dimensions of each of those fixtures (see again the exemplary 2D representation of the VW dataset 200 in FIG. 1). Once layout L-0001 is specified, different locations within a VW space 160 (see again FIG. 1) will have X and Y coordinates within that space 160 and different affordances as well as user VW locations can be specified by space specific X and Y coordinates. For instance, chair 162 in FIG. 1 may have X and Y coordinates X301, Y301 while a current user VW location may be at another X and Y location X302 and Y302, respectively.

Referring still to FIG. 6 and also to FIG. 7, an exemplary affordance preferences dataset P-0001 is illustrated at 224 and includes an exemplary data table that specifies locations of specific affordances within VW space layout LO-0001 as well as affordance attributes values and other information that affects the appearance of each affordance within a VW. To this end, preferences P-0001 include an affordance column 250, an instance column 252, a VW location column 254, a VW orientation column 256, a VW state column 258, an affordance attributes column 260 and an attribute value column 262. Affordance column 250 includes a list of each affordance type that is specified for an associated space layout (e.g., LO-0001). For instance, column 250 includes affordances type AF-0001 corresponding to an Workstation Type 1 height adjustable table affordance manufactured by Steelcase, an affordance type AF-0085 corresponding to a Chair Type 1 task chair affordance manufactured by Steelcase, etc. While exemplary column 250 only lists separate affordances, it should be understood that column 250 may also list configuration typicals where each typical includes a multi-affordance set (e.g., a workstation table, a flat screen emissive surface, a set of privacy panels about a table top, a specific type of task chair, etc.).

Instance column 252 includes a list of instances for each affordance type in column 250 that are specified for an associated layout LO-0001. For instance, for affordance type AF-0001 (e.g., the Workstation Type 1 height adjustable table), there are 300 instances (e.g., IN-0001 through IN-0300) specified in column 252.

Referring still to FIG. 7, VW location column 254 indicates X and Y coordinates for each affordance instance in column 252. Thus, for example, AF-0001 instance IN-0001 is at location X1, Y1 in layout LO-0001, AF-0085 instance IN-0001 is at location X301, Y301 in layout LO-0001, etc. Orientation column 256 indicates an orientation for each affordance instance in column 252. For instance, AF-0001 instance IN-0001 at location X1, Y1 is oriented at 90 degrees in top plan view from some 0 degree angle (e.g., a North direction in most cases).

Referring yet again to FIG. 7, VW state column 258 indicates a state of an associated affordance instance from column 252 where the affordance can assume two or more states that cause the affordance to have a different visual appearance. For instance, in the case of an Workstation Type 1 height adjustable table that can assume, among other positions, a raised or upper position and a lower position, column 258 indicates which of the different positions a specific instance of the affordance is in. Thus, in FIG. 7, column 258 indicates that first and second instances IN-0001 and IN-0002 of affordance type AF-0001 are in lower and upper positions, respectively.

Affordance attribute column 260 includes a list of attributes for each affordance type in column 250 that may have more than one attribute value. For instance, for the AF-0001 Workstation Type 1 table in column 250, column 260 includes a top finish attribute as well as a modesty screen attribute. While only two attributes are listed for AF-0001 in FIG. 7, in some cases the attribute list may be much larger (e.g., 10-20 different attributes). Column 262 includes an attribute value for each attribute listed in column 260. For instance, for the top finish attribute for AF-0001 instance IN-0001, the value in "chocolate walnut" and the modesty screen attribute value is "NONE" indicating that instance IN-0001 of AF-0001 does not include a modesty screen.

Referring again to FIG. 6, in at least some embodiments a server may be programmed to use a space layout LO-0001 and associated affordance preferences specification P-0001 to generate and store a VW dataset VW-0001 (see the exemplary set 200 again in FIG. 1) that includes a space 160 consistent with layout LO-0001 and affordances positioned within space 160 and having the attributes specified by preferences specification P-0001. By storing the VW dataset prior to a user actually accessing the VW, processing power can be spent rendering VW views as opposed to generating the 3D dataset 200 itself during use.

Figure 10:
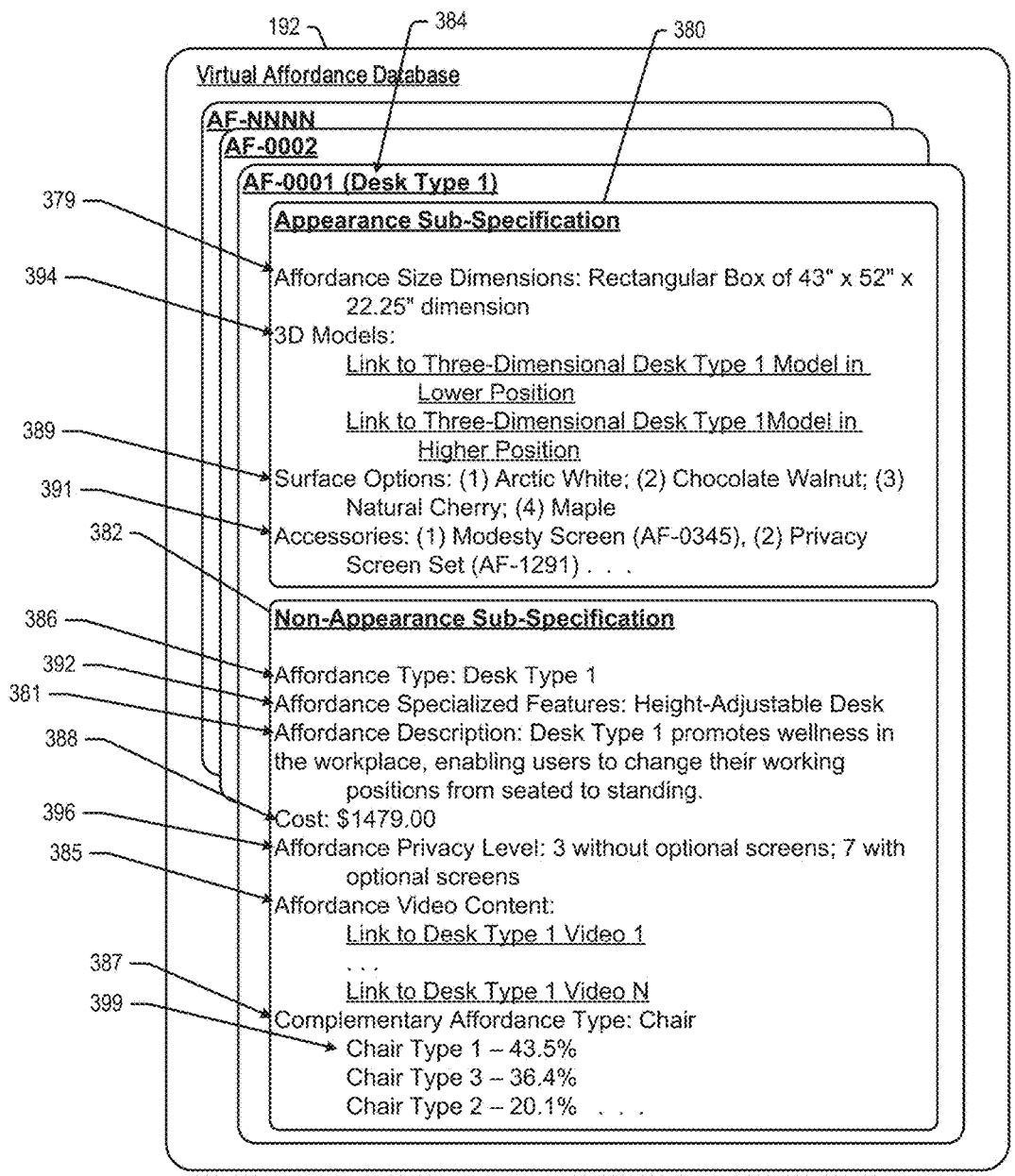
FIG. 10 is a schematic view of a virtual affordance database that is included in the database structure shown in FIG. 6.

Referring again to FIG. 6, in at least some cases the database(s) 46 includes a virtual affordance database 192 that includes a separate affordance specification for each affordance type and/or configuration typical supported by system 10. Referring also to FIG. 10, an exemplary affordance database 192 is illustrated in a simplified and abbreviated tabular form. While tabular, it should be understood that database 192 may take any form known in the database art such as for instance, a relational database, a frame based database used in many product configuration systems, etc.

Exemplary database 192 includes a separate affordance specification AF-0001 through AF-NNNN for each affordance that is supported by or useable with system 10. Each of the specifications is similarly configured and operates in a similar fashion and therefore, in the interest of simplifying this explanation, only specification AF-0001 will be described in some detail. Specification AF-0001 is associated with an Workstation Type 1 table affordance as indicated by label or name field 384 and includes two general information or specification types including an appearance sub-specification 380 and a non-appearance sub-specification 382. Appearance sub-specification 380 includes appearance related information that can be used by system 10 to render VW representations of the associated affordance type. For instance, the appearance information includes affordance dimensions at 379 required to determine if an instance of the affordance can fit within an open space in VW representation as well as 3D virtual graphical models at 394 used to render graphical representations of the affordance in a VW.

While the affordance dimensions in field 379 may be actual dimensions of a real world instance of an associated affordance (e.g., the height, width, depth of a table assembly), in some cases rules for how close two affordances can be to each other within a VW or for how close affordances of one type can be to any affordance of another type may be specified that are used by the system server 12 to expand the dimensions associated with an affordance and therefore required to place an affordance at a location within the VW. For instance, for a workstation affordance designed to accommodates a user along a front edge, a depth dimension associated with the affordance may include a three foot area adjacent the front edge of the workstation affordance in which no other affordance other than a chair type affordance can be placed. Similarly, the dimensions of a shelf assembly affordance may include a two foot open space in front of the shelf affordance. Many other design requirements or rules may be used to create affordance dimensions that are larger than the actual dimensions of real world instances of specific types of affordances.

Specification AF-0001 includes two separate graphical models of the Workstation Type 1 table at 394, a first model corresponding to the table in a lowered position (e.g., where the height adjustable table top is in a lowered position) and the second model corresponding to the table in a higher or upper position (e.g, where the height of adjustable table top is in a raised position). In some cases other models representing intermediate table top height states may be provided. The 3D graphical models are used to render instances of the Workstation Type 1 table in raised or lowered states within the VW representation (e.g., see again 268 in FIG. 9). Thus, for instance, where a specific Workstation Type 1 table instance in a VW representation is raised, the raised model is used to render the instance and where a different table instance is lowered, the lower model is used to render that instance in the VW. Each 3D model includes data for rendering the appearance of an associated affordance in a specific state so that the affordance can be viewed from any angle thereabout and from any height vantage point (e.g., sitting or standing or other viewpoints).

For appearance related characteristics that have only one attribute value (e.g., a table leg structure that has only a single matt metallic appearance), each model may also specify the single, non-optional characteristic. Where an affordance attribute has various options, each model may include a placeholder for the option value without specifying a specific option value. In some cases each model may specify default option values (e.g., a table top color and construction material) and those options may be modified by customizing attribute selection described hereafter.

Referring again to FIG. 10, option values for appearance related affordance characteristics are stored at 389 and, in the example, only a surface option is presented for the Workstation Type 1 table. Exemplary surface options include arctic white, chocolate walnut, natural cherry and others. While only color options are presented at 389 many other options may be provided in the option section 389 of specification 382. When a value is selected for each optional attribute from section 389, the selected values are combined with the model information at 394 to create a completely specified appearance of a specific instance of the affordance associated with specification AF-0001 so that server 12 can render a representation of the affordance in the VW. Referring again to FIG. 7, selected optional attribute values for specific affordance instances i (e.g., IN-0001 of AF-0001) are stored in columns 260 and 262 of the preferences database 224.

Referring still to FIG. 10 and more specifically to the models at 394, while separate models may be specified for different affordance states (e.g., raised or lowered top), in other cases where an affordance may have two or more visual states, an affordance model may include separate models for each of two or more different assemblies or components that make up a single affordance as well as information related to relative juxtapositions of the separate affordance components when the affordance is in different states. For instance, in the case of a height adjustable table, most height adjustable tables include a first supporting subassembly that is stationary and that does not change in appearance as the affordance state is changed from one state to another and a second subassembly, typically including a table top and perhaps other structure (e.g., an extending support leg member) that do move during state changes and that therefore has a different appearance within an affordance representation in each of two or more states. Here, models associated with the raised and lowered states may specify relative juxtapositions of the first and second subassemblies and the system server may then render an affordance representation that is consistent with either the raised or lowered state or any intermediate state there between where a user wants to experience intermediate affordance states.

Exemplary accessories that may be included along with a standard or base associated affordance are listed at 391 where, as seen, the exemplary list for the Workstation Type 1 table includes a modesty panel and a set of privacy screens. Each accessory listed is an affordance in and of itself and therefore each listed accessory includes an affordance specification designation (e.g., AF-0345, AF-1291, etc.) useable to access affordance characteristics (e.g., 3D models, pricing information, etc.) for the associated accessory affordance.

Non-appearance sub-specification 382 includes affordance information that is not related to the appearance of an associated affordance but nevertheless is useful for various system or user purposes. For instance, sub-specification 382 includes an affordance type designation at 386, a description of special features of an associated affordance at 390, a plain language affordance description at 381, and cost information at 388. The exemplary specialized feature at 392 indicates that the Workstation Type 1 table is a height adjustable desk. Plain language description 381 can be used to present a simple marketing or otherwise informative description of an associated affordance to a user within a VW. The exemplary description includes "Workstation Type 1 promotes wellness in the workplace, enabling users to change their working positions from seated to standing".

Referring again to FIG. 10, exemplary specification AF-0001 may also include at least a subset of non-appearance yet functional affordance characteristics that may be of interest to a user and/or that may be used by the system server to characterize different affordances and VW subspaces in various ways. To this end, one exemplary non-appearance characteristic associated with any type of table or workstation assembly is a visual privacy characteristic. In the present example it is assumed that at least a subset of system supported affordances will be able to be characterized on a 1 to 10 scale with respect to visual privacy level. A 3 out of 10 privacy level is specified at 396 for a typical Workstation Type 1 table that does not include any additional optional privacy screens. In contrast, as also seen at 396, when optional privacy screens are included with a Workstation Type 1 table, the privacy characteristic goes up to 7 out of 10.

Specification AF-0001 may define other non-appearance functional affordance characteristics. For instance, a sound filter characteristic may be specified that indicates how an associated affordance changes different sound types as they travel through affordance materials, structures, etc. For example, high and low frequency sounds may be attenuated differently by a glass wall affordance structure that is included in a telepresence room configuration typical and information characterizing the sound attenuating properties of the wall structure may be stored as non-affordance characteristics. Thereafter, in at least some embodiments, when a telepresence room configuration typical is present in a VW representation, the sound filter characteristics can be used to characterize the telepresence instance and, in at least some cases, to assign a number (e.g., 1 through 10) to the space indicating the attenuating characteristic. In at least some cases a noise level map may be generated for a VW representation so that a user can develop a sense of the sound attenuation characteristics for different sections of a VW facility space. In other cases, as described in greater detail hereafter, system serve 12 may simulate real world activities in a VW representation that result in sounds (e.g, voices in a next VW office space, an employee working at a workstation, etc.) emanating from different VW locations and may use the sound filter number associated with a user's instantaneous VW location to present sounds in the real world consistent with how those sounds would be experienced in the VW.

As another instance, a wireless signal filter characteristic may similarly be specified that indicates how an affordance affects wireless signals as they propagate within a space. As in the case of the sound attenuation filter characteristics, the wireless signal filter characteristics of affordances may be used along with knowledge about access point locations and signal strengths to generate wireless signal strength numbers (e.g., on a 1 to 10 scale) for each point within a VW representation and that information could then be provided to a user either on command or continually for any VW location or, in some cases, as a signal strength map.

As still one other instance, a light signal filter characteristic may be included in specification 382 indicating how light is blocked or attenuated by affordance structures, materials, etc. Again, the light filter characteristics may be used to generate light characterizing values (e.g., a number from 1 to 10) for different VW locations and/or an overall light characterizing map for any VW representation. Other non-appearance characteristics are contemplated and, in at least some cases, each of these characteristics may include a value between 1 and 10

Referring yet again to FIG. 10, sub-specification 382 also includes one or more marketing or other types of videos 385 that include animations or actual video presentations of an associated affordance or some aspect or information related to the affordance. In at least some cases, a user may be able to access each of the videos while located in the VW to obtain additional information on the associated affordance. Video access is described hereafter in grater detail.

In many cases when a user is interested in a first affordance, the user is also interested in one or more other affordances that are typically used with the first affordance. Hereinafter, unless indicated otherwise, the term "complimentary" will be used to refer to an affordance that is typically used with or that typically accompanies another affordance. For instance, when a user is interested in a desk or workstation table, in many cases the same user will also be interested in purchasing a task chair to go along with the desk or table. As shown at 387, in at least some cases sub-specification 382 may include at least one or even a list of complimentary affordances for an associated affordance (e.g., the Workstation Type 1 table in the present example). In the present example the complimentary affordance list includes a single entry, a chair.

In at least some cases it is contemplated that prior user preferences related to complimentary affordances may be tracked in some fashion and those preferences may be accessible to a user when considering complimentary affordances. For instance, an affordance manufacturer may track task chair types purchased with each Workstation Type 1 table and may provide that information to system 10. In other cases, system 10 itself may track preferred complimentary affordances and store that information on its own. To this end, for instance, system 10 may query prior users about preferred selected complimentary affordances and combine user answers over time to render meaningful statistical complimentary affordance preferences. In still other cases system 10 may be programmed to discern preferences from user selections of complimentary affordances via system 10 and may store tallied results thereof for guidance purposes. In FIG. 10, exemplary task chair preferences for the Workstation Type 1 table are indicated at 399.

Figure 8:
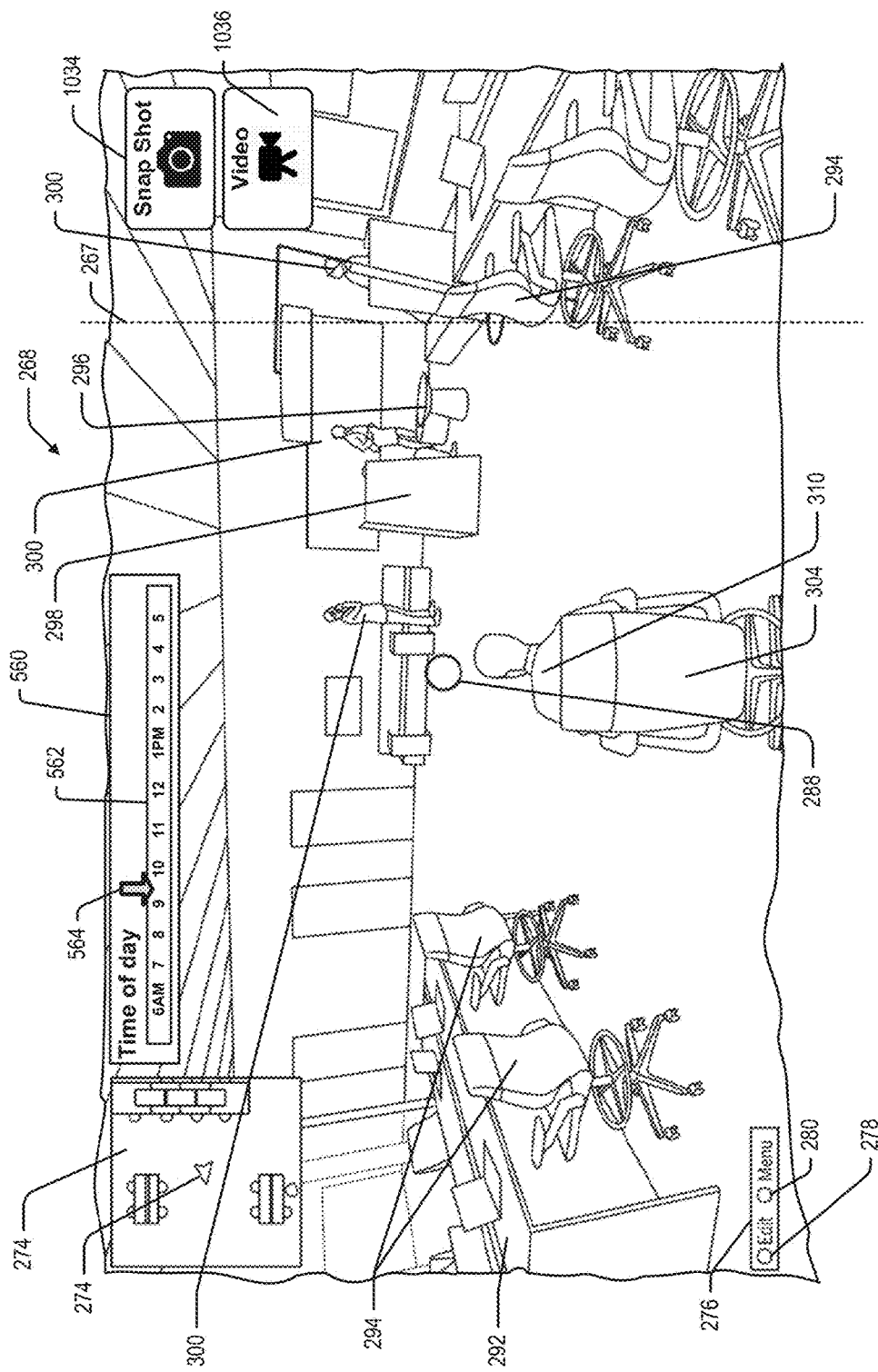
FIG. 8 is a screen shot from the emissive surfaces in FIG. 3 that shows an exemplary view into a VW representation where a user is represented by a VW occupant in a seated position.

Referring again to FIGS. 6 and 7, in at least some embodiments it may be that the data or information required to specify space layout LO-001 and preferences P-0001 and hence the 3D VW dataset 200 may be specified by a user or some other system user (e.g., a sales representative, a space designer, etc.) via an interface system other than system 10 and then used by system 10 to present the VW views to a user. Here, in at least some embodiments, once layout LO-0001 and preferences P-0001 are specified, unless that information is modified using the other interface system, the LO-0001 and P-0001 specifications may be set and a user may be limited to simply moving about in the VW to view the VW affordance arrangements from different VW locations and orientations. To this end, see the exemplary partial VW view 268 shown in FIG. 8 that may be presented to a user via station 10. In FIG. 8 the partial view 268 is shown as a single contiguous view in the interest of simplifying this explanation. Nevertheless, it should be appreciated that view 268 may include portions of views presented via adjacent separate emissive surfaces 26a, 26b, 26c, etc., as shown in FIG. 3. For instance, the phantom line at 267 may correspond to a dividing line along the adjacent vertical edges of surfaces 26b and 26c in FIG. 3.

Referring still to FIG. 8, view 268 includes a 3D perspective representation of dataset 200 (see again FIG. 1) from a user's instantaneous location within the VW. As shown, the view includes several space defining fixtures as well as affordances including, among others, instances of task chairs 294, work tables 292, side tables 296, privacy screens 298, etc. As the user moves or rotates within the VW, server 12 changes the VW view accordingly. Consistent with the above description, referring again to FIG. 4, to move within the VW, a user manipulates joystick 146 to move to different locations that are not restricted by the VW affordances and fixtures (e.g., walls, windows, etc.). Thus, for instance, to move forward, the user simply pushes joystick 146 forward which causes the view 268 to change accordingly. To rotate left, the user pushes the left side of toggle button 148 and to rotate right the user pushes the right side of button 148. To tilt gaze upward and downward the user pushes on the front an rear portions of button 148, respectively.

In FIG. 8, a user representation is shown at 310 where the representation is shown in a seated position supported by a virtual task chair 304. In this seated view, when the user uses device 24 (see again FIG. 4) to move about or change orientation in the VW, seated representation 310 remains centrally stationary in the view as the perspective views presented change to reflect the changing viewpoint in the VW. A circular target icon 288 is presented in front of representation 310 to indicate a central location in the set of instantaneously presented VW views. When representation 310 is in the sitting position as shown in FIG. 8, target icon 310 is directly in front of the user representation 310 as shown.

In addition to the VW representations as shown, view 268 also includes a top plan view or VW map representation 274 that includes a perspective arrow icon at a specific location on a partial 2D top plan view 274 of the VW. As shown, the location of icon 284 indicates the location of the user in the VW and the arrow 284 indicates the current user VW orientation. Where the user rotates in the VW, in addition to changing the VW view presented, arrow icon 284 also rotates to indicate the new orientation.

While it is contemplated that in at least some systems a user will only be able to visually experience affordance configurations within a VW and will not have the ability to edit the VW configurations or to obtain additional information about the affordances represented in the VW, in other cases, system 10 may facilitate many different VW control functions enabling a user to exercise much more control over her VW experience and much more access to affordance and configuration information. In cases where a user has more control and access capabilities, in at least some embodiments the control and access tools may be minimized most of the time so that, while accessible, those tools are hidden until needed so that the immersion effect of the system can be optimized without cluttering system emissive surfaces 26a, 26b and 26c with information that is not instantaneously necessary. To this end, in at least some embodiments a minimal control tool field 276 as shown in FIG. 8 may be provided along a lower or upper edge of a VW view. Where station 14 includes three display screens or emissive surface 26a, 26b and 26c, in at least some cases, the tool field will be presented in the lower left hand corner of the central surface 26b (see 276 in FIG. 3) so that the tool field is at a location easily perceived by and accessible to a user.

The exemplary tool field 276 includes an "Edit" option and a "Menu" option associated with indicators 278 and 280, respectively. Referring again to FIG. 4, herein it will be assumed that left and right buttons 151 and 153 are selectable to select the Edit and Menu options, respectively. Once one of options is selected, an indicator icon 278 or 280 associated with the selected option may be highlighted, illuminated or otherwise visually distinguished to indicate that a tool option has been properly selected.

When menu option 280 is selected, a list or menu of control options and designated controller device buttons associated with those options as shown at 273 in FIG. 9 may be presented. Hereinafter, unless indicated otherwise, option lists that present controller instructions as shown at 273 will be referred to as "instruction guides". The exemplary options in instruction guide 273 include a "Sit Down" option selectable via the Y button on controller 24 (see again FIG. 4), and a "Toggle Info" option selectable via button A. Other control options are contemplated and the guide at 273 may include many other options in at least some systems.

In at least some embodiments a user will have the option to assume a seated view of the VW as shown in FIG. 8 or a standing view as shown in FIG. 9 where a user representation as at 310 is presented in the seated view and no user representation is shown in the standing view. The standing view is raised within the VW representation to a height that simulates a vantage point at the height of a typical user (e.g., 6 feet). By selecting the Y button on device 24, the user's VW viewpoint changes from standing (see FIG. 9) to seated (see again FIG. 8) and the label at 297 in FIG. 9 would change to "Stand Up" as opposed to "Sit Down" to indicate that a next selection of the Y button will cause the viewpoint to again change to a standing vantage point.

As indicated above, in at least some embodiments a user will be able to access additional information about affordances presented within a VW representation. For instance, referring again to FIG. 9, in at least some embodiments a user can use target icon 288 to select an affordance that appears within a VW view. For instance, in some cases a user can manipulate the VW view until target icon 288 subtends (e.g., intersects at least a portion of) a VW affordance. To help a user target a specific affordance in a VW view, when icon 288 subtends an affordance, the affordance may be highlighted or otherwise visually distinguished within the view. Here, as different affordances are subtended by icon 288 during VW movement, only one affordance, the subtended and instantaneously targeted affordance may be highlighted.

In at least some cases there may be no control or informational feature associated with one or more VW representations and in that case when targeting icon 288 subtends the representation, the representation will not be highlighted or distinguished in any fashion. For instance, wall or window fixtures that define a VW space may be unchangeable and may not have any related descriptive information. In this case, when icon 288 subtends a wall fixture, the wall may not be visually distinguished to signal to the user that there are no information access or control functions associated therewith.

Figure 11:
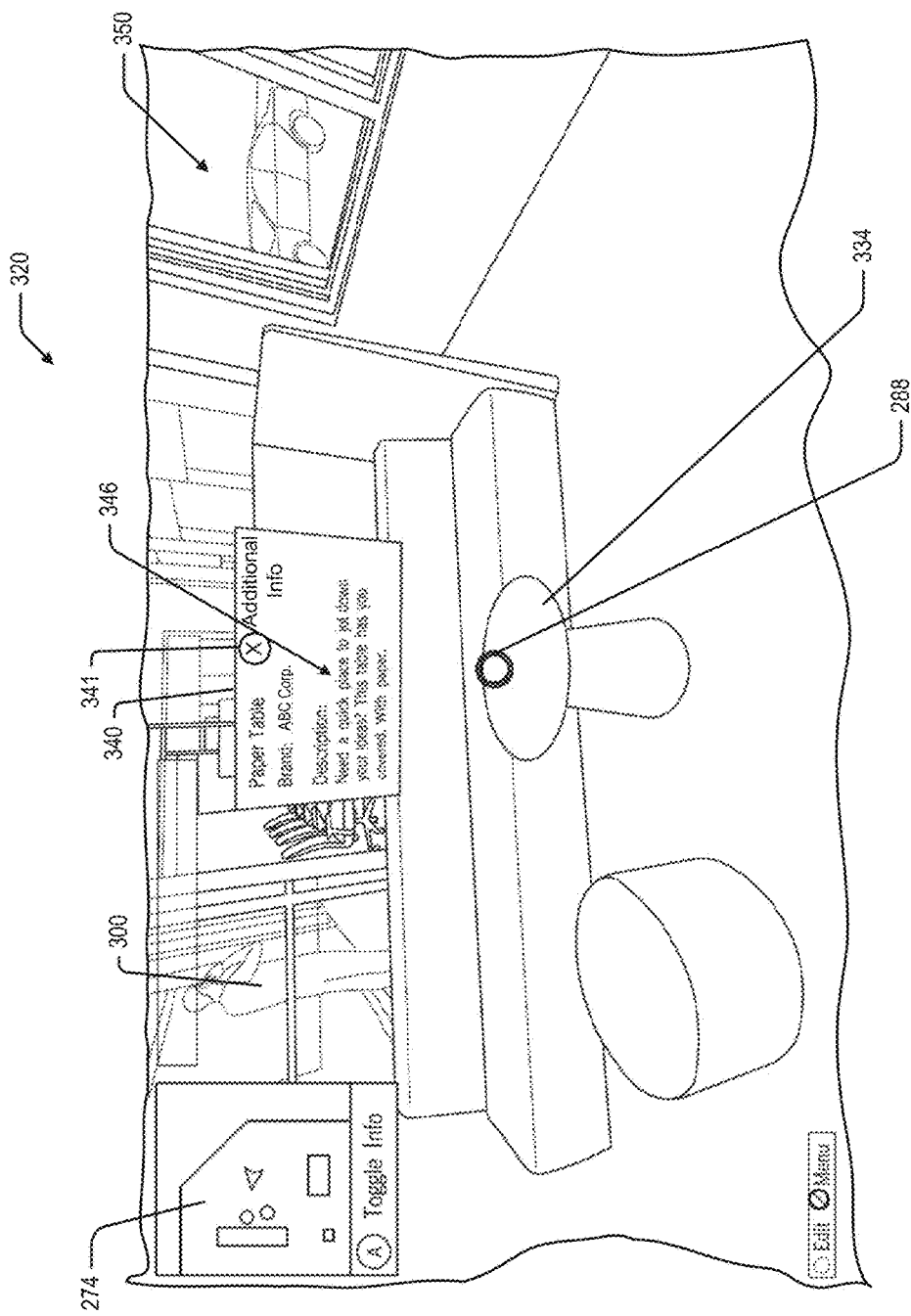
FIG. 11 is a VW view where a pop up window has been toggled open to access text information that describes a selected affordance in the VW representation.

With an affordance targeted via icon 288, a user may select a toggle information option 299 by pressing the A button (see again FIG. 4) on controller device 24 to access at least one and in many cases various types of information associated with the targeted affordance. To this end, see FIG. 11 where target icon 288 has been used to select a paper table affordance 334 causing server 12 to open up a hovering information window 340 proximate the table affordance instance 334 within the presented VW view. The exemplary information window 340 presents at least a subset of the non-visual affordance information from the affordance sub-specification 382 (see again FIG. 10) for user consideration. The exemplary information in FIG. 11 includes affordance name and brand information along with a general marketing description (see 346) for the affordance. After window 340 is opened, a next selection of the controller button A while affordance 334 is targeted causes window 340 to toggle closed.

Figure 12:
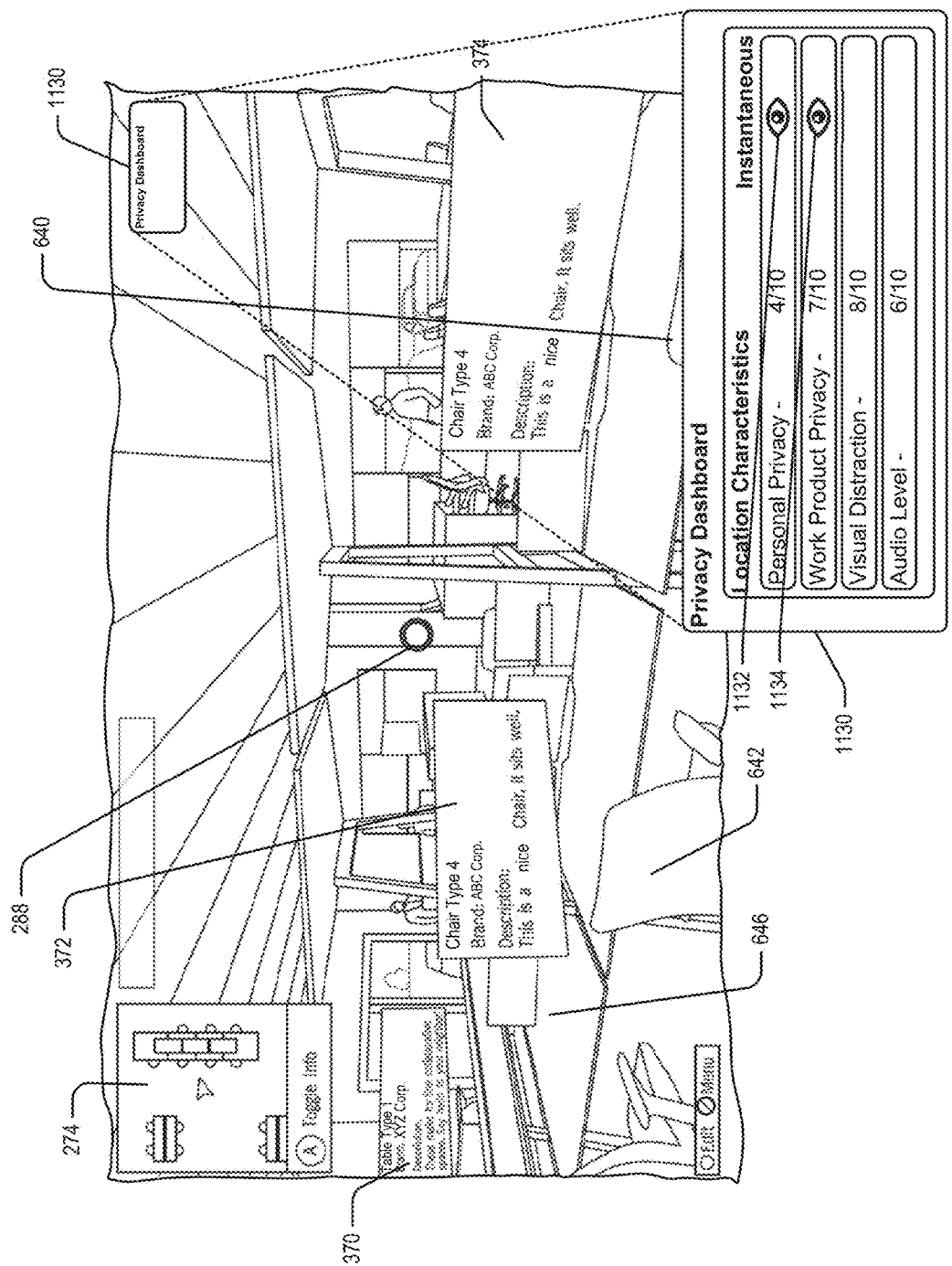
FIG. 12 is a VW view that shows several pop up windows with affordance information presented as well as a privacy dashboard that is consistent with at least some aspects of the present disclosure.

In some cases a user may want to open more than one information window at a time within a VW to examine non-appearance information for two or more affordances in a VW representation at the same time. In at least some cases multiple information windows may be simultaneously opened by repeating the affordance targeting and toggle information selection tasks for several affordances prior to closing previously opened information windows. To this end, see FIG. 12 where a user has separately targeted three different affordances in a VW view and opened a separate information window 370, 372, 374 for each of the three targeted affordances.

In other embodiments the information toggling option may be presented to a user in a different fashion. For instance, once an affordance is targeted via a targeting icon 288 as in FIG. 13, the letter "A" may be presented in the target icon as at 402 inviting the user to select the A button on the controller 24 to access additional information about the targeted affordance. Again, when the A button is pressed, server 12 presents an information window 400 including information about the targeted affordance.

Figure 13:
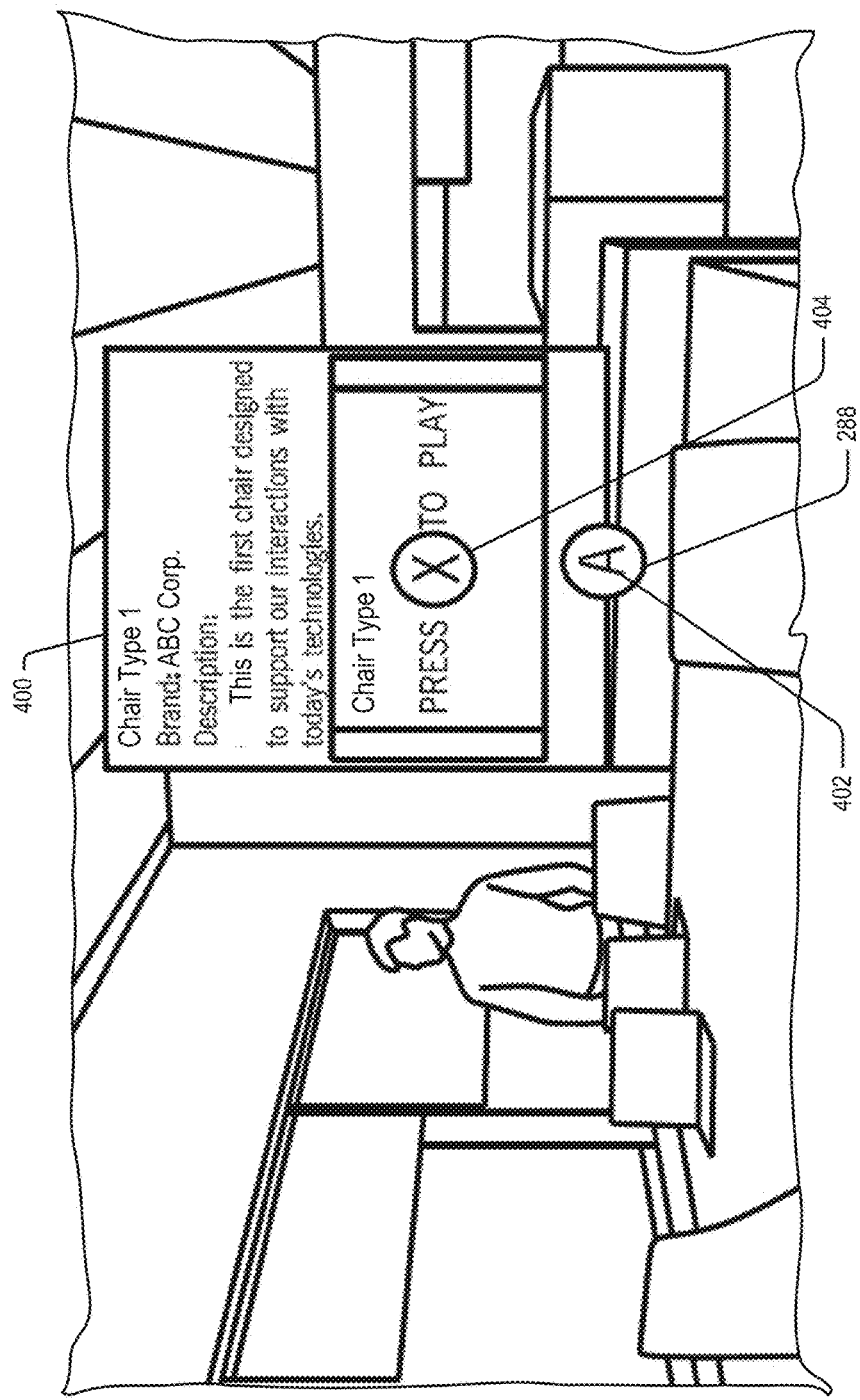
FIG. 13 is a VW view that includes a pop up window including a video play option for presenting a video clip associated with one of the affordances included in the VW view.

The types of information presented within an affordance information window (e.g., 400) may be a function of the type of information in database 192 associated with the affordance type. Thus, for instance, where one or more videos are stored in database 192 or a specific affordance type, an information window for the affordance type may include an option and controls for playing at least one and perhaps any of the stored affordance videos. To this end see, for instance, the X button invitation at 404 in FIG. 13 inviting a user to play a video associated with a Chair Type 1 chair. In FIG. 13, a second selection of the A button on a controller 24 while the affordance related to window 400 is still targeted would close window 400 in a manner similar to that describe above.

Other non-appearance information stored in affordance sub-specification 382 in FIG. 10 may also be presented via an information window and which information is presented is, in at least some cases, a matter of system designer choice. In some cases an information window may include an additional controller instruction (see 341 in FIG. 11) indicating how an employee can access additional non-appearance information associated with a targeted affordance. For instance In FIG. 11, the additional information may include price information, complimentary affordance information, etc.).

In at least some embodiments, system 10 may enable a user to make at least some edits to the VW configuration to modify the experience related thereto. VW edits are stored as changes to one or both of the space layout and affordance preferences that define a VW and ultimately as a modified or updated 3D VW dataset 200 as shown in FIG. 6 that drives the VW views on surfaces 26a through 26c. VW edits may include, for instance, simply moving one or more VW affordances to different locations within the VW or reorienting one or more affordances within a VW. Other edits may include selecting different affordance attributes for affordances that have more than one optional attribute value. Still other edits may include swapping an instance of a first affordance for an instance of a second affordance or swapping one configuration typical for another configuration typical. In particularly useful embodiments a user may even be able to modify VW fixtures (e.g., walls, windows, doors, etc.) to experience effects associated with changing a general space definition in which affordances and typicals reside. For instance, a user may be able to add three new windows to a conference space to sense how those changes would affect user experience within the conference space.

To access VW editing tools, in the illustrated example, a user selects the left button 151 on the controller 24 shown in FIG. 4 and server 12 highlights the edit indicator 278 as shown in FIG. 14 and provides an edit command menu or instruction list at 420 (see FIG. 14). The instruction list 420 includes three instructions including an "Edit Item" instruction associated with the A button, an "Edit Scene" instruction associated with the B button and an "Edit Environment" instruction associated with the X button. In general, buttons A, B and X are selectable by the user to access different editing functions associated with specific VW affordances, globally with respect to the affordances presented in the VW and with non-affordance characteristics exist within the simulated VW representation, respectively. For instance, to modify any aspect of a specific VW affordance representation a user will select the A controller button and to modify aspects of VW affordances globally the user selects the B controller button. Exemplary environmental characteristics that may be modified include, among others, a time of day which can affect the amount of natural light that enters a VW space through exterior windows as well as the amount of ambient noise expected within the space, a geographic location of a VW facility presented via the system which again can affect expected natural light, a number of employees that are expected to use a VW space, etc.

Figure 15:
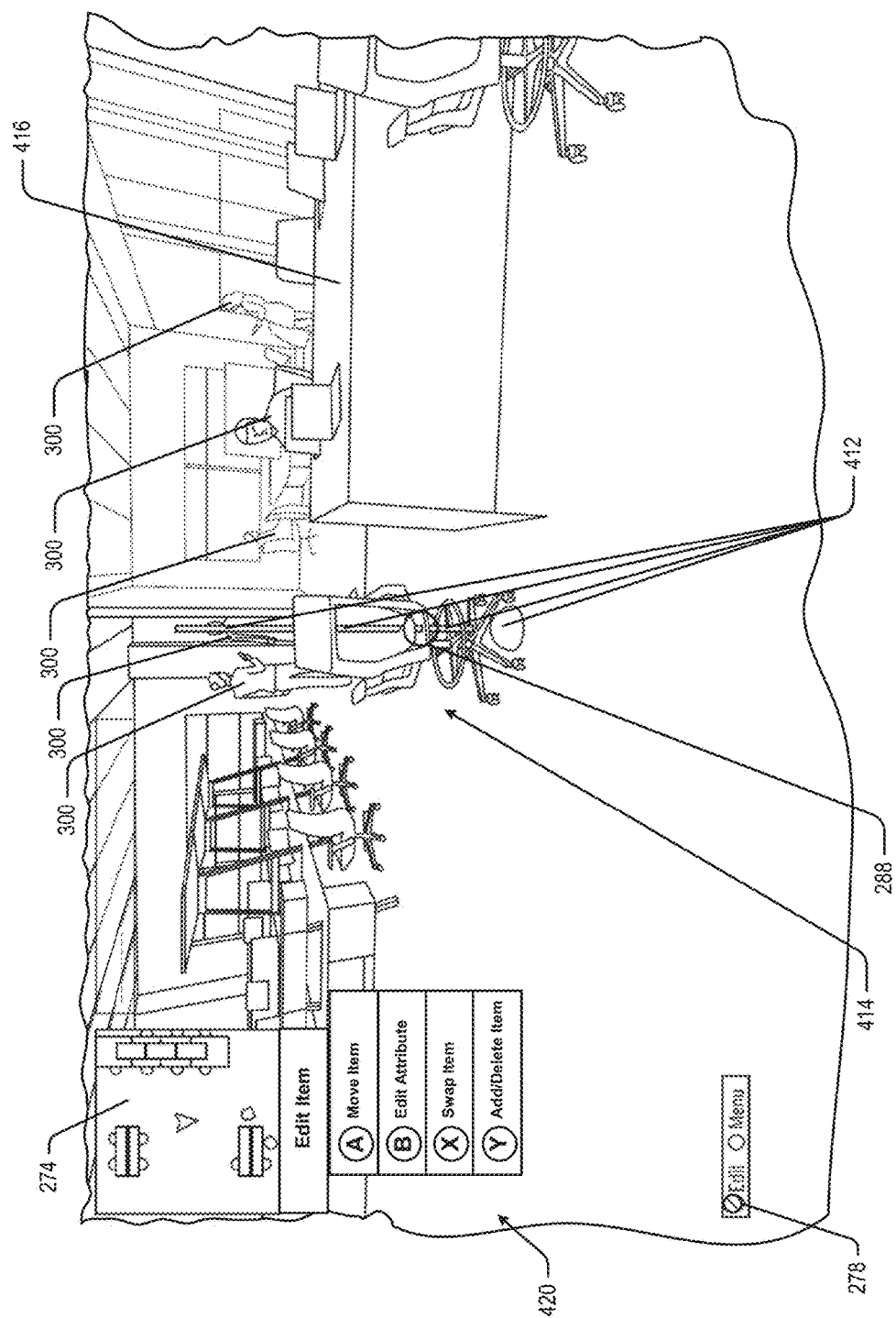
FIG. 15 is a VW view that shows one affordance that has been selected for editing within the VW representation.

Referring again to FIG. 14, to change some aspect of a specific affordance (e.g., an "item") that appears in a VW, a user selects button A as instructed at 420. Upon button A selection, instruct guide 420 is updated as shown in FIG. 15 to include edit options associated with a specific VW affordance. The updated instruction guide includes a "Move Item" instruction associated with the A button on controller 24, an "Edit Attribute" instruction associated with the B button on controller 24, a "Swap Item" instruction associated with the X button on controller 24 and an "Add/Delete Item" instruction associated with the Y button on the controller 24. In some cases where one or more of the edit types indicated in FIG. 15 cannot be performed for a specific affordance instance selected, the edit options in instruction guide 420 may be automatically abbreviated or visually distinguished to indicate that they cannot be selected for some reason. For instance, if a selected affordance has predefined attributes that cannot be changed in any way, the "Edit Attribute" option may not be included in guide 420 or may be visually distinguished to indicate inability to select.

In some embodiments a system may allow only limited user edits to the VW. For instance, in some cases a system may limit a user to changing only the locations and/or orientations of at least a subset of affordances presented in a VW view. For example, in some embodiments a user may only be able to move the virtual representation of any affordance in the VW that is easily moveable within the real world in ways that mimic real world movements. Here, easily moveable affordances may be limited to affordances that have been designed to be easily moved within the real world such as, for instance, any affordances that are mounted on casters or wheels. Thus, in this case, while a large conference table may be moveable within a VW space, if the table does not include casters, the table would not be moveable within the VW. In contrast, a task chair that is castered would constitute an easily moveable affordance.

To make any edit on a VW affordance including moving the affordance in a VW representation (e.g., changing location and/or orientation), first the affordance needs to be selected. In at least some cases an affordance will be selected for movement using targeting icon 288 followed by selection of the A button on the controller device 24 as instructed at 420 in FIG. 15. Upon selecting button A, in addition to changing the visual appearance of the selected affordance (e.g., yellow highlighting indicating a targeted affordance may be changed to green) and modifying the information guide 420 to indicate that the "Move Item" option was selected (e.g., in FIG. 15 that the "Move Item" option may be highlighted), in at least some embodiments, server 12 may add an affordance axis 412 to the selected affordance that passes generally centrally through the selected affordance as shown in FIG. 15. Here, movement or rotation actions cause movement of axis 412 horizontally through the CW representation or rotation about axis 412 and the associated affordance 414 follows accordingly.

In addition, in at least some embodiments, upon selecting button A to indicate that a targeted affordance is to be moved within the VW, the user's perspective with respect to the affordance to be moved may be changed so that the perspective is optimized given the location and orientation of the affordance within the VW. Thus, for example, referring again to FIG. 9, assume that a user selects chair affordance 282 to move within the VW where the chair affordance is represented as shown in FIG. 9 from a side front perspective trajectory when selected. Here, upon receiving an indication that affordance 282 is to be moved, the user's perspective with respect to affordance 282 may be automatically altered by server 12 to be from behind the chair as shown at 414 in FIG. 15. This perspective on the chair and the VW provides a perspective that seems natural to a user when moving a chair within a VW as it simulates a sense of driving the chair within the VW representation. In the case of other types of affordances such as for instance, a desk or a table, driving perspectives automatically presented for moving those affordances about is the VW representation may include, for instance, a position immediately adjacent an edge of a work surface or table top. In at least some cases, after an affordance is moved to a desired VW location and orientation, the perspective presented to the user may revert back to the pre-move perspective, albeit with the moved affordance in its new location and orientation. Here, moves from an instantaneous perspective to a driving perspective and then back to a pre-move perspective may be animated so that the user perceives a smooth transition between the different perspective views in the VW.

Referring again to FIG. 4, in at least some embodiments, joy stick 144 may be used to move affordance 414 to different locations in the VW and button 148 may be used to rotate affordance 414 about axis 412 when desired. Thus, for instance, a user may move chair affordance 414 from the location illustrated in FIG. 15 to a location adjacent a table affordance 416. Once moved, in at least some embodiments affordance 414 will remain at the new location and in the new orientation until the user performs another movement control sequence. Then, with the affordance in a new location, the user may exit the edit operating mode and perform other system supported functions like moving about within the VW to change perspective and the newly located affordance would appear fully integrated into the VW at the new location.

In cases where a user can only move easily moveable affordances within a VW, the VW reflects real world limitations and therefore presents a particularly real life experience to the user. A system that limits edits to movement of easily moveable affordances may be particularly useful where a VW designer only wants reaction from a user experiencing a specific VW configuration as opposed to reactions to many different VW configuration options.

In other cases a user may be able to move any affordance or configuration typical within a VW representation where the move is not rendered invalid by some other VW limitation. For instance, one VW limitation may be that an affordance cannot be moved to a location where that affordance would interfere in 3D space with some other affordance that currently occupies that space. As another instance, another VW limitation may allow a task chair that is included in a large conference room typical to be moved about within a VW space associated with the conference room disallow movement of that chair out of the conference room into a different VW location that is not associated with the conference room. Thus, this limitation would prohibit moving a table affordance into a space where one of the components of the table occupies the same space as a task chair. Many other VW limitations that may restrict movement of affordances in the VW are contemplated. Here, all affordances, whether castered or not, could be moved about within the VW space subject to the limitations as described above.

In still other cases, a user may be able to move any affordance or configuration typical within a VW representation even if the movement would result in an invalid condition (e.g., affordances that overlap in space) and server 12 may be programmed to modify the configurator to accommodate the new affordance location. For instance, here, where a task chair is moved to a location at least partially occupied by a VW table, server 12 may recognize the invalid condition and, instead of disallowing the chair movement, simply move the VW table to accommodate the chair's new location.

Figure 16:
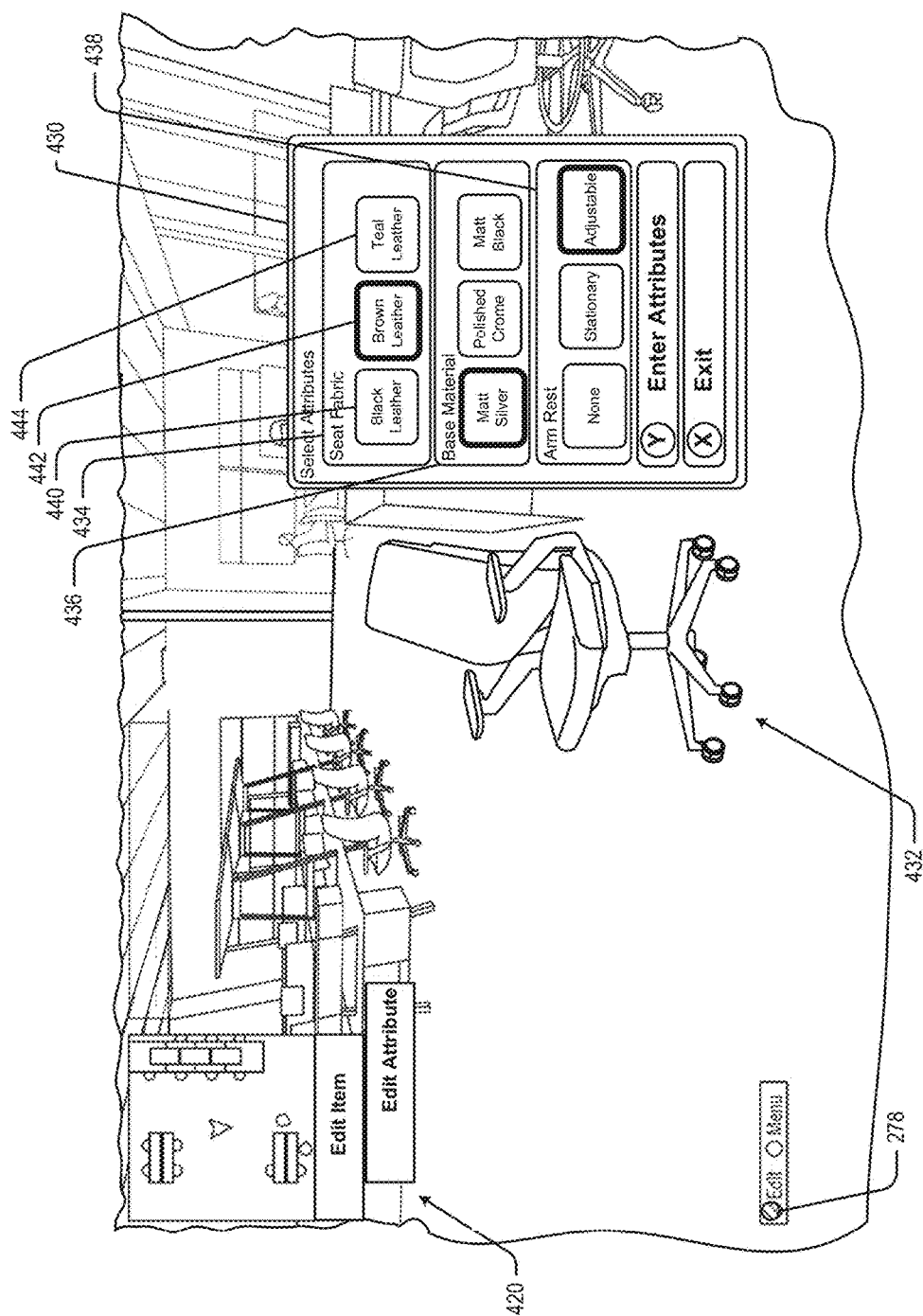
FIG. 16 is a view akin to the FIG. 14 view, albeit where a pop up window allows a user to edit various attributes of a selected VW affordance.

Referring again to FIG. 15, to edit an attribute, after icon 288 is used to target an affordance, a user presses the B button on controller 24 as instructed at guide 420. Referring also to FIG. 16, in response to selection of the B button, server 12 minimizes other item edit options in guide 420 (e.g., removes those options so that only the selected "Edit Attribute" option is presented in guide 420) and opens up an edit window 430 useable to edit attributes of the selected affordance. In addition, server 12 may automatically move the selected affordance into an optimized perspective view or "edit view" for editing where affordance features or attributes that change with appearance edits are relatively easy to view as shown at 432. In at least some cases the edit view will include a central location on the central emissive surface 26b where the selected affordance to be edited may be increased in size so that edits can be better perceived by the user as they occur.

In at least some cases where an edit view is presented, instead of moving the affordance to be edited into an edit view as shown at 432, the user's perspective on the affordance to be edited may be automatically changed so that the affordance appears as indicated at 432 on the emissive surface within the VW representation. In other words, the user's perspective would change to represent the affordance to be edited in an edit view as opposed to the affordance being effectively extracted from the VW and represented in the edit view as in FIG. 16. Here, where the user's VW perspective is modified, the modification may be animated so that the user experiences a smooth transition within the VW to the new perspective. Similarly, where the affordance to be modified is moved into the edit view as in FIG. 16, the movement may be animated so that the user perceives a smooth transition.

In addition to causing an affordance to be edited to be presented in an edit view, server 12 may also change the appearance of the VW representation behind the edit view to further distinguish the affordance being edited from other VW affordances. For instance, the brightness of the VW representation behind view 432 may be reduced to further highlight view 432 as being instantaneously edited.

Once affordance attributes have been modified as desired by the user, the user's perspective view may be changed back to the pre-edit perspective. Similarly, where the affordance was moved to the edit view to edit, the affordance may be moved back to the pre-edit location and orientation within the VW automatically once attribute editing has been completed. In each of these cases, the perspective view change or the replacement of the affordance in the pre-edit location and orientation may be animated.

Referring still to FIG. 16, the attribute selection window 430 includes an exemplary set of attribute fields where each field includes a list of attribute options or values that may be selected by the user. For instance window 430 includes three attribute fields 434, 436 and 438 associated with a seat fabric attribute, a base material attribute and an arm rest attribute, respectively. Each attribute field includes a separate value field for each option related to an associated attribute. Thus, for instance, the value fields in attribute field 434 include a "Black Leather" field 440, a "Brown Leather" field 442 and a "Teal Leather" field 444. While only three fabric options are shown in FIG. 16, in most cases many other options would be presented. While each value field includes a text representation of an associated option value, in most cases instead of text or in addition to a text representation, the field would also include a visual representation of a material or fabric swatch associated therewith. Where attribute options can be presented graphically, in at least some cases the options may be expressed graphically. For instance arm rest options in field 438 may be shown graphically.

Referring still to FIG. 16, in at least some embodiments a currently selected option value will be highlighted within field 434. For instance, as illustrated, the "Brown Leather" field is highlighted at 442 in FIG. 16 indicating that the currently selected fabric options is brown leather. In at least some embodiments selection of a different fabric may include simply moving the highlight icon from one option field to another until a desired fabric is selected. Thus, for instance, referring again to FIG. 4, with window 430 presented via an emissive system surface, a user may use joy stick 144 to move from one option field to the next until an optimal fabric field is indicated by the highlight 442. To move to a next attribute field (e.g., field 436 in FIG. 16), the user may use joy stick 144 to move down into field 436 where the base material option can be changed if desired.

As different affordance attributes are highlighted in window 430, in at least some cases those changes may be immediately reflected in the affordance shown in the edit view at 432. Thus, for instance, where the fabric option is changed from brown to teal in field 434, the fabric option shown on the affordance in edit view 432 may likewise be changed. Once preferred affordance option values have been selected, the user may select the Y button as instructed near the bottom of window 430 to close out the attribute editing window 430 and submit or enter the attribute values selected to the system server for updating the VW representation. If affordance 432 was automatically moved from a current location to the edit view 432 when the edit attribute option was selected, upon closing window 430, the affordance representation may be moved back to its pre-edit VW location in at least some embodiments. If the user determines that she does not want to edit the affordance attributes, she can simply select the X controller button as instructed at the bottom of window 430 to close window 430 without editing the affordance attributes causing the server to revert back to presenting the guide 420 shown in FIG. 14.

In some embodiments a user is able to swap one affordance for another affordance within a VW representation. For instance, a user may want to swap a second task chair of a second type for an instance of a first task chair type in a VW. To swap a task chair of a second type for an instance of a first type, a user can target the instance of the first chair in the VW using targeting icon 288. Once icon 288 subtends an affordance to be swapped out, referring again to FIG. 15, the user may select the X button on controller 24 as instructed by guide 420 (see FIG. 17). In at least some cases when the X button is selected to swap affordances, the guide 420 may gain be modified to eliminate the other item edit options and leave only the "Swap Item" selection as indicated in FIG. 17 and the selected affordance may again be moved to an optimized edit view as shown at 458 (e.g., a central location on the central emissive surface 26b) and may be increased in size to present a better view of the selected affordance to the user.

In addition, once button X is selected, server 12 generates an interface window 450 as shown in FIG. 17 including tools for selecting a different affordance to be swapped for the selected affordance. To this end, see the exemplary affordance selection tools shown in window 450 including first and second selection fields 452 and 454 that include first and second affordance subsets that are supported by the system 10. In most cases when an affordance within a VW is to be swapped out for another affordance, the affordance to be swapped in is of the same general type as the affordance being swapped out. Thus, for instance, when a chair affordance in a VW is being replaced, the affordance being swapped in is typically a different type of chair affordance. For this reason, when the swap item option is selected, in at least some embodiments, the system server will search the affordance database 192 (see again FIG. 10 and specifically the affordance type field 386) for all affordances supported by system 10 of the same general type and will present the list of similar type swappable affordances to the user in field 452. Other affordances that may be swapped for the selected affordance but that are of a different type are presented in second selection field 454.

An image of the currently selected affordance type is initially highlighted or otherwise visually distinguished in field 452 as indicated at 456 so that the user knows the current affordance type. Using controller 24, the user can move though the affordance options causing the highlight box 456 or some other distinguishing visual characteristics to move within the window to indicate a currently selected affordance to be swapped for the selected affordance. As the highlight box is moved about, the affordance representation at 458 may be changed in real time to reflect the currently selected affordance type and to allow the user to see the visual characteristics of that affordance. Once a desired affordance to swap into the VW is selected, the user can submit the selection and close window 450 by selecting the Y button on controller 24 as instructed in the lower right corner of window 450. Again, where the affordance was moved to the optimal editing location when selected to be swapped, the new swapped in affordance may be automatically moved back to the original location of the swapped out affordance.

In at least some cases some affordances may not be able to be swapped into a VW for another affordance for some reason (e.g., different dimensions, incompatible affordance features, etc.). Here, the list of affordances presented for swapping in window 450 may automatically be limited to options that can be selected given the affordance to be swapped out. Thus, where a chair affordance that is located in a small space with a VW is selected to be swapped out, when searching the affordance databases (see again FIG. 10) for affordances that can be presented as swappable options, system server 12 may examine the affordance dimensions in field 379 and limit options to only affordances having dimensions that fit within the space of the chair being swapped out. Similarly, some system rules may specify incompatible affordances such as a stool height chair being incompatible with a standard height conference table and affordance options for swapping in may be limited accordingly.

In still other cases, while not shown here in detail, in at least some cases users may have employer specific limitations that operate to restrict user options for at least a subset of affordance options. For instance, a first employer that employs a first user may limit task chair options to include only first and second chair options for some reason. As another instance, the first employer may limit chair options by some other parameter such as maximum cost for each chair and chair options presented via field 452 may be limited by maximum cost (e.g. any chair may be selectable that has a total cost under $800). Many other employer specific option limitations may be specified and used to limit options presented to a user.

In at least some cases an employer may specify global attributes for an entire facility configuration or, for instance, for every facility associated with the employer. For instance, in some cases an employer may specify that all affordances that include exposed wood components must have a chocolate brown semi-gloss finish and that all task seat fabrics must be teal regardless of whether the fabric is leather, woven or some synthetic material (e.g., a simulated leather material). In this case, all swappable affordance options presented in window 450, in at least some cases, may be presented with an appearance that is consistent with at least one subset of selectable options. For example, where all chair fabrics must be teal, each chair representation in field 452 would be shown with teal fabric applied.

In cases where an affordance to be swapped out of a VW is associated with a first option combination, when a second an affordance to be swapped into the VW is capable of having a similar first option combination, the swapped in affordance will, at least initially, be swapped in with the first option combination. For instance, where each of a first task chair being swapped out of a VW representation and a second task chair being swapped into the VW representation may have fabric of any of ten different colors and arms or no arms, but the first chair is currently associated with a first of the ten colors and has arms when swapped out for the second chair, the second chair will be presented with fabric of the first color and with arms which can be changed via the "Edit Attribute" option (see again 420 in FIG. 17) thereafter if desired.

Referring again to FIG. 16, where an employer has limited attribute options that a user may select from, as in the case of the server 12 limiting swappable affordances to employer limited options, the attribute options presented in window 430 would likewise be limited.

Referring yet again to FIG. 15, to add or delete an affordance to or from a VW representation, a user selects the "Add/Delete option via button Y on controller 24 as indicated by instruction guide 420. Here, prior to deleting an item, a user needs to indicate which item to delete. A VW affordance to be delete can be selected via targeting icon 288 as described above. Once a target is selected to be deleted, upon selection of the Y button (e.g., the "Add/Delete Item" option in FIG. 18), server 12 presents an interface window 470 as in FIG. 18 that gives the user several options. Exemplary options include, among others, the A controller button option to delete the selected affordance. As in the case of other item edit options described above, when the Add/Delete option (e.g., button Y) is selected after an affordance is selected via icon 288, the selected affordance may be moved to an edit view (e.g., central and enlarged on the central emissive surface 26*b* in some cases) for consideration. Again, instead of moving the selected affordance, the user's perspective may be automatically changed to that shown in FIG. 18 at 478.

Figure 18:
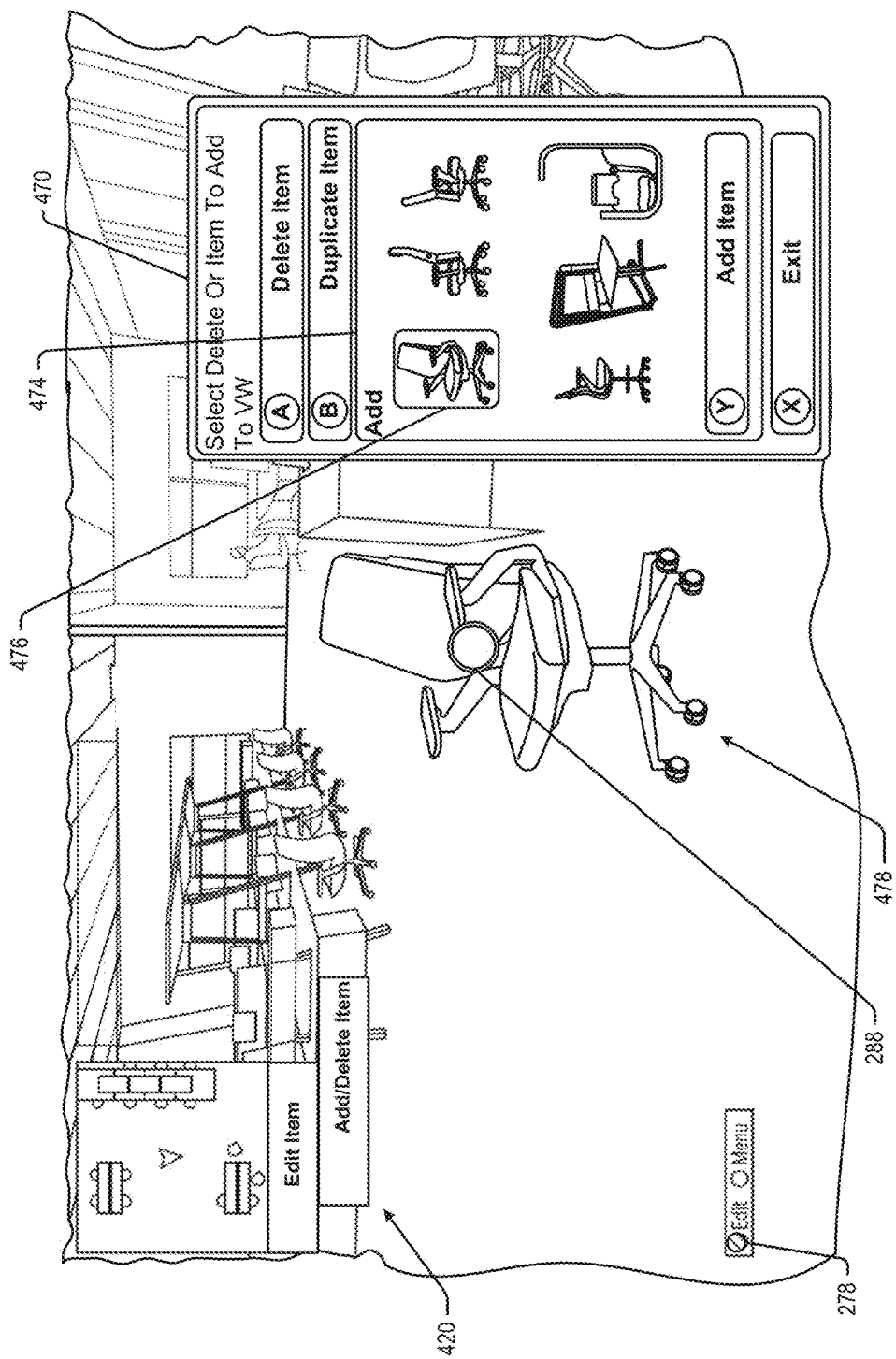
FIG. 18 is a view akin to the FIG. 17 view, albeit where a pop up window allows a user to add an additional instance of several different affordances to a VW representation.

In cases where the user want to add an affordance to the VW instead of deleting an affordance, where an affordance is selected via targeting icon 288 prior to selecting the Add/Delete Item option, another option presented in window 470 may include a "Duplicate Item" option associated with controller button B as instructed in window 470 in FIG. 18. Here, selection of the B button option creates a duplicate instance of the affordance previously selected and currently presented in edit view 478.

Regardless of whether or not icon 288 is used to target an affordance instance in a VW representation prior to selection of the Add/Delete Item option, selection of the Add/Delete Item option (e.g., controller button Y) may open a window 470 that includes the Add field 474 including a graphical or other (e.g., text) representation of other affordance options that may be selected by the user to add to the VW representation. In FIG. 18, a user may move affordance selection box 476 about to select any presented affordance option after which another selection of the Y controller button adds an instance of the selected affordance to the VW representation ad indicated by the instructions near the bottom of window 470. Thus, icon 288 may simply be aimed at a wall, window or other fixture and non-affordance representation in a VW and therefore not be targeting a specific VW affordance when the Y button is selected and the add affordance option would still be presented as at 474. Here, the delete and duplicate options may not be provided in window 470 or otherwise may be visually distinguished (e.g., grayed out) to indicate inability to select those options where icon 288 does not target a specific affordance in the VW space. Again, an exit button X may be selected to close window 470 if the user decided not to add an additional affordance to or delete an affordance from the VW representation.

In at least some embodiments, server 12 may enable a user to globally edit or modify affordances and/or attributes within a VW representation. For instance, in some cases a user may want to change all task seat fabrics from a currently selected brown to a preferred teal color. As another instance, a user may be considering first and second different color schemes for a facility configuration where many different affordances within a configuration have one or more attributes that will be affected by which color scheme is selected. As yet one more example, a user may be trying to decide between two different types of task chairs to be included throughout a VW. Here, instead of requiring a user to go through a VW configuration affordance instance by affordance instance to modify optional attribute values or change affordance options, the system may allow a user to specify materials, colors and other affordance characteristics and/or preferred affordances once for each scheme and server 12 may be programmed to ripple preferences through the VW dataset anytime the user switches from one global affordance or attribute to another. To this end, see again FIG. 14 where instruction guide 420 includes the "Edit Scene" options selectable via the B controller button.

Figure 19:
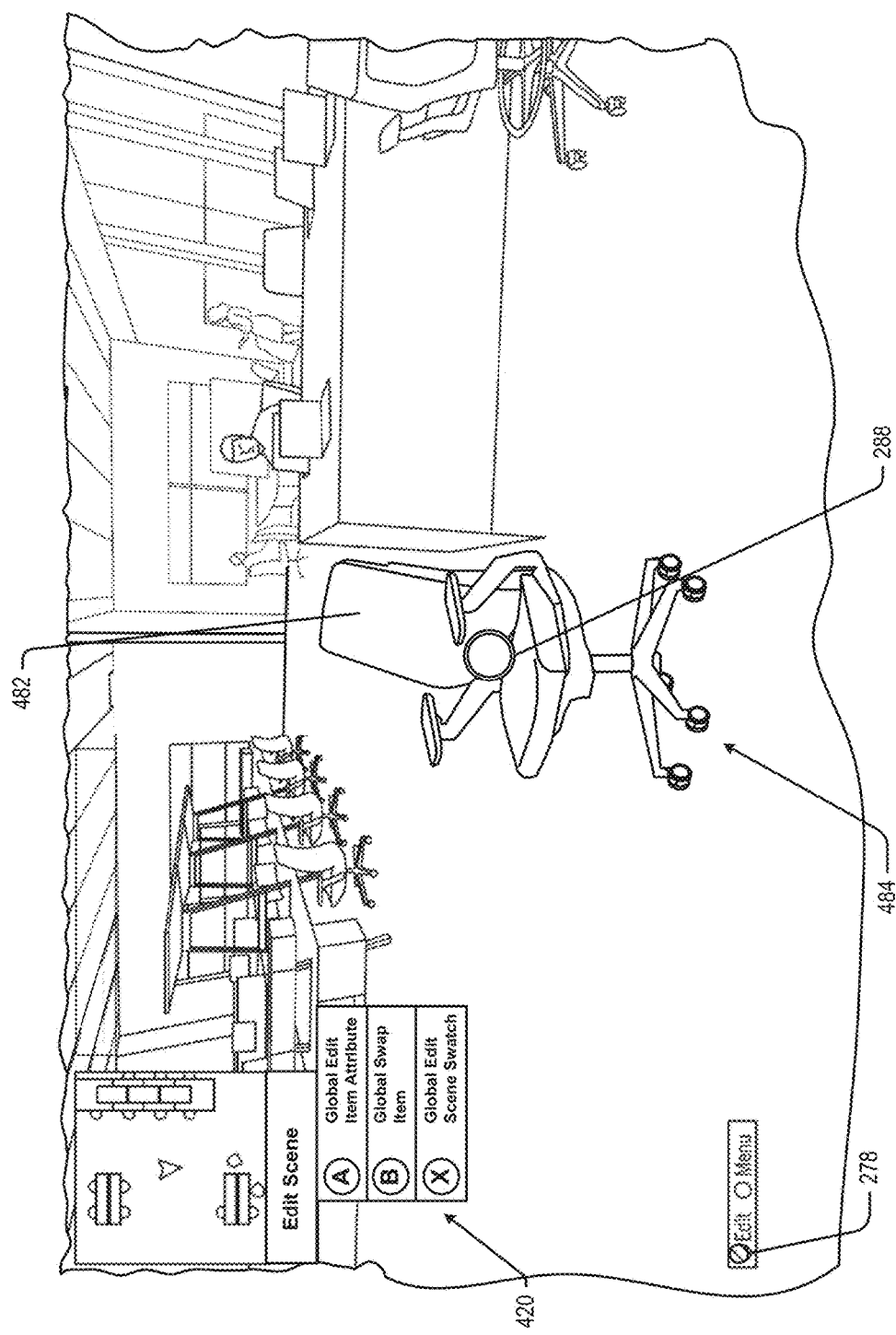
FIG. 19 is a view similar to the FIG. 18 view, albeit where s scene editing menu is presented that indicates, different tools useable to globally edit various aspects of a VW representation.
Figure 20:
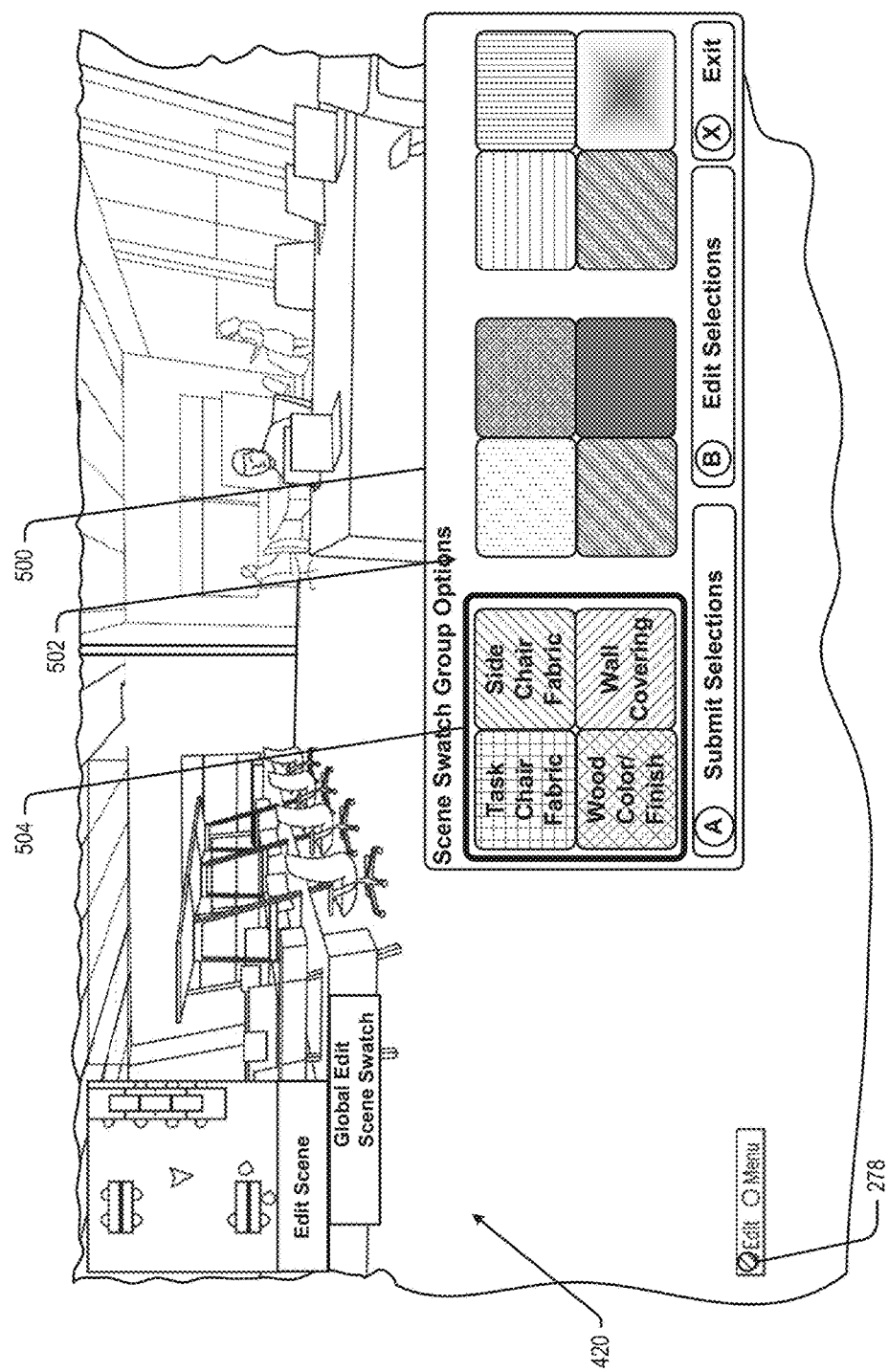
FIG. 20 is a VW view where a pop up window allows a user to select different swatch group options to change the overall appearance of the VW view and experience.

In at least some cases, even where a VW is going to be globally modified, a user will experience an attribute to be modified or an instance of an affordance that should be globally changed within a VW representation. For this reason, in at least some embodiments, the scene editing function will require a user to work through an affordance instance within the VW to access global change tools. For instance, in FIG. 19 where a user experiences a task chair in the VW that has brown fabric and intends to globally change the task chair fabric color to teal, targeting icon 288 may be used to target an instance of the chair including brown fabric after which the "Edit Scene" option (e.g., button B) is selected in FIG. 14. In FIG. 19, a chair representation is shown in an edit view 484 after selection of the Edit Scene option in FIG. 14 along with a set of global editing options as shown in instruction guide 420. The global edit options include options similar to a subset of the options shown in FIG. 15 including an "Global Edit Item Attribute" option associated with controller button A and a "Global Swap Item" option associated with controller button B. Another option in guide 420 in FIG. 19 includes a "Global Edit Color Group" option associated with controller button X.

While the example above describes a case where a user is required to select an affordance from a VW in order to access global editing tools, in other cases the global editing tools may be accessed in different ways. For instance, in FIG. 14, a user may be able to select the Edit Scene option prior to selecting an affordance from the VW and the system may then require affordance selection thereafter. As another instance, the global editing tools may be accessible without selecting an affordance directly from the VW. For example, in some systems selection of the Edit Scene option may cause a global edit window to be opened up where instances of each affordance within the VW are presented graphically for selection. Here, the most prevalent affordances in the VW may be listed first as those may be the most likely affordances to be modified (e.g., swapped out or changed through attribute modification).

Once an exemplary VW affordance and the Edit Scene option have been selected in some fashion, if the Global Edit Item Attribute option is selected in FIG. 19, an attribute editing window akin to window 430 in FIG. 16 may be presented where a user can use the controller to select desired attributes while seeing changes to the selected affordance in an edit view as shown at 432. Here, because changes to representation 432 are global, those changes may be reflected in real time throughout the VW representation behind view 432 and even within the 2D map view 274 where those changes would be visible in that view.

Referring again to FIG. 19, once an exemplary VW affordance and the Edit Scene option have been selected in some fashion, if the Global Swap Item option is selected, an affordance swapping window akin to window 450 in FIG. 17 may be presented where a user can use the controller 24 to select an affordance to be swapped in for the affordance selected in the VW. Again, the user can move a selection box 452 about to select an affordance option and then select the Y button as instructed at the bottom of window 450 to submit the selection to the server 12. Upon receiving any global change the system server ripples the change through the VW dataset 200 and updates the VW representation to reflect the change substantially in real time.

Referring again to FIG. 19, in some cases system 10 may allow a user to globally change from one material subset to another throughout a VW representation. For instance, where a first material set includes a first task chair fabric, a first side chair fabric, a first wood color/finish and a first wall covering material/color and a second set includes a second task chair fabric, a second side chair fabric, a second wood color/finish and a second wall covering material/color, the user may be able to switch between the first and second sets globally to experience each and establish a good sense of the visual effect of each set. To this end, referring again to FIG. 19, where the Global Edit Scene Swatch option (e.g., button X) is selected, the swatch edit window 500 may be presented via one of the emissive surfaces (e.g., 26b). Here, because the swatch options are related to more than a single affordance type (e.g., more than one task chair type), there is no requirement that a VW affordance be selected prior to changing a selected swatch set.

When the swatch option window 500 is opened, in at least some cases server 12 will attempt to identify a section of the VW representation that is relatively "less interesting" when compared to other sections of the representation in which to open the window 500 so that as changes are made to the swatch selections, the changes can be shown, essentially in real time, within the VW representation. Here, "less interesting" means that the section of the VW has minimal affordance detail. For example, a section of the VW that is essentially open space and that does not include any affordances is optimal for window 500. Where there is no open space that can accommodate window 500, a different space with a relatively small number of affordances may be selected.

Window 500 includes swatch options shown at 502 with a currently selected option box 504 highlighting one of the selected options. Here, as in the examples above, joystick 144 may be used to move selection box 504 about to select different swatch sets or combinations and then a selected option set may be submitted via selection of the A controller button as instructed near the bottom of window 500. Where box 504 is moved from one swatch set to another, the changes in materials associated with the different swatch sets are used to change the appearance of the VW representation essentially in real time.

In at least some embodiments a user may be able to edit at least one of the swatch sets represented in space 502 to reflect personal preferences or to play with options and see their effects on the overall VW representation. To this end, see that window 500 includes an Edit Selections option associated with the B controller button. While not shown in detail, it is envisioned that a user may select the Edit Selections option to edit any subset of the swatches in a currently selected one of the swatch set options (e.g., in the set highlighted by box 504). Again, as swatch options are changed in the selection box 504, the changes would be shown in the VW representation in essentially real time in at least some embodiments.

In at least some embodiments there may be various filters that can be applied to affordance type options and attribute options to limit choices to meet certain requirements. For instance, one filter may include a total cost option where a maximum budget number is associated with a real world affordance configuration which operates as a limit on the types of affordances presented as options when a user is making changes to a VW representation. Thus, for example, if a global change from a first task chair type to a second task chair type would increase a total configuration cost past a maximum budget number, in at least some cases the system would not present the second task chair type as a selectable option for the user during a global swap activity. In other cases the system may present all options but indicate that selection of certain options would result in a final cost number that exceeds the maximum budget number. In still other cases all options may be presented but a subset that would cause cost to exceed a maximum budget number may be visually distinguished to indicate inability to select.

As another example, another filter may be related to the amount of recycled material that is used to manufacture affordances to be included in a VW representation where the server uses recycled material information to limit affordance options and attribute options accordingly. As yet one other example, one other filter may require that each work station be characterized by at least a minimum level of visual privacy. Here, the system may be programmed to limit a user to selecting only options that result in at least the minimum privacy level. Many other option filters are contemplated.

Figure 21:
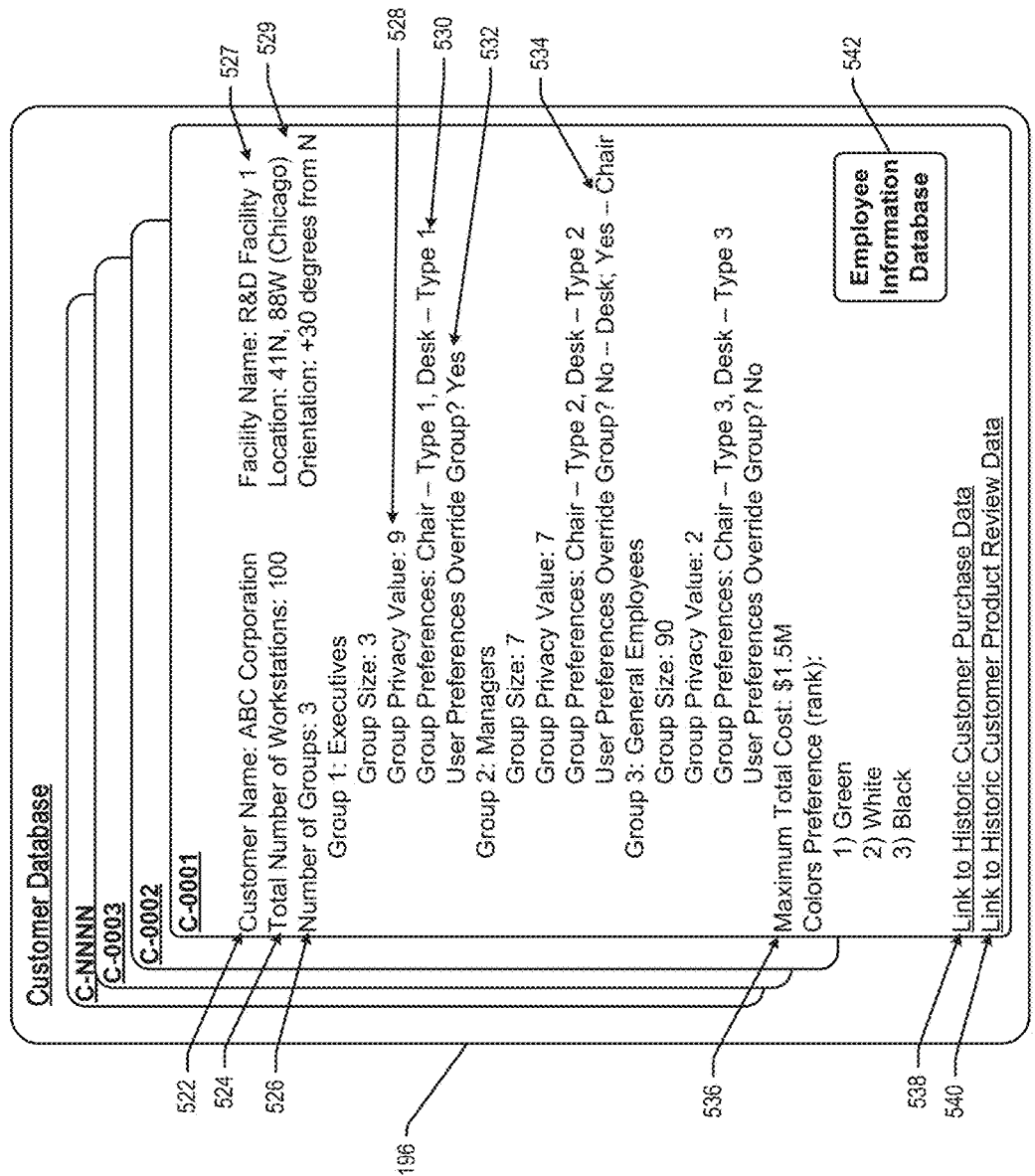
FIG. 21 is a schematic view showing an exemplary customer database that forms part of the FIG. 6 database.

In at least some embodiments customer and customer employee databases may be stored by system 10 that memorialize customer characteristics and preferences as well as specific employee characteristics and preferences that can be used to configure optimal affordance configuratons. These characteristics and preferences may be used to drive one or more of the option and attribute filters described above. To this end, see again FIG. 6 where the system database 46 is shown as also including a customer database 196. Referring also to FIG. 21, an exemplary customer database 196 includes various types of information including various limits or preferences or requirements for several different customers. More specifically, database 196 includes a separate sub-database for each of several customers C-0001 through C-NNNN. Here, while any customer may have several different facilities, in the interest of simplifying this explanation, it will be assumed that a different sub-database (e.g., C-0001) is provided for each separate customer facility.

Exemplary sub-database C-0001 includes, among other information, a customer name at 522 or other unique distinguishing identification information, a facility name at 527, a number of total workstations to be provided within a complete configuration at the facility at 524, and information about the types of customer employees or other persons that will occupy the facility at 526. The employee information at 526 divides employees into three groups including executives, managers and general employees and for each group, presents privacy requirements (see 528), chair and desk preferences for the group in general (see 530) and information indicating whether or not individual users within the group are permitted to override the general group preferences (see 532). Thus, FIG. 21 indicates that customer C-0001 requires 500 workstations at the R&D Facility 1 for five executives, 45 managers and 450 general employees. The database also indicates that each executive station should have a privacy characteristic of at least 9 and a type 1 chair and desk combination and that each executive can override the type 1 chair and type 1 desk combination if she has a different preference. In contrast, each manager station should have a privacy value of at least 7 and gets a type 2 desk and type 2 chair and each manager can override the default type 2 chair with a different preference but cannot override the type 2 desk. Each general employee station should have a privacy value of at least 2, gets a type 3 desk and chair combination and the employee cannot override the general preferences.

Referring still to FIG. 21, exemplary sub-database 196 also includes a maximum total budget or cost limitation at 536 for affordance build out and customer color preferences at 537. Links to historic customer purchase and product review data are provided at 538 and 540, respectively. The historic customer purchase data 538 may include information related to prior affordance purchases which may be helpful for a customer when considering options for and attribute values that should be selected during subsequent design activities. In at least some cases it is contemplated that a customer or a third party provider may collect and maintain product reviews by customer employees which may also prove to be useful to a system user when making affordance and attribute choices.

Figure 22:
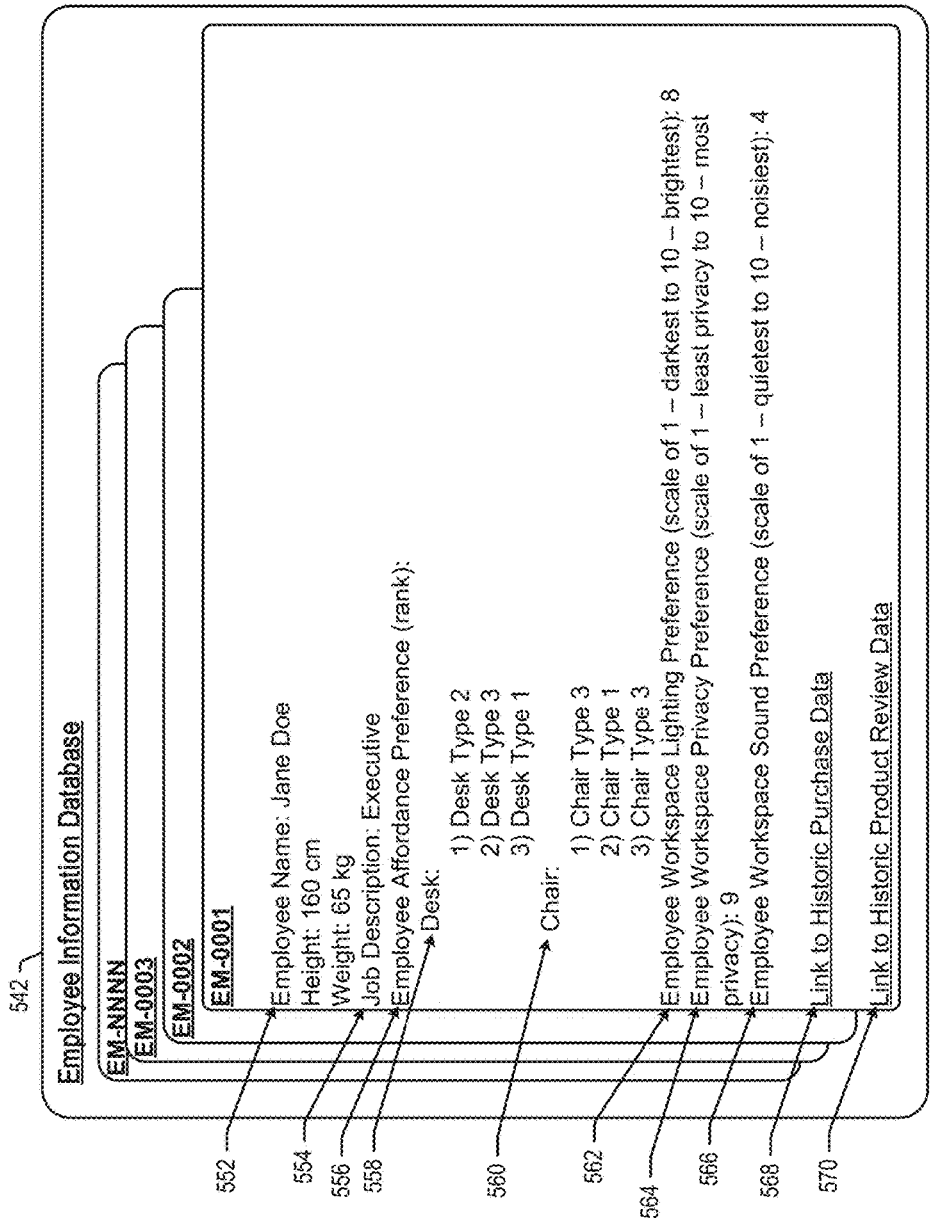
FIG. 22 is a schematic view of an exemplary user database that forms pat of one of the customer sub-databases in FIG. 21.

Referring yet again to FIG. 21, sub-database C-0001 also includes an employee information database 542 which is shown in some detail in FIG. 22. Exemplary employee database 542 includes a separate sub-database for each employee of customer C-0001 including exemplary sub-database EM-0001. Exemplary sub-database EM-0001 includes an employee name or other identifying information at 552 along with anatomical information (e.g., height, weight, etc.), a job description at 554, employee affordance preferences for a desk and a chair at 558 and 560, respectively, as well as employee light, privacy and sound preferences at 562, 564 and 566, respectively. Links to historical employee purchase and product review data are provided at 568 and 570, respectively. Comparing the information in FIGS. 21 and 22 it can be seen that a first employee associated with sub-database EM-0001 has desk and chair preferences (e.g., desk type 2 and chair type 3) that are different than the preferences prescribed for an executive by the customer (e.g., desk and chair types 1). Here, because the first employee is an executive, her desk and chair preferences may override default selections prescribed by the customer and therefore would be result in a desk type 2 and chair type 3 combination.

Referring yet again to FIGS. 21 and 22, the customer and employee database information can be used to limit options presented to a system 10 user. Thus, for example, server 12 may track estimated configuration cost including affordances and labor and compare the estimate to the maximum budget number at 536 and limit options and attribute values based thereon. As another example, where an executive has expressed personal preferences for a desk type 2 and chair type 3 as in FIG. 22, a user working at station 10 to specify a configuration may not be able to change the desk and chair types for a workstation to be used by the specific executive. As yet another example, all general employee desks and chairs may be limited to type 3 as shown in FIG. 21 and therefore options for other desk and chair types for general employee workstations may not be presented or may at least be visually distinguished in some fashion.

In at least some embodiments it is contemplated that system 10 may simulate other real world effects in addition to visual effects for a user to experience. For instance, in some cases system 10 may simulate real world natural light at a geographic location associated with a facility space so that a user can experience how natural light affects user experience in the space given different affordance configurations. As another instance, in some cases system 10 may simulate space occupants including their presence, movements, sounds, etc. Simulation of many other real world effects using system 10 are contemplated.

To provide information or data to drive the other simulated effects, exemplary database 46 in FIG. 6 includes an environment/ambient database 198. Exemplary database 198 further includes a virtual occupant database 240, a virtual light database 242, a synthetic light database 246, and a virtual WIFI database 244. Occupant database 240 may include various types of occupant related information or data used to simulate VW occupants in a VW representation. For instance, occupant data may simply include sound data indicating an average or typical level or volume of sound generated by a virtual employee in space. For instance, an employee working at a workstation in the real world generates sound having an average volume level. Here, the average volume level may be stored in database 240 to simulate the sounds made by an employee within a VW representation. To simulate the effects of employees in a VW representation, server 12 may randomly place employees at different locations within the VW representation and use the average sound data to simulate average sound at the location of each employee in the VW representation. Here, the sounds from each VW employee proximate the VW location of a user may be attenuated by VW fixtures and affordances so that the volume and perhaps other characteristics like sound frequencies are attenuated at the VW location of the user. Server 12 then generates the attenuated sounds at station 14 via speakers 30. Where the speakers are arranged about station 14 the sound can be directional to even more accurately simulate a real world audio effect associated with virtual employees. In FIG. 1 exemplary VW employee locations are indicated by "E" icons, several of which are labeled 550. In FIG. 6, each employee at a location E would generate an average or typical sound volume which would be attenuated by distance, affordances and fixtures between the location E and the location off a user (e.g., 180*a*) in the VW representation.

In more sophisticated cases, the occupant data may include data that simulates different typical occupant activities where sound volume varies at different times. Thus, for instance, most of the time the sound volume at a workstation may be relatively low but periodically (e.g., once per hour), the sound volume may increase when a VW employee participates in a phone call. Here, random phone calls may be simulated by the occupant data to better reflect real world audio effects. In still more sophisticated cases, occupant data may simulate random but typical VW movements within the VW where sound volume changes as a function of relative locations of VW employees in a VW representation with respect to a user's location. Thus, for instance if a VW employee walks past a workstation in a VW occupied by a user, the sound volume associated with the VW employee would change as a function of the employee's location relative to the user's station.

In some cases the occupant data may be controlled as a function of the number of employees that are expected to use a VW space. Thus, for instance, in FIG. 1, where it is expected that 80 employees will occupy the illustrated space during high volume use, VW employee positions and thus occupant sound and volume may be affected by the high volume number. In some cases a user may be able to select different times of day to affect the sound characteristics at a VW location associated with typical occupancy. For instance, in most cases space occupancy is less at 6 AM than at 10 AM and therefore noise levels associated with occupants is different in the real world at different times. In some cases a system user may select a simulation time of day causing server 12 to adjust the number of occupants and their locations or movements within the VW representation so that the user can experience different sound characteristics. To this end, see, for instance, FIG. 8 where a time of day selector tool is shown at 560 including a time scale at 562 and a selector icon at 564. Here, a user may use controller 24 to move selector 564 to select different times on the scale 562, causing server 12 to change the sound characteristics to reflect typical occupancy.

In addition to or instead of including sound/volume information, the occupancy data in database 240 may include one or a set of graphical occupant models useable to generate VW occupants within a VW world. To this end see exemplary VW occupant representations at 300 in FIGS. 8, 9, 11, etc. Here, the occupant representations may be dimensioned to be similar to an average person's height so that locations of the occupant's eyes are generally consistent with what would be expected in a real life facility when the occupant is sitting at a workstation, standing at some location, walking through a VW hallway, etc. In at least some cases the occupant representations will only be presented as stationary representations within the VW. In other more sophisticated cases, the representations may be moved about within a VW to simulate real world occupant movements in the VW.

In simple cases, while occupant representations may be moved in the VW, the representations may not be changed in any other way in order to reduce required processing power (i.e., the representations would appear like manikins as 3D graphical models that simply slide along movement paths within the VW representation and other than location changes, the representations would not be further animated (e.g., no animated leg or arm movement, head rotation, etc.). In still other cases, the occupant data may include fully animated occupant representations where heads, arms, legs, etc., move and simulate normal human movements during location changes, etc.

In particularly complex cases, the system may simulate random impromptu meetings and associated sounds when two or more VW occupants encounter each other in the VW representation. In other cases occupant meeting commencement and endings in VW conference spaces may be simulated periodically to a user proximate the meeting spaces can experience how those transition activities affect experience in a VW configuration that simulates real world conditions. Many other real world occupant activates may be simulated in a VW representation.

In some cases server 12 simulates movement of the occupants about the virtual space in order to provide the user with an understanding of the extent of foot traffic might expected for a given workspace affordance arrangement. The virtual occupant movement simulation can be deployed in a variety of ways, and the examples given herein are intended to be non-limiting.

As one example, the virtual occupant movement simulation can operate based on a global logic. The global logic can determine that a given number of occupants are expected to undergo a given movement at a particular rate, and then the virtual occupant movement simulation can generate movements of individual virtual occupants in so as to maintain the global logic. The global logic can determine that 25 occupants ought to move from their workstations to and from the restroom in a given time period, and then randomly or pseudo-randomly select the particular occupants to execute that movement to maintain the global logic. The restroom movement is merely an example, and other necessary movements are contemplated such as walking to and from a printer, a water cooler, a supervisor's office, a collaborative space, and the like.

As another example, the virtual occupant movement simulation can operate based on a virtual occupant logic. The virtual occupant logic can determine that a particular virtual occupant has a probability for certain movements at a given time. The virtual occupant logic can run for each virtual occupant in a space, and then the resulting movements can be executed. The virtual occupant logic can determine that the virtual occupant has a percent chance every minute to move to and from the restroom, a refreshment station, or other VW locations. This percent chance can increase over time until the occupant moves to the restroom, at which time the percent change resets to an initial value which again begins to increase over time. Again, movement to and from the restroom is only an exemplary aspect of the virtual occupant movement simulation, and the other necessary movements discussed above are contemplated.

The virtual occupant movement simulation can also have a set of engagement rules, which determine how an occupant engages with other occupants and/or various affordances in the space. For example, the virtual occupant movement simulation could have a percent chance that two people passing in a space stop and engage in a brief conversation with one another. As another example, the virtual occupant movement simulation could have a percent chance that a user could stop at an affordance, such as a copy machine, and engage the affordance for a particular amount of time.

In some cases, the virtual occupant movement simulation is a probabilistic calculator that operates on a pre-defined set of rules. The pre-defined set of rules can be varied after virtual occupant movement is observed in order to provide more realistic virtual occupant movement. The pre-defined set of rules can also be varied during the execution of the VW system, in order for a user to be able to adjust occupant movement in real time as they are experiencing the virtual workspace. For example, if a user observes that the virtual occupants are moving about the virtual workspace more or less than a user would typically move around the actual workspace, the user can bring up a menu that includes a slider for controlling the amount of overall movement, and can adjust the slider accordingly.

Referring again to FIG. 6, the virtual light database 242 may include natural light characteristics for specific geographic locations and times of day that indicate typical natural light intensity and sun locations in the sky relative to the geographical locations in the database. Here, the idea is that where a VW representation includes exterior windows and the orientation of the VW space or facility is known, the amount and direction of natural light entering the VW windows can be determined and used to simulate natural light effects within the VW representation. For instance, for two identical buildings located at almost the same geographical location in Chicago where the first building is oriented to extend north to south and the second building is oriented to extend east west, the natural light patterns through windows in the two buildings would be appreciably different. Referring to FIG. 21, in addition to the other customer information, sub-database 196 includes location and facility or space orientation information as shown at 529 that can be used along with the natural light data from database 242 to simulate how natural light should appear in the a real world space associated with a VW representation. Then as affordances are added to or changed within a VW representation, the effects of those affordances on natural light patterns within the VW representation can be also be simulated by system 10.

Referring again to FIG. 6, synthetic light database 246 includes information related to locations of fixtured synthetic light devices (e.g., stationary ceiling mounted light devices, other fixed light devices in a space) and light characteristics for each of those devices (e.g., light intensity, light pattern (e.g., flood, spot, area, indirect, etc.), etc. In addition to including light characteristics for fixtured light devices, in at least some cases the light database 246 will also include light characteristics for each of a plurality of light device type affordances that can be added to a VW representation so that a user can add task or other types of additional light devices to a VW and experience their effects. Using the light characteristics data and data related to affordances in a VW representation, server 12 can determine synthetic light patterns within a VW representation and simulate those patterns at station 14 for a user to experience. Here, for instance, where a user determines that light intensity at a specific workstation in the VW is less than desired, the user may opt to add one or more task lights to the workstation or one or more additional ceiling mounted fixtured light devices. Where both natural and synthetic light are present at any VW location, server 12 may simulate the combined effects of all light sources affecting the location in at least some embodiments.

Referring yet again to FIG. 6, virtual WIFI database 244 is similar to the synthetic light database where and includes information indicating WIFI characteristics within a VW space including, among other characteristics, wireless access point locations and signal strength characteristics. The access point locations and signal strengths can be combined with the affordance locations and information related to how different affordances attenuate wireless signals to determine signal strengths at any VW location.

In addition to the gamin type controller 24 shown in FIG. 4, other interface devices are contemplated in at least some embodiments. For instance, the top surface of table assembly 109 (see again FIG. 3) may include a touch sensitive emissive surface that operates as an interface device. In this regard see the exemplary emissive table assembly 109 in FIG. 23 that includes an emissive and touch sensitive top surface at 620. In cases where a thin touch sensitive emissive surface is used as an input interface, in at least some cases, a top plan view 622 of a VW representation shown on the emissive surfaces 26*a* through 26*c* may be presented on the table top surface as a bearing and interface guide for a system user.

Figure 23:
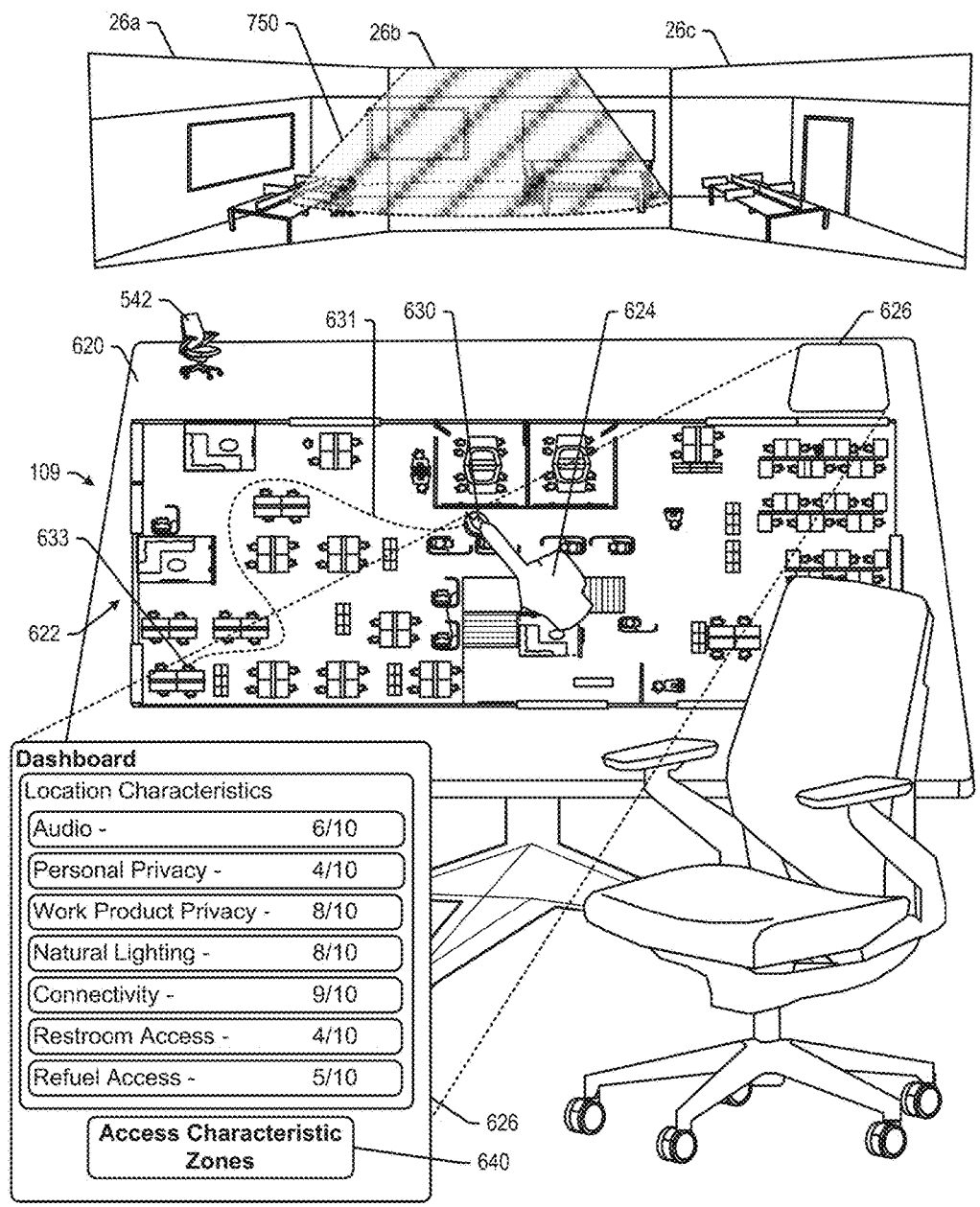
FIG. 23 is a schematic view showing another type of 3 surface VW station that includes a table having an emissive top surface that is useable as an interface device my a station user.

In FIG. 23 and throughout this specification, the illustrated hand representation 624 represents a system user's hand interacting with (e.g., touching) the interface. Hereinafter, unless indicated otherwise, the hand representation 624 will be referred to as a pointer. In FIG. 23, pointer 624 is shown selecting a specific VW location 630 on top plan view 622. In at least some cases it is contemplated that when a user selects a specific location via view 622, the user's VW location may be automatically changed to the location associated with the specific location. A new selected VW location will be referred to hereinafter as a target location unless indicated otherwise. Here, as in other system aspects described above, while the user's VW location may change immediately, in other cases the location change may involve an animation in which server 12 simulates travel through the VW from an initial VW location occupied by the user prior to selecting the target location and the target location so that the user has an uninterrupted sense of travel through the VW from a current location to the target location.

In some embodiments the user may be able to trace a preferred travel path through the VW using view 622 and server 12 may then simulate travel along that path from an initial VW location to a target location. For example, see again FIG. 23 where an exemplary path 631 is shown that starts at location 630 and ends at a target location at 633 that is associated with a specific task chair in the VW view 622. As shown, the traced path may be presented on surface 620 as the user tracing the path so that the user can see the path to be followed during the simulated travel. In at least some cases, as the server simulates VW travel from the initial to the target location via surfaces 26a through 26c, the user's changing VW location may be represented in view 622 by the user location icon 630 moving along path 631 at the same time that surfaces 26a through 26c simulate travel.

Some embodiments may include one or more mechanical affordance representations that can be used to interact with view 622 to move within the VW. For instance, see the mechanical chair gadget 542 shown in FIG. 23. Here, a user may grasp gadget 542 and move that gadget to any location on view 622. Here, some type of station sensor would be provided proximate surface 620 to determine the location and orientation of the gadget 542 so that the server could detect where on view 622 the gadget 542 is located. Then, the server 12 may use the location and orientation of gadget 542 on view 622 to drive the views presented on surfaces 26a through 26c so that the VW location on surfaces 26a through 26 tracks the gadget location and orientation.

Figure 24:
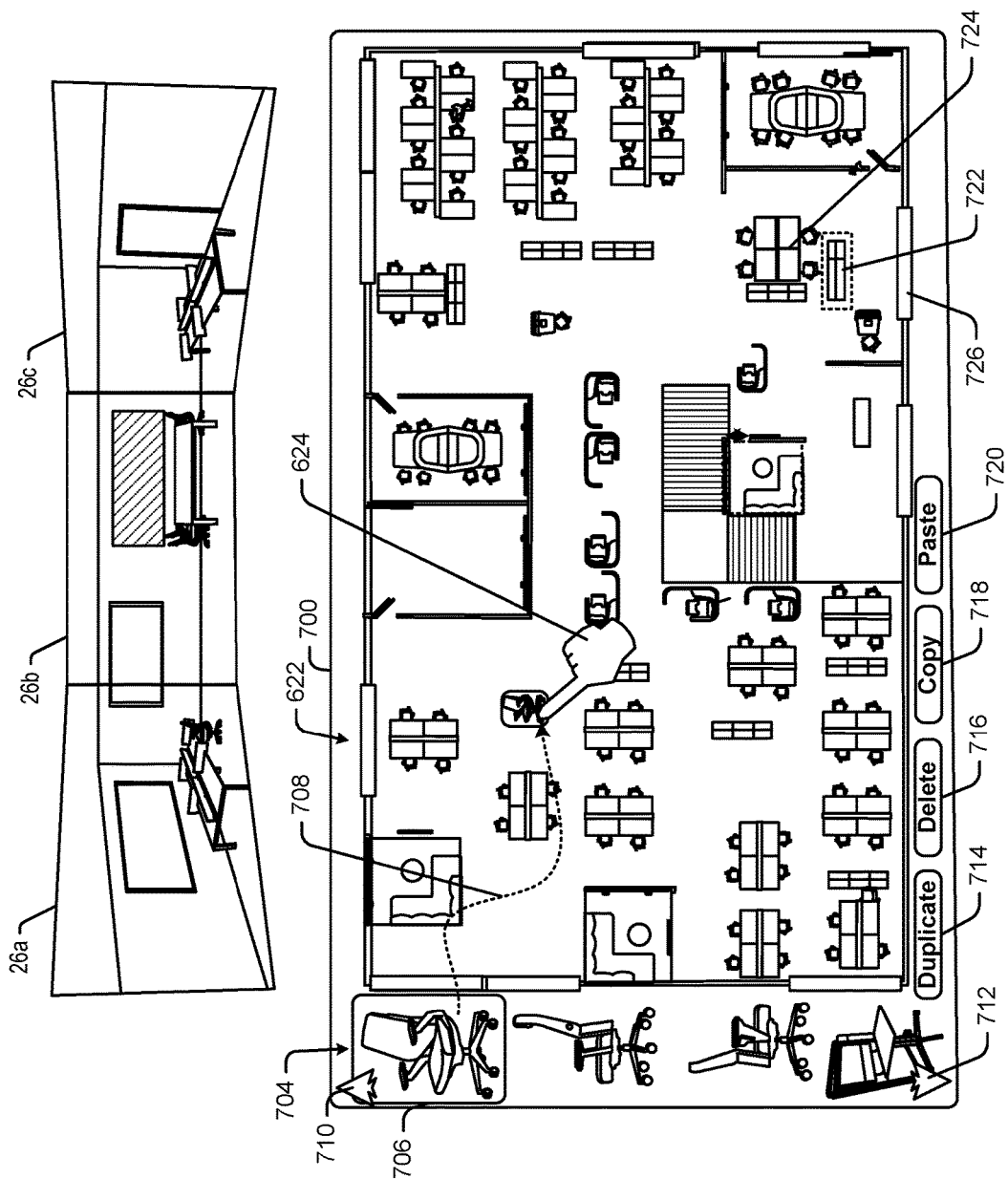
FIG. 24 is a schematic view showing a virtual interface that may be presented to a station user via the top surface of the table in FIG. 23.

In at least some embodiments, in addition to presenting the top plan VW view 622, surface 620 may also present any of several different types of VW editing tools. For instance, see FIG. 24 where an interface representation 700 that may be presented via surface 620 includes editing tools in a left edge toolbar 704 and along a lower edge of exemplary view 622. The tools in toolbar 704 include a list of affordances in graphical form that may be selected to add affordance instances to the representation associated with view 622. In at least some cases the list may be ordered with a graphical representation of the affordance that is most prevalent in the view 622 at the top of the list followed by the second most prevalent affordance and so on. In other cases, the affordance most recently added to view 622 may be presented at the top of the list followed by the second most recently added affordance, and so on. When a user touches one of the graphical representations in toolbar 704, a highlighting box 706 or other visually distinguishing representation may be used to distinguish the selected graphic. Scrolling arrows 710 and 712 are presented to enable a user to scroll up and down within the toolbar 704 to view other affordance options supported by the system.

To add an instance of an affordance from the graphical list to the VW, a user may simply touch the graphical representation of an affordance in the list and drag her finger to a location in view 622 as indicated by swipe action 708. Upon releasing the affordance instance that was dragged into the view 622, an instance of the affordance appears in view 622 and immediately appears in the 3D VW representation presented on station surfaces 26a through 26c if the location to which the affordance was swiped is within a perspective that is aligned with at least one of the surfaces 26a, 26b or 26c. In addition, the newly added affordance may be highlighted within the representation presented on surfaces 26a through 26c immediately upon insertion into the VW to clearly indicate the new affordance instance to the user. The highlighting may persist until the user performs some action or may fade away after an initial period (e.g., 3 seconds).

Referring again to FIG. 24, in some cases when a system user encounters an affordance in any VW view (e.g., view 622) that the user would like to duplicate, the user may simply select the affordance via a touch at the location of the affordance in view 622 causing the server to highlight the affordance to be duplicated and then the user may select a "Duplicate" icon 714 shown in FIG. 24 to create an exact duplicate of the highlighted affordance within the VW. Here, the duplicate affordance may be visually distinguished (e.g., a different highlighting) from the original affordance for at least a short duration so that the user can clearly see that duplication took place and identify the new affordance instance in the VW.

To remove an instance of an affordance from a VW, a user may select the instance in view 622 and then select a delete icon 716. Other editing tools may be included in representation 700 including copy and paste icons 718 and 720 useable to copy a selected affordance in view 622 and to paste a copied affordance at any valid location (e.g., a location at which the affordance does not interfere with some other VW affordance or fixture) within the VW. While not shown, other editing tools are contemplated such as, for instance, an area selection tool that enables a user to lasso or draw an area defining line around a subset of affordances or configuration typicals within view 622 to select more than one affordance to be deleted, copied, duplicated, etc.

Referring again to FIG. 24, in the illustrated example view 622 corresponds to an entire VW space while the VW representation presented via surfaces 26a through 26c corresponds to a relatively small portion of the space represented by view 622. For this reason, in many cases when a user interacts with view 622 in some fashion, that interaction may be at a VW location that is not presented in the 3D representation on surfaces 26a through 26c. In at least some cases when a user interacts with view 622 in any fashion, server 12 may automatically change the 3D representation on surfaces 26a through 26c so that the 3D representation shows the location at which the interaction in view 622 is occurring. For instance, where a user selects a specific affordance in view 622 to duplicate that affordance, immediately upon the user selecting the affordance in view 622 to be duplicated, server 12 may automatically change the 3D view on surfaces 26a through 26c to show a perspective view of the affordance selected via view 622. In addition, the affordance selected via view 622 may be highlighted in the 3D view on surfaces 26a through 26c to clearly indicate the selected affordance to the user.

As another instance, after a user copies an affordance in view 622 and then selects a target location in view 622 at which the copied affordance is to be pasted, server 12 may change the 3D view on surfaces 26a through 26c to show the target location and then, when the copied affordance is pasted, the pasted affordance immediately appears in the 3D view in addition to appearing in the top plan view 622.

In at least some cases it is contemplated that a server 12 may continually generate or update different VW location characteristics every time a user changes some aspect of the VW representation and may be able to report those characteristics to the system user in various ways. For instance, in FIG. 24, if a user adds an eight foot tall bookshelf as shown at 722 to a VW between workstations at 724 and an exterior window 726, the bookshelf will affect the amount of natural light at the location of the workstations and 724 and therefore a natural light characteristic for the workstation location will be modified and can be recalculated by the system server 12. Similarly, addition of bookcase 722 may also affect other experiential characteristics at the workstation location 724 including but not limited to an audio characteristic (e.g., the amount of noise at the location), a synthetic light characteristic, a wireless signal strength characteristic (e.g., the shelf may be metal and therefore attenuate wireless signal strength appreciably), a personal privacy characteristic (e.g., sightlines to a location at the workstation to be occupied by an occupant), a work product privacy characteristic (e.g., sight lines to locations to be occupied by primary display screens at the station), a visual distraction characteristic (e.g. an occupant's sightlines at a workstation), etc. Here, server 12 may recalculate at least a subset or perhaps all experiential characteristic values (e.g., a value on a 1 to 10 scale) each time any change is made to a VW.

Where a server maintains experiential characteristic values for VW locations, in at least some cases it is contemplated that the server may present that information to a system user in an easily perceivable format. For example, see again FIG. 23 where an experiential characteristic dashboard is shown at 626 which may be presented via emissive table top surface 620. The dashboard 626 includes a plurality of experiential characteristic fields where each field includes a calculated value for the associated characteristic for a specific location within the VW. In FIG. 23, the dashboard presents the experiential characteristic values for a user's current location in the VW (e.g., the location associated with user icon 630 in view 622). If the user moves to a different location in view 622 (e.g., in the VW), the characteristic values presented in the dashboard would be changed to reflect the values associated with the new VW location.

While there are many different types of experiential characteristics that may be calculated by the server 12, only a subset of those characteristics are shown in dashboard 626 in the interest of simplifying this explanation. The exemplary experiential characteristics presented via dashboard 626 include an audio characteristic, a personal privacy characteristic, a work product privacy characteristic, a natural lighting characteristic, a connectivity (e.g., wireless) characteristic, a rest room access (e.g., ease of accessing a nearest rest room) characteristic and a refuel access (e.g., ease of accessing a refreshment (e.g., coffee, tea, water) station) characteristic. In some cases dashboard 626 may be presented separate from the ambient experience simulations (e.g., simulated occupant audio and video, simulated natural and synthetic light, etc.) and in other cases the dashboard may be presented simultaneously with the ambient experience simulations.

Referring again to FIG. 12, another exemplary dashboard is shown at 1130, this time presented on one of the heads up emissive station surfaces (e.g., 26b). Here, the dashboard indicates various privacy characteristics for a user's current location in space and including personal privacy, work product privacy, visual distractions (e.g., how often does another occupant move in the VW at a location that can be perceived by the user at the current VW location) and audio level. One other interesting feature shown in FIG. 12 includes instantaneous indicators that indicate any time that personal and work product privacy is breached as server 12 simulates occupants moving in the VW space. To this end, as server 12 simulates occupant movement in the VW, at times virtual occupants will exist in the VW at a location proximate the station user's VW location but outside the views presented via the station emissive surfaces 26a through 26c. Here, at times those "hidden" occupants in the user's VW vicinity would have a clear view of the user or the user's work product. When simulating a user's experience in the VW, instantaneous privacy breaches would be of interest to a user. The privacy breach indicators at 1132 and 1134 are presented whenever a hidden occupant's view in the VW to the user or the user's work product (e.g., the location of a computer display screen at the user's workstation) is unobstructed.

While a dashboard like 626 is useful for conveying experiential characteristics at specific locations within a VW, other interface tools are better at conveying experiential characteristic values throughout a VW representation. To this end, if a user wants to get an overall sense of the natural light characteristics throughout a VW space using dashboard 626, the user would have to move to a large number of different VW locations and observe the natural light characteristic value at each of the different locations. Moving to and observing values at many different locations would be tedious at best.

Figure 25:
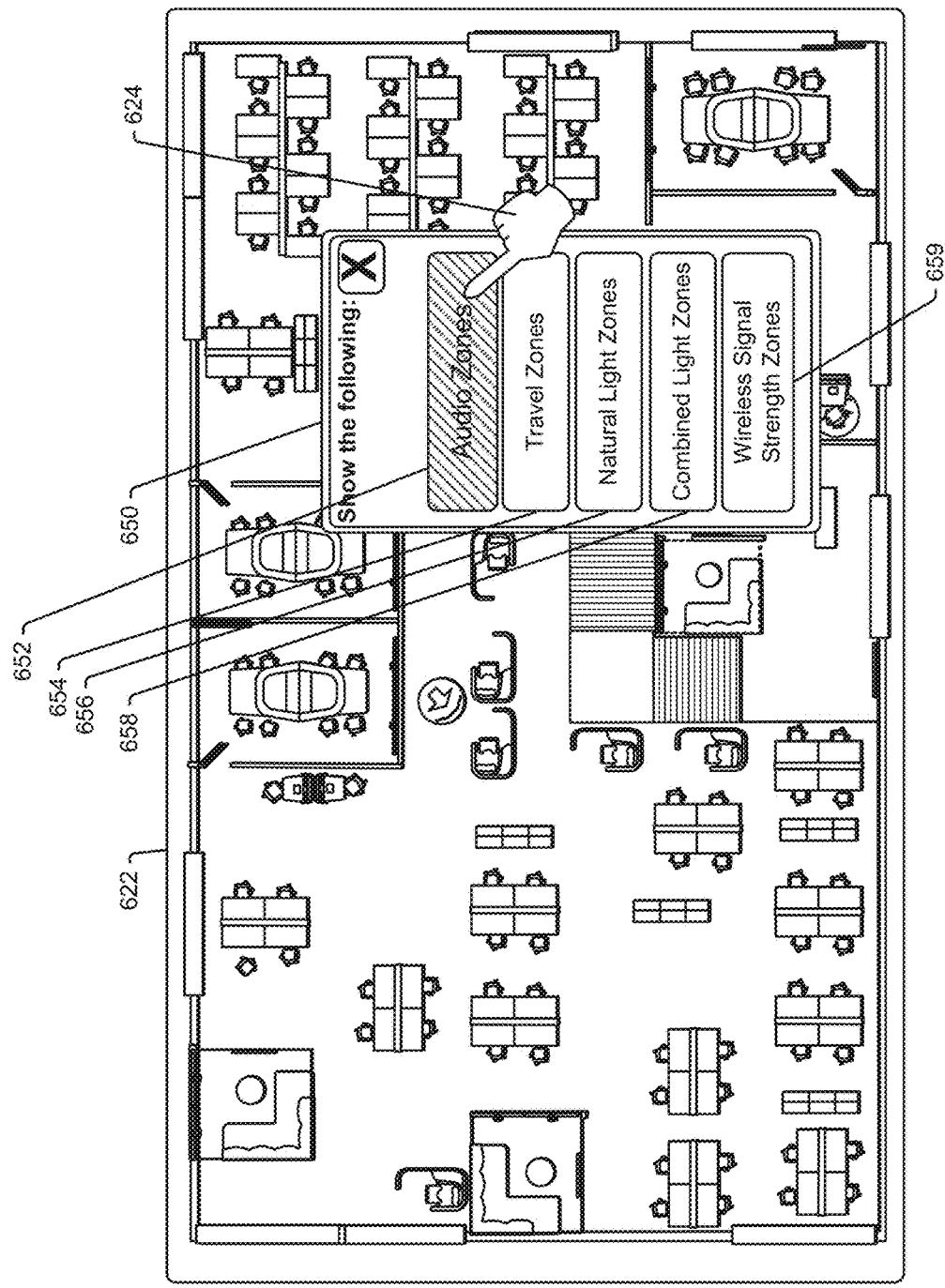
FIG. 25 is similar to FIG. 24, albeit showing a different interface representation.

In at least some cases where server 12 continually calculates different experiential characteristics for different VW locations, the server 12 may be capable of presenting characteristic zone maps to help a user visualize experiential characteristics throughout a VW representation. Here, in at least some cases, separate zone maps may be generated and presented for different experiential characteristics. To this end, see again FIG. 23 where the dashboard 626 includes an "Access Characteristic Zones" icon 640 that is selectable to access different characteristic zone maps. Referring also to FIG. 25, when icon 640 is selected, server 12 may add a characteristic type selection window 650 to the top plan view 622 on table top surface 620 allowing a user to select one of a plurality of experiential characteristics to be presented on view 622.

Figure 26:
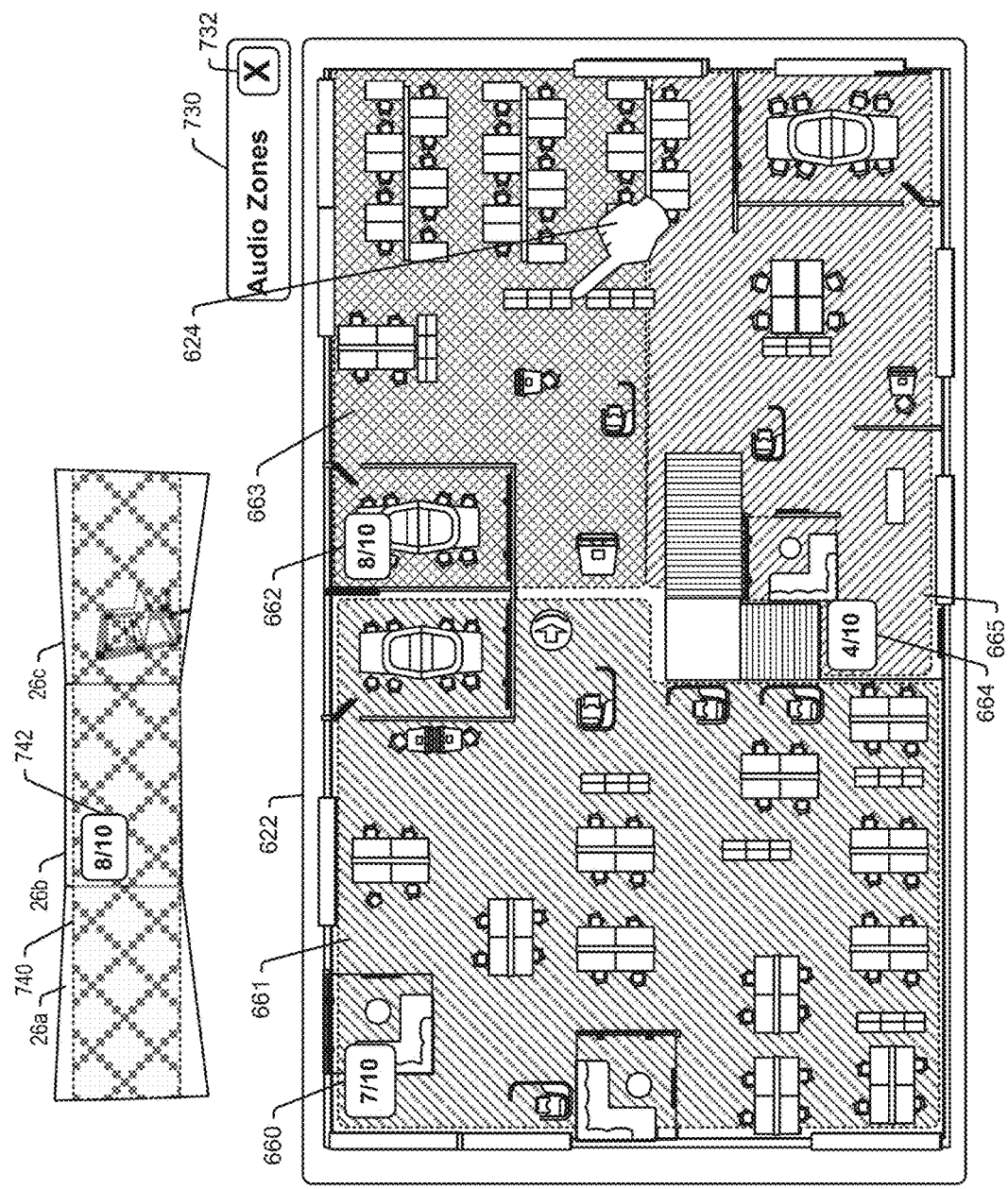
FIG. 26 is similar to FIG. 25, albeit showing audio zones on a top plan VW map that are differently highlighted to indicate zones within an associated space that have different audio or noise characteristics.

In FIG. 25, the experiential characteristic options presented include an Audio Zones option 652, a Travel Zones option 654, a Natural Light Zones option 656, a Combined Light Zones option 658 and a Wireless Signal Strength Zones option 659. Other zone characteristic options may be included in the list in window 650 and the presented list is limited only in the interest of simplifying this explanation. When the audio zones option 652 is selected as indicated by pointer 624 in FIG. 24, server 12 adds audio zone information to the view 622 as shown in FIG. 26. The exemplary zone information graphically defines first, second and third separate audio zones labeled 661, 663 and 665, respectively, where all locations in each zone are characterized by a audio characteristic value that is indicated in a characteristic value field spatially associated with the associated zone. For instance, all locations in zone 661 have an audio characteristic value of 6/10 indicated in field 660, all location in zone 663 have an audio characteristic value of 8/10 indicates in field 662 and all locations in zone 665 have an audio characteristic value of 4/10 indicated in field 664.

Here, it should be appreciated that there may be some locations in one of the zones where the audio characteristic deviates from the characteristic indicated in the characteristic field at times or in general so that the zones indicated are only generally accurate or may only be accurate at certain times. For instance, if a large meeting in a conference room located in zone 661 lets out at some instant in time, the audio characteristic for locations proximate the room may be temporarily different than the value indicated in field 660. Thus, the server 12 generates characteristic values for zones that are only generally accurate most of the time and that are generally accurate for most of the locations within the zone.

Referring still to FIG. 26, when the audio zones are shown in view 622, a zone type indicator field 730 is presented above view 622 to indicate to the user that the audio zone characteristics are being presented. A "close" icon 732 is provided in the field 730 for removing the audio characteristic information from the view 622 so that the view would revert back to a view akin to the view shown in FIG. 25.

While audio and other experiential characteristic zones may be presented relatively clearly in the top plan view 622 as shown in FIG. 26, at least some experiential characteristic zones are not easily represented in the 3D representations on surfaces 26a through 26c. Nevertheless, in at least some cases it is contemplated that experiential characteristic zones may be represented on surfaces 26a through 26c in some manner. For instance, when a user approaches the second audio zone 663 from the first audio zone 661 in FIG. 26, if the audio zones feature is enabled (e.g., option 652 in FIG. 25 has been selected), server 12 may present some type of audio zone boundary within the 3D VW representation on surfaces 26*a* through 26*c*. For example, the audio zone boundary may include a semitransparent "curtain" or planar field 740 as shown in FIG. 26 between the first and second zones along with an audio characteristic field 742 indicating the second zone audio characteristic value 8/10. Here, the planar field 740 may be visually distinguished in the same fashion as the second zone 663 to help the user associate zone 663 in the top plan view 622 with the second zone behind the planar field 740. Once the user passes through the field 740, that field may be eliminated from surfaces 26*a* through 26*c*.

As another example, different audio level (e.g., noise level) zones may be indicated by highlighting, shading or some other indicia on a VW floor surface. In this regard, see the cross hatched area on the floor representation in FIG. 9 that indicates a noise level value change.

Figure 27:
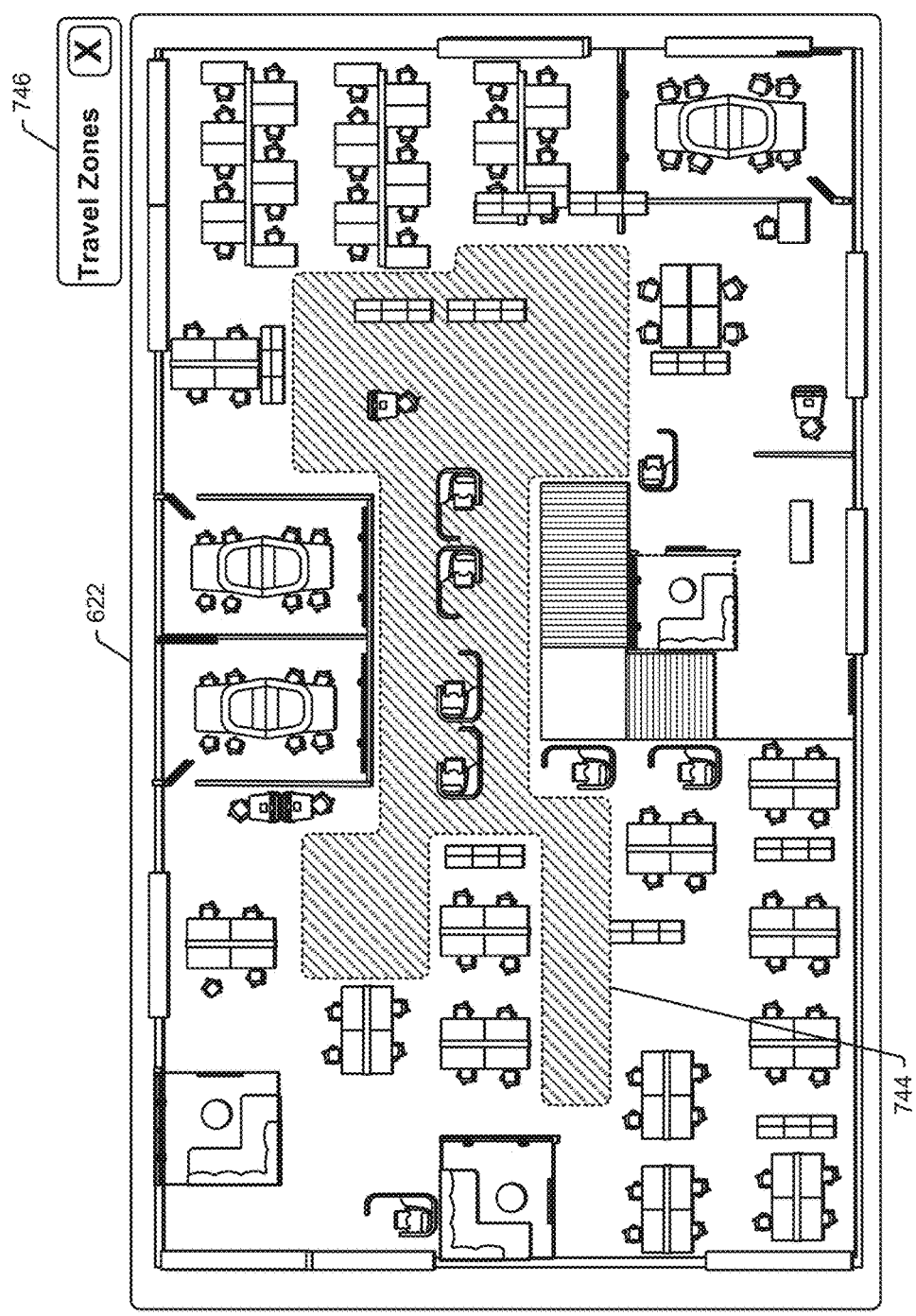
FIG. 27 is similar to FIG. 26, albeit showing a top plan VW view where high travel areas are visually distinguished from other areas.

In FIG. 25, when the travel zones option 654 is selected, server 12 may add travel zone information to view 622 as shown in FIG. 27. the travel zones option 654 is shown selected via pointer 624 causing the server to highlight a travel zone 670 in the view 622. Here, a travel zone 744 is an area within a VW representation that, because of fixture and affordance configurations, is expected to be highly trafficked by space occupants in the real world. in addition to showing travel zones, the FIG. 27 representation includes a field 746 that indicates the type of zone presented and a close icon for removing the travel zone information from view 622.

Figure 28:
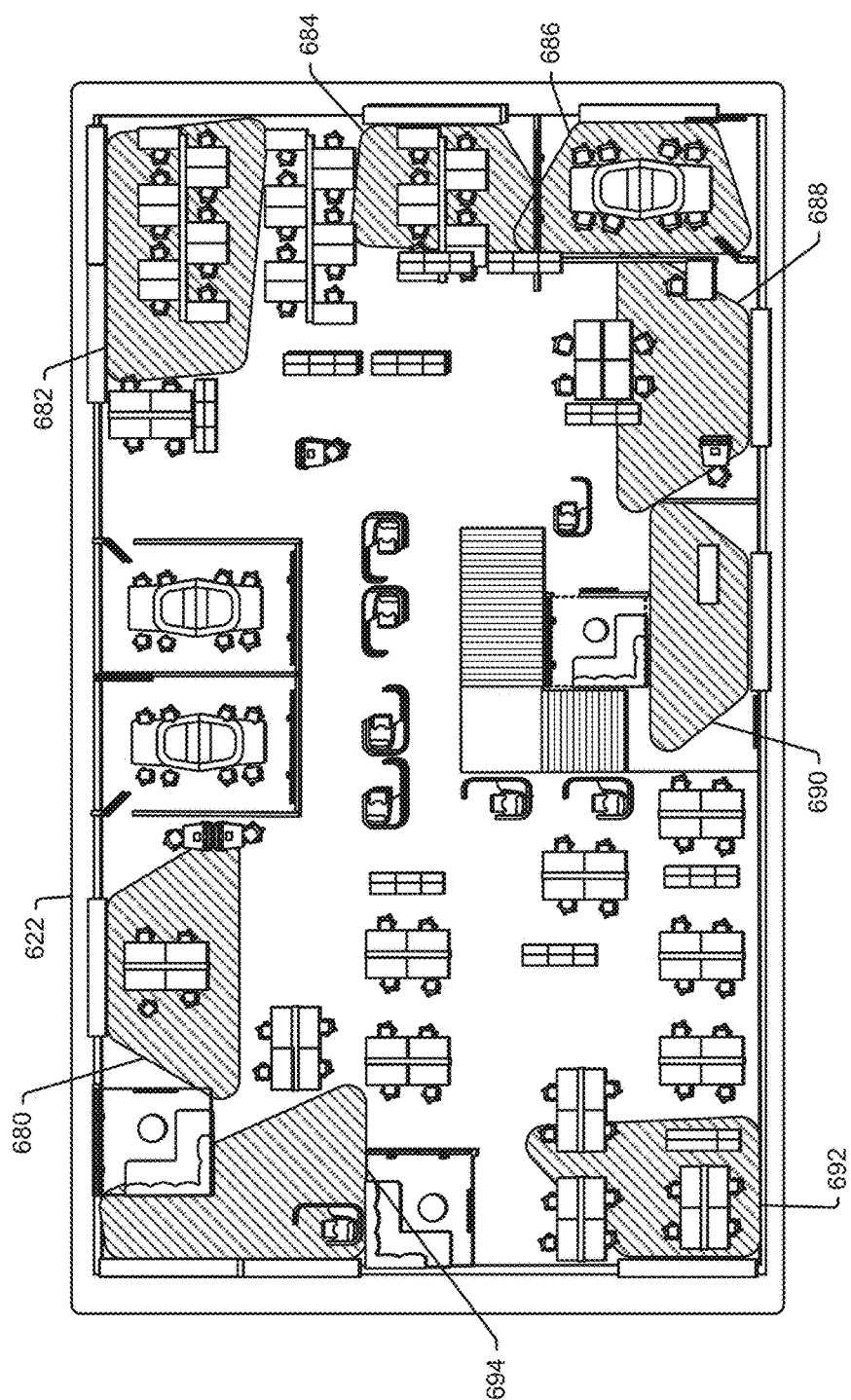
FIG. 28 is similar to FIG. 26, albeit where areas that receive natural light above some threshold level are visually distinguished from other areas.

In FIG. 26, natural light zones 680, 682, 684, 686, 688, 690, 692 and 694 are shown on view 622 that are expected to have a natural light intensity above some threshold level. While the zones in FIG. 26 includes only a single light intensity gradation (e.g., areas having light intensity above the threshold level), in other cases it is contemplated that intensity gradations of two levels or more may be visually presented differently to indicate different natural light intensities. While not shown, it should be appreciated that light and wireless zone information akin to the information shown in FIGS. 26 through 28 may be generated for combined natural and synthetic light intensities as well as for WIFI or other wireless signal intensity when options 658 and 659 are selected in FIG. 25, respectively.

Where the wireless signal strength zones option is turned on (e.g., option 659 is selected in FIG. 25), VW zones in which signal strength exceeds some threshold value may be presented in the 3D VW representation on surfaces 26*a* through 26*c*. For instance, see the exemplary cone shaped zone at 750 in FIG. 23 that represents a wireless signal zone where the wireless signal strength is generally above some threshold level. Here, as describes above, the server may modify the shape of zone 740 as a user changes affordance configurations within the VW space presented on surfaces 26*a* through 26*c*. In FIG. 23, zone 750 is an anticipated zone as opposed to a signal strength zone that exists in the real world.

Referring again to FIG. 6, while a 3D VW dataset 200 including affordances and configuration typicals may be initially specified using a system or interface that is separate from station 14 in some embodiments, in other cases it is contemplated that a user may use station 14 to specify a VW configuration using the tools described above. Thus, for instance, a user could add chairs, tables, bookshelves, workstations conference room configuration typicals, etc., to an initially empty VW space defined by VW fixtures including walls, windows, doors, staircases, etc.

In still other cases it is contemplated that the system server 12 may be programmed to elicit and receive a minimal amount of user affordance configuration preference or requirement information and to use the received information and a set of design rules of thumb to render at least one initial space configuration plan that is consistent or that is at least somewhat consistent with the preferences and requirements. For instance, in a very simple case, a user may simply specify that affordances in a space must be suitable to support 80 employees without specifying anything else. Here, a simple set of design rules may specify that each employee needs a personal workstation (e.g., a workstation table or desk and an associated task chair), that one eight person conference room configuration typical is required for every 40 employees to occupy a space, that one private telepresence room is required for every 20 employees to occupy a space, that one personal harbor arrangement is required for every 15 employees to occupy a space and that the conference rooms, telepresence rooms and personal harbors should be generally spaced throughout the affordance configuration. Thus, to support 80 employees as specified by the user, the VW space should include 80 separate workstations, two eight person conference spaces, four telepresence rooms and six personal harbors. Using this basic requirements information and the known available areas in the empty VW space, server 12 may generate an initial affordance layout plan, assuming that the VW space is sufficient to provide all required affordances and configuration typicals. Unless indicated otherwise initial user preference and requirement information will be referred to hereinafter as "seed information".

While a single user requirement related to the number of employees to be located in a space has been described above, the user preferences and requirements may be much more complex where the user specifies many other design parameters. For instance, in addition to specifying a total number of employees to be located in a space, the user may also specify different types of employees (e.g., executive, manager, general employee), minimum experiential characteristics (e.g. audio privacy, personal privacy, work product privacy, etc.) of some of all of the workstations, personal harbors and/or conference spaces, color schemes for an entire space or sub-areas of a larger VW space, preferred affordance types (e.g., a type 1 task chair for each employee), preferred or required affordance types for specific types of employees (e.g., all managers get a type 2 task chair at their workstations, a maximum total project budget, etc.

In cases where some design rule of thumb or a user preference or requirement cannot be met for some reason, server 12 may be programmed to eliminate one or a small subset of the preferences or requirements in order to generate an initial affordance configuration suggestion that meets most of the user's preferences and requirements. Here, where a requirement has not been met, server 12 may indicate which requirement has not been met with a short explanation as to why the requirement has not been met.

In addition to helping a user develop an initial VW space layout using minimal seed information, server 12 may also elicit and receive minimal information related to space layout (e.g., wall dimensions and locations, window attributes, doors, staircases, etc.) and use that received information to generate the initial empty VW space which is thereafter populated by affordances and configuration typicals either automatically by server 12 based on user provided seed information or manually by the user adding affordances and typicals as desired using tools as described above. In some cases a user may have access to detailed space layout information that can be presented to server 12 in some type of precanned format useable to generate a precise representation of a space in which to configure affordances. For instance, a detailed layout may include a digital space layout specification that can be accessed directly by server 12 that includes fixture locations, dimensions and, in at least some cases, other fixture characteristics that may affect experiential characteristics within a resulting space (e.g., special aspects of a window like light filtering characteristics that affect intensity of natural light, a wall characteristic related to materials or sound attenuating properties, wall coloring or covering material, etc.). In these cases, server 12 may use the detailed information to generate a precisely defined space representation that closely mirrors or mimics an associated real world space.

While predefined and detailed space layout data is optimal as it is precise and requires little effort by a system user to specify space shape and fixture locations and dimensions needed to represent a space in the VW, it has been recognized that, for the purposes of exposing a system user to experiential characteristics (e.g. visual appearance, audio experience, lighting effects, privacy effects, etc.) associated with affordance configurations, precise space shape and fixture characteristics are typically not necessary. Thus, for instance, whether or not a long space defining wall is 150 feet or 152 feet or an exterior window in a wall has a diagonal dimension of five feet or six feet may be completely irrelevant to how a first occupant in a first workstation perceives sound from a second occupant in a second workstation that is 20 feet away from the first workstation. As another example, precise wall, window and door dimensions may have nothing to do with a user's sightlines into a high volume travel path through a space when the user is located in a third workstation proximate the travel path.

Because most experiential characteristics of affordances and configurations are minimally affected by precise fixture characteristics, even if a user does not have access to precise space defining fixture characteristics, if the user can specify general space characteristics, server 12 can build a VW space model to accommodate affordance configurations that where a user's VW experience with affordances therein closely simulates real world experiences. Thus, in at least some cases, server 12 may present a space defining interface for generally defining space fixtures in an extremely simplified and intuitive fashion. For instance, if a user knows that an existing real world space includes four walls that define a rectangular space that is approximately 150 feet long and 80 feet wide, the interface may allow the user to draw a rectangle and specify the length and width dimensions after which server 12 could generate an empty rectangular VW space including four walls having the specified dimensions. If the user specifies the approximate wall height in the space to be 10 feet, server 12 can render the walls with the specified height. If the user specifies approximate window locations and general window characteristics (e.g., floor to ceiling, half wall, number of window lights, etc.), server 12 can add windows to the walls where specified and then generate natural light data for each window and the empty space defined by the walls. Similarly the server can use door locations and characteristics to add doors to walls and so on. Thus, even if a customer does not have specific space defining information, system 10 may be used to quickly define an approximate space model that represents a real world space that can then be used to start an affordance configuration process and/or to experience affordances within the approximate space model.

Figure 29:
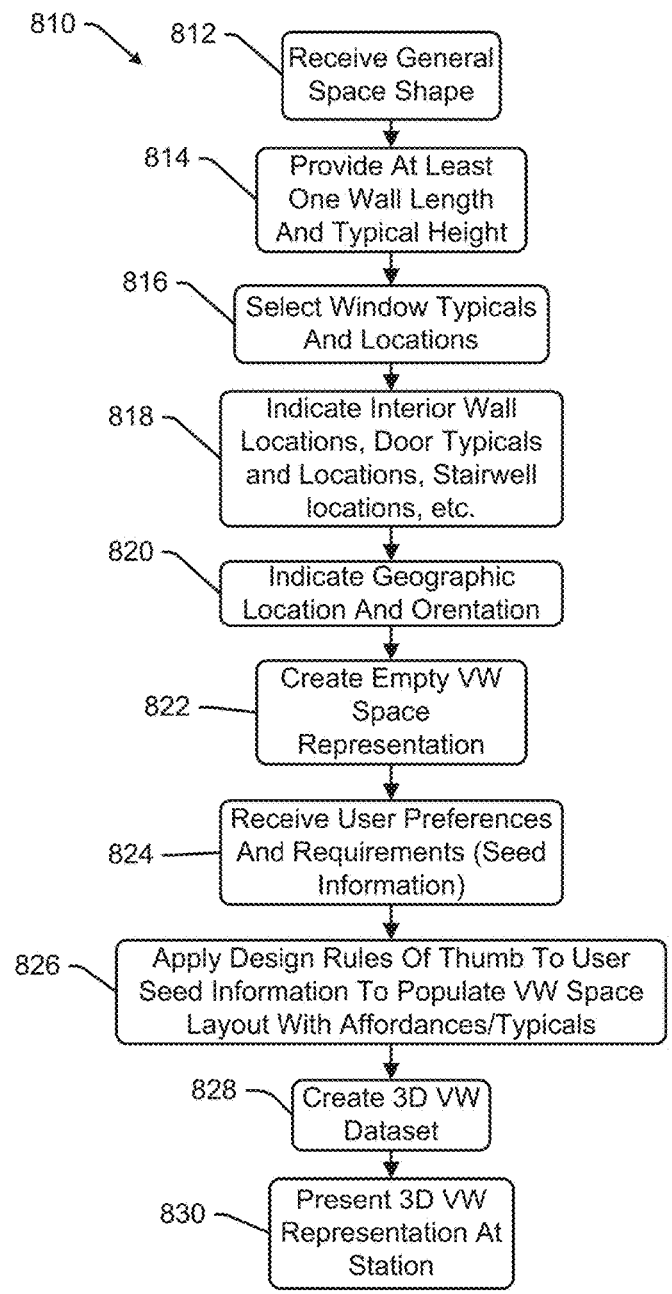
FIG. 29 is a flow chart illustrating a method that is consistent with at least some aspects of the present disclosure.

In the example that follows it will be assumed that a system user is considering re-affording an existing first office space with new affordance configurations and does not, at least initially, have access to a precise space defining data file or other detailed space defining information. Instead, the user has imprecise space defining information but nevertheless wants to experience a VW affordance representation within a simulation of the first office space. Referring yet again to FIG. 6, exemplary database 46 further includes a set of design rules of thumb 800 that server 12 may apply to user specified seed information to generate at least one suggested VW space layout. Referring also to FIG. 29, an exemplary process 810 that is consistent with at least some aspects of the present disclosure for defining a VW space and for applying design rules of thumb to user specified seed data to generate at least an initial affordance configuration is illustrated.

In FIG. 29. at step 812, the system server 12 the first user provides a general shape corresponding to the shape of a space for which an affordance configuration is to be specified to the server 12. In many cases the general shape will be the shape of an existing real world space that is currently empty or that is currently configured with a dated setoff affordances for supporting employees in which a customer intends tor or is considering building out a new set of affordances for use by employees. In other cases the general shape will correspond to a facility space that has yet to be constructed. In at least some cases the general shape may include two or more separate general areas or shapes such as, for instance, first and second shapes that correspond to first and second floors of an office building that are to be built out. While the general shape may include two or more separate areas or spaces, in the interest of simplifying this explanation, this description will be described in the context of an example where the shape received at 812 is a single shape.

Figure 30:
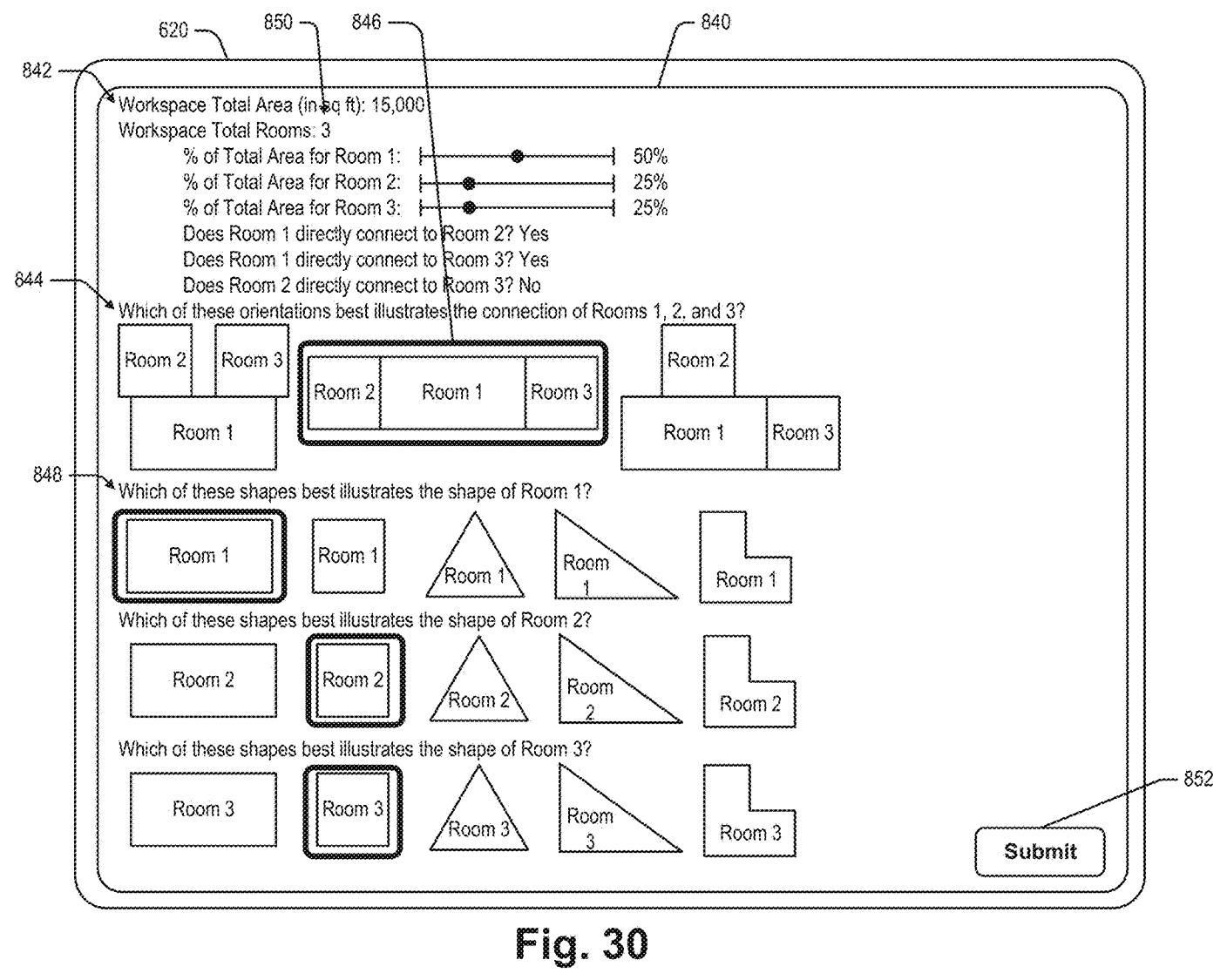

Sever 12 may present the user with an interface including simple tools for manually specifying the general shape of a space to simulate in the VW. One exemplary interface 840 for specifying a general shape is illustrated in FIG. 30. Interface 840 may be presented on any emissive surface associated with system 10 but, in the present example, is shown presented via a top emissive surface 620 of a station 14 table top (see also and again the emissive table top 620 in FIG. 23). Interface 840 includes a plurality of text prompts and other interface tools for specifying general shape. To this end, interface 840 is designed to illicit a minimal amount of information that can be used to define at least a rough representation of a real world space. The exemplary interface queries a user for overall square footage of the space being defined and for a number of rooms that are included in the space as well as information related to how much of the square footage is provided by each of the rooms and whether or not rooms are directly connected to each other at 842. Here, some of the information at 842 may be entered into input fields spatially associated with text prompts while of the information is entered via sliding buttons or other input tools. As shown, in the present example, the total square footage is 15,000 square feet and the user has specified 3 rooms where the first room directly connects to each of the second and third rooms but the second and third rooms do not directly connect.

Given the answers to the text prompts at 842, server 12 may continue to illicit other information selected as a function of the user's answers to the text prompts. For instance, given that the first room connects directly to the second and third but that the second does not directly connect to the third, server 12 can generate graphical representations of every possible three room layout as indicated at 844 and a user can then select one of the layout options via touch. In FIG. 30, a current room layout selection is indicated by a highlighting box 846. The user is also prompted to indicate the general shape of each of the first through third rooms at 848 where highlighting boxes indicate current selections. While certain selections are shown in FIG. 30, hereinafter, in the interest of simplifying this explanation, it will be assumed that the user uses interface 840 to select a single rectangular room option (e.g., the user entered "1" to indicate a single room space at 850 in FIG. 30). Once the general information required in FIG. 30 has been entered the user selects icon 852 to submit the general information to server 12.

Figure 31:
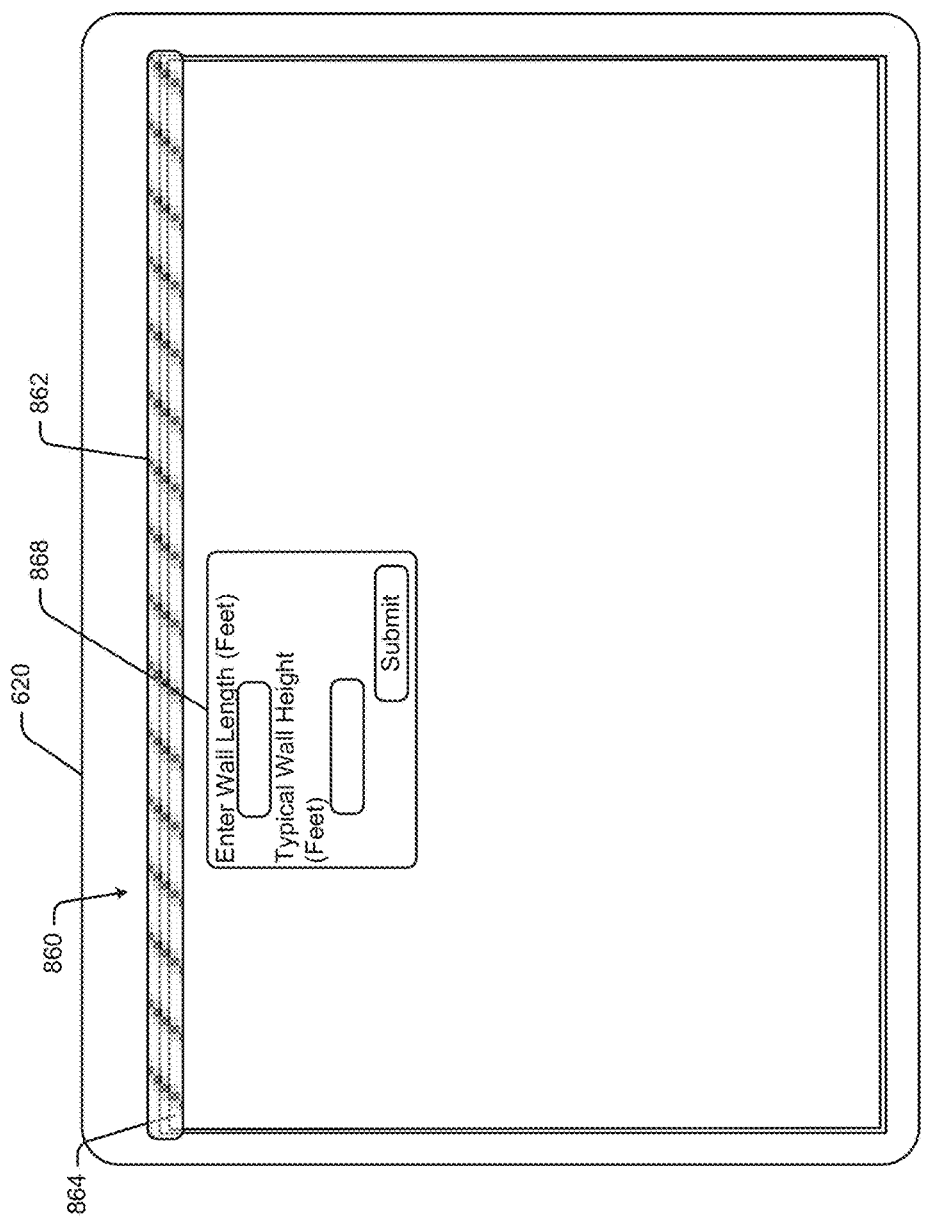
FIG. 31 is an interface that a user may employ to enter wall height and length dimensions for an exemplary wall in a VW representation.

Referring now to FIG. 31, server 12 uses the general information entered via interface 840 to generate an initial space shape representation 860 on surface 620. The server 12 may automatically highlight a first fixture in representation 860 and query for required characteristics. In FIG. 31, the server 12 highlights a long top wall fixture 864 in the presented shape and opens a window 868 to query the user for approximate wall length and height dimensions at process block 814 (see again FIG. 29). Using the square foot and wall length dimension entered via the FIG. 30 and FIG. 31 interfaces the server can calculate the width dimension of the illustrated space automatically. In other cases where the space shape is more complex the server may continue to query the user for additional information until a complete space shape and dimensions can be fully calculated.

Figure 32:
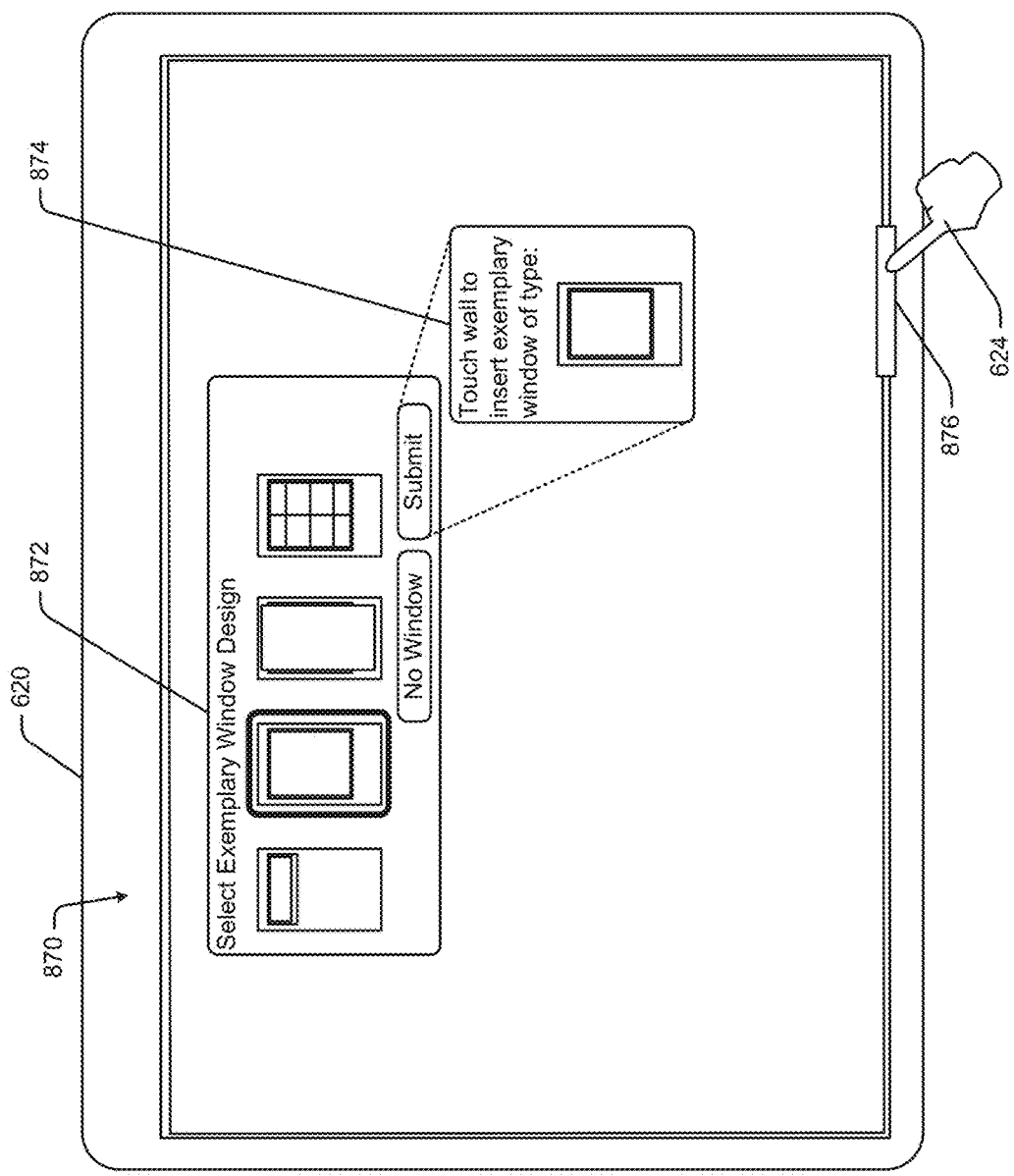
FIG. 32 is an interface a user may use to specify general design attributes via selection of a graphical representation for a typical window within a VW space.

Once wall height and length dimensions are submitted, at process block 816 server 12 presents the interface 870 shown in FIG. 32 inviting 872 the user to indicate exemplary window characteristics in a window at 872. In many cases all windows in a space will have similar characteristics and therefore specifying characteristics for one window may be sufficient to specify all window characteristics. Exemplary window types are presented graphically within the window 872 where a current selection is indicated at 873 via a highlighting box. Once the window design is submitted, still at block 816, server 12 prompts the user to touch locations on the walls that define the rectangular space to add instances of the windows at each location that is touched. Here, in at least some cases it is contemplated that once a user adds a window to a wall, the user may drag the window about to place the window more precisely at any wall location. In addition, to change window width, the user may be able to touch a design handle on ether end of the window representation and drag outward to expand or inward to contract the width dimension.

Figure 33:
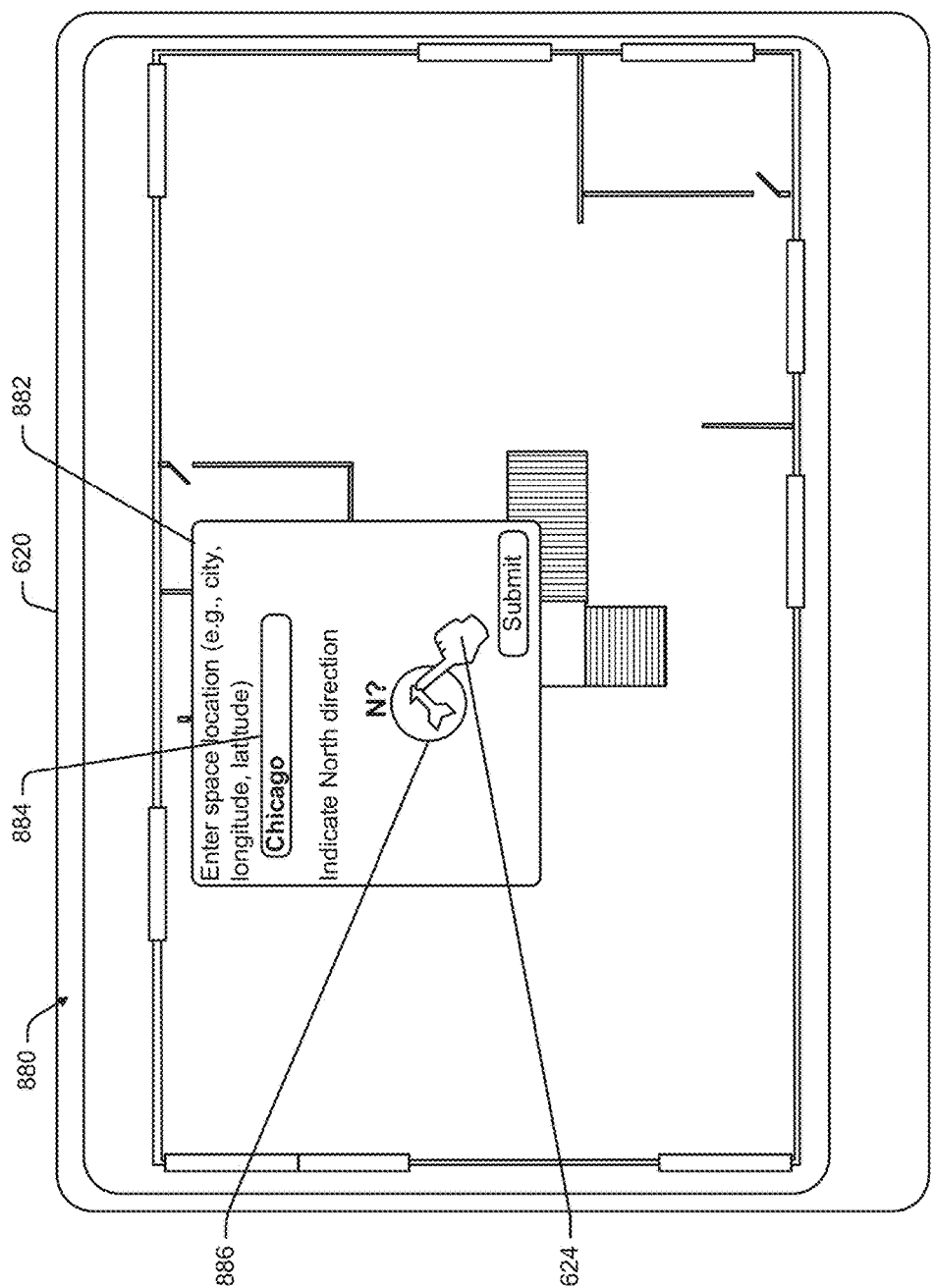
FIG. 33 is an interface for indicating a location and orientation of a space to be represented in a VW.

At block 812 server 12 presents interface tools akin to those shown in FIG. 32 for specifying interior wall locations within the rectangular space, door characteristics (e.g., a solid non-transparent door, a full glass door, a door including an upper glass window, etc.) and door locations, locations of stairwells and other common fixtures that may be present within a facility space. An exemplary defined space including window, interior wall, staircase and door fixtured is shown in an interface view 880 in FIG. 33.

One other ambient aspect that can be simulated in the VW is the effect of natural light that is different depending on geographic location and, for a specific facility space, on orientation of the space within its environment (e.g., which way in North). For this reason, in at least some cases server 12 will also query a user for the geographic location of a space as well as for space orientation. To this end, at block 820 in FIG. 29, server 12 presents interface window 882 in FIG. 33 that queries a user for the location of the space at 884 and that provides a tool at 886 for indicating a north direction. As shown, a user may enter location longitude and latitude or a nearby large city that the server can then use to look up longitude and latitude. Tool 886 allows a user to rotate a North setting arrow via touch as indicated at 624 to indicate the North direction related to the space layout presented at 880. Once the location and orientation information is submitted, server 12 can use the location information along with subsequently specified time of year and time of day information to determine an exact position of the sun in relation to the defined space for any time of day and time of year and can then use the sun position and building orientation as well as the window locations specified for the space to determine the effect of sun light entering the space via each window.

In at least some embodiments, in addition to using the location information to determine natural light characteristics within a space, server 12 may be programmed to be able to generate different scenes outside space windows so that when a window appears in a VW view, the user sees a geographically correct view of the outside world. Thus, for instance, if a space is located in Florida, the outside view may include palm trees and other scenery that is consistent with the Florida location while the server may generate a scene including a snow covered field if the space is in Michigan and the time of year is winter.

After the information described above has been entered by a user, sever 12 creates or generates an empty VW space representation at process block 822 that includes, among other things, all space defining fixtures in their relative juxtapositions and that have at least approximately or substantially accurate dimensions. The VW space representation can be viewed in either a top plan view or in a 3D view or representation as described above.

Figure 34:
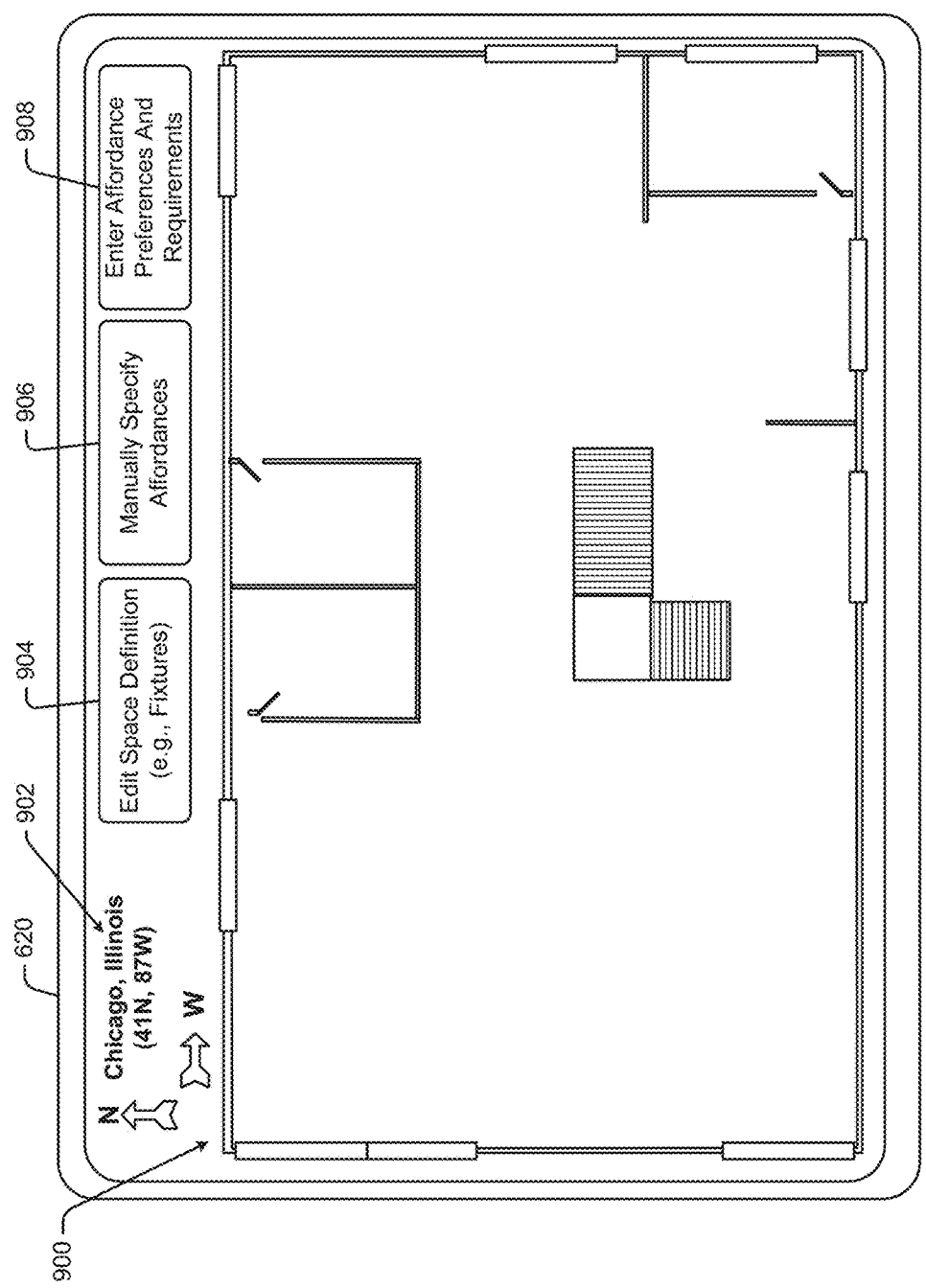
FIG. 34 is an interface presenting a virtual space layout and options for editing the layout and specifying affordances to be added to the layout to generate a VW representation.
Figure 35:
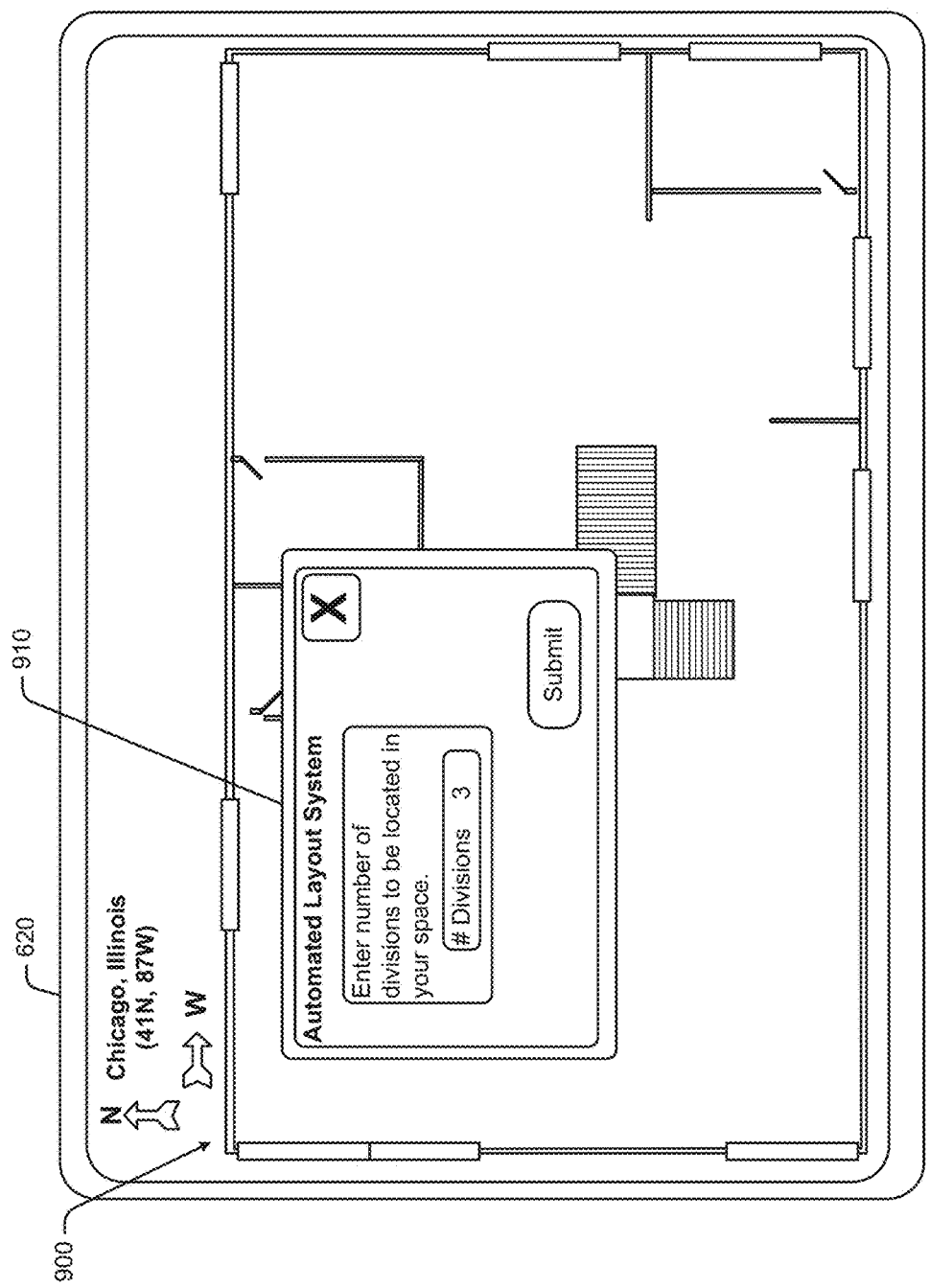
FIG. 35 is an interface view that allows a user to input information regarding at least one useful type of information for an affordance configuration to be automatically configured.

An exemplary top plan view of an empty space presented by emissive surface 620 is shown at 900 in FIG. 34 which includes, in addition to the walls, windows, doors and a staircase, a location and orientation legend at 902. In addition, the interface shown in FIG. 34 includes additional editing options including an icon 904 for accessing other tools to edit the space definition and hence the representation at 902, an option 906 to access tools to manually specify affordances to be added to the empty space and an option 908 to enter user preferences and requirements as seed information useable by server 12 to automatically design an affordance configuration using design rules of thumb 800 (see again FIG. 6).

Where a user selects option 908 to specify seed information control passes to block 824 in FIG. 29 and server 12 starts a process to illicit at least a minimal amount of seed information from the user regarding space and affordance preferences and requirements. FIGS. 35 through 38 show one sequence of interfaces that may be presented to a user via emissive surface 620 to obtain user preference and requirement information. In FIG. 35, server 12 opens up a window 910 and queries the user for information related to a number of employee divisions that are expected to be located within the space being afforded. In many cases company employees are divided into different groups (e.g., design, marketing, engineering, finance, legal, etc.) and employee workstations and other affordances are often arranged so that employees using those affordances are arranged by their respective groups at least most of the time.

Figure 36:
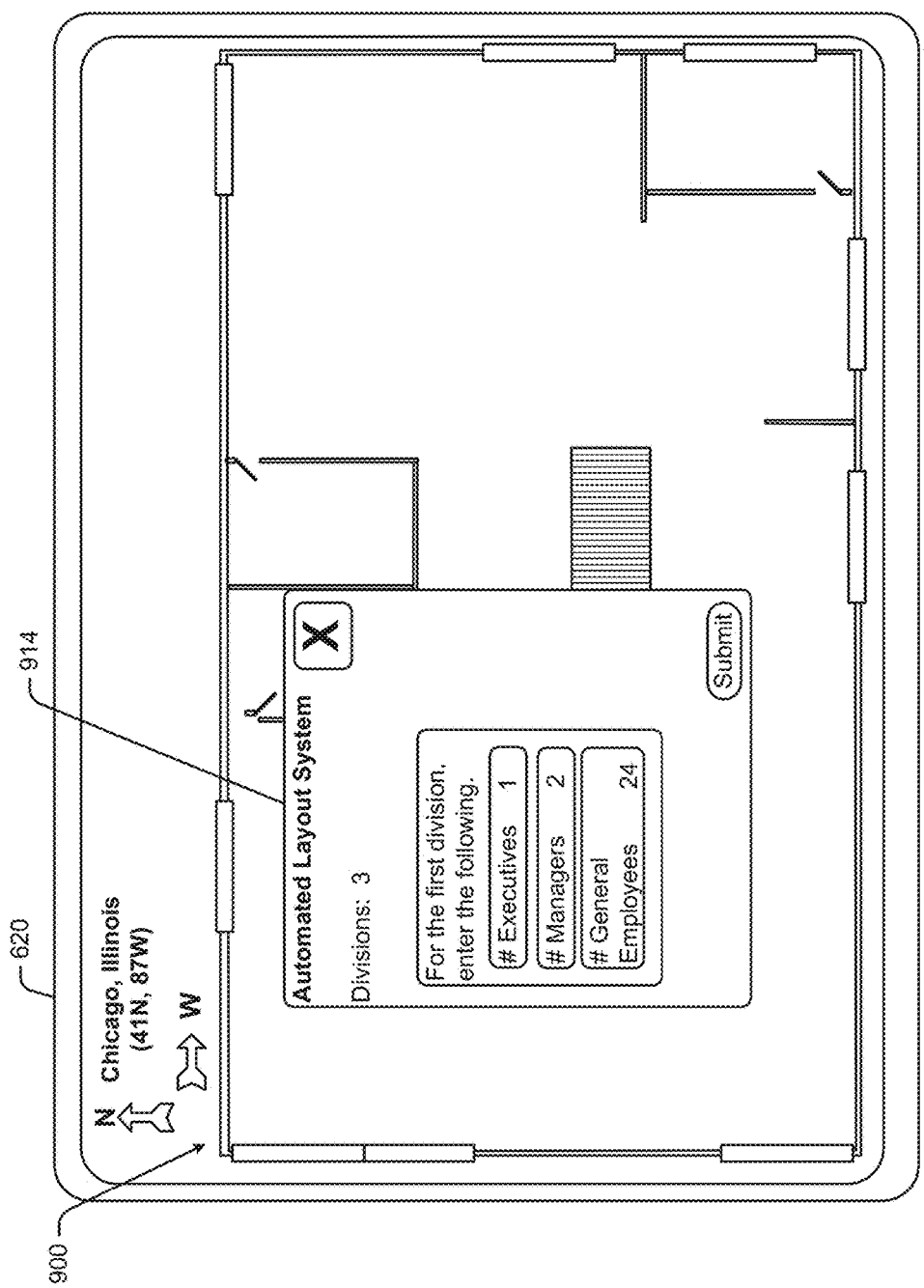
FIG. 36 is similar to FIG. 35, albeit where the interface is for inputting other information useful to automatically designing an affordance configuration.

In FIG. 35, the user submits the number 3 in the present example and then server 12 presents the interface shown at 914 in FIG. 36.

Referring to FIG. 36, next server 12 opens a window 914 to query the number of each of several different types of employees that will be located in a space associated with a first employee division (e.g., finance). As shown, the exemplary window queries the number of executive, managers and general employees in the first employee division. Windows akin to window 914 would be presented for each of the second and third employee divisions as well.

Figure 37:
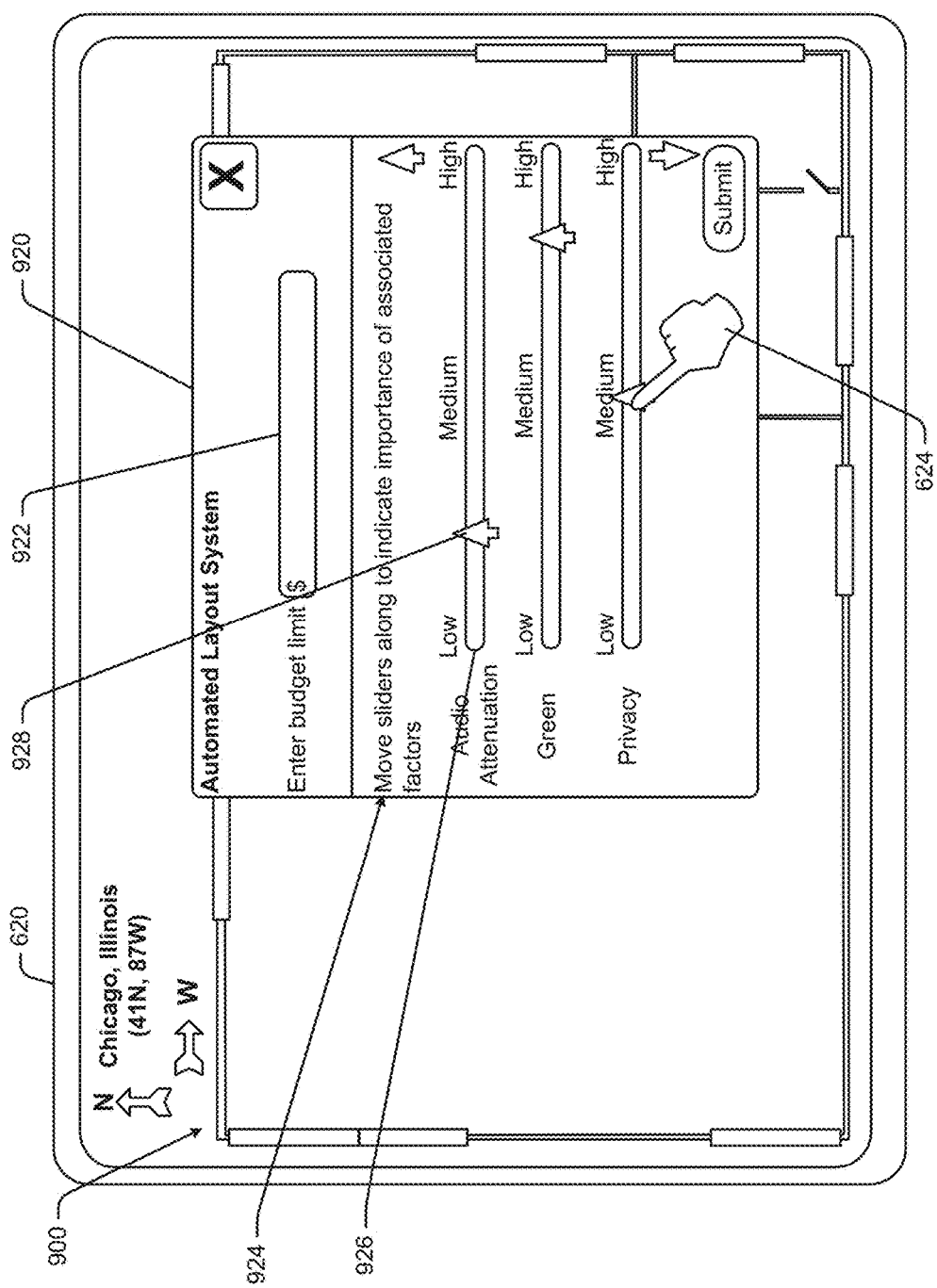
FIG. 37 is an interface for a user to obtain a budget limit as well as information related to the importance of various affordance design and configuration aspects.

After obtaining the employee numbers and categories information via the FIG. 36 interface, server 12 presents a window 920 shown in FIG. 37 to obtain a budget limit as well as information related to the importance of various affordance design and configuration aspects to the user. To this end, window 920 includes a budget field 922 and tools 924 for setting aspect importance values. Three exemplary aspects including "audio attenuation", "green" and "privacy" are presented along with value setting tools for each. The audio attenuation setting tool includes a range line 926 and a slider arrow that can be moved along the range line via user touch and dragging (see 624 in FIG. 37). To generally increase the importance of audio attenuation to an overall design, a user moves slider 928 to the right on the line 926. The green criteria relates to how environmentally friendly the affordances are that are used to fit out a space. Greater environmental import is indicated by moving the slider associated with that criteria to the left. The importance of privacy generally (e.g., personal, work product, etc.) is designated in a similar fashion. While only three criteria are shown in window 920, many other criteria are contemplated and could be presented for user consideration.

In some embodiments the selections made via window 920 may be treated as requirements and in other embodiments those selections may be treated as preferences to be aspired to. In some cases the selections via window 920 may operate as defaults and where more specific values or preferences are set for a subset of affordances or for one or more specific employees or employee type categories (e.g., executives), the defaults may only apply to any cases where more specific values are not specified.

Figure 38:
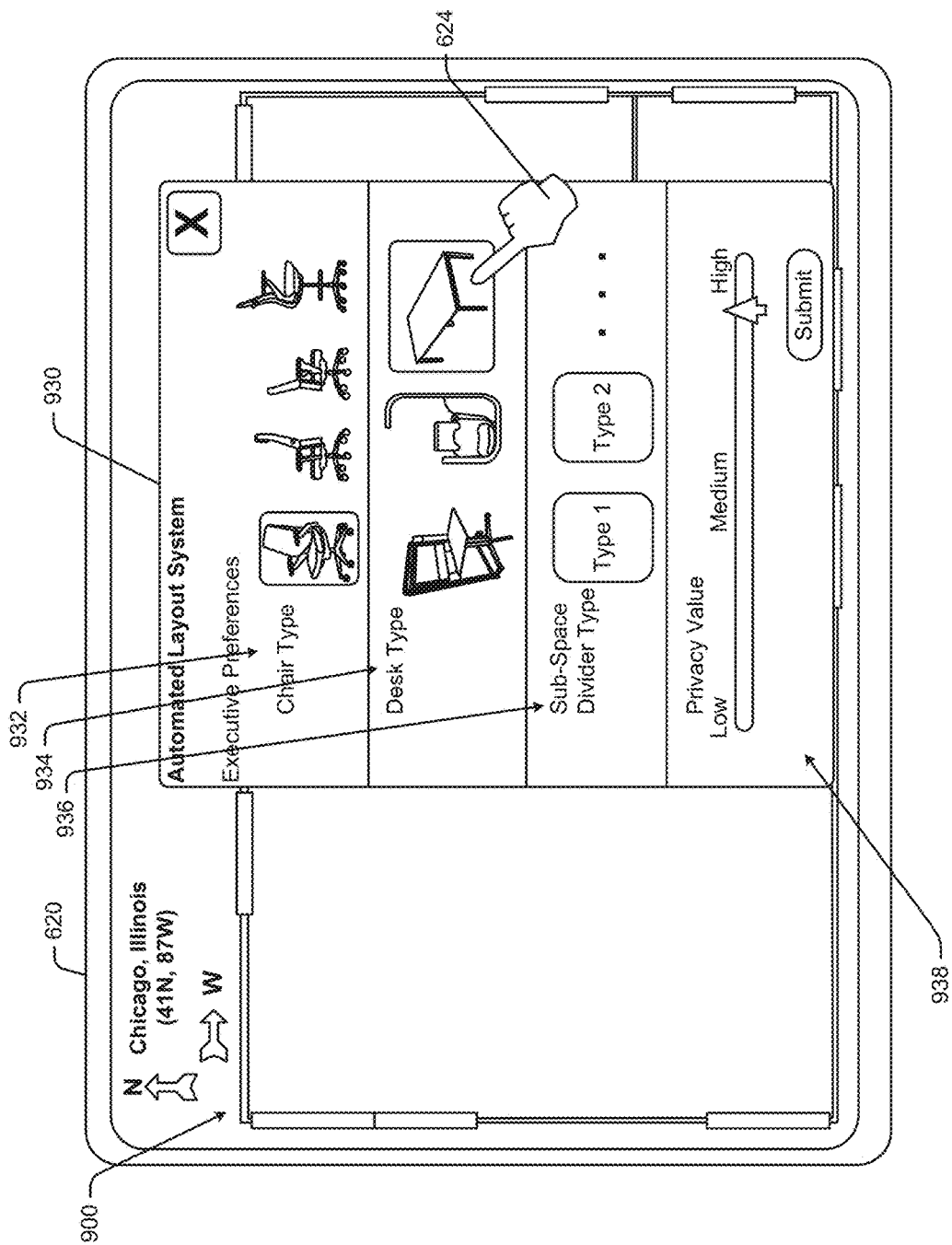
FIG. 38 shows an interface that allows a user to select affordance preferences that can then be used to automatically design an AF configuration.

In FIG. 38 server 12 presents another interface window 930 to enable the user to specify specific preferences or requirements for workstations or spaces to be used by executives. As shown, the user is presented with graphical representations of affordances arranged by affordance type where the user can make one affordance selection from each type. The exemplary affordance types presented include chairs, desks and sub-space diver types at 932, 934 and 936, respectively, that can be selected by touch as indicated by pointer 624.

Window 930 also presents a privacy value setting tool akin to the slider type tools described above with respect to FIG. 37. While general or a default privacy preference was set in FIG. 37, here a different privacy value may be set that is only specific to executives. In some cases the default privacy value may be simply aspirational, only to be achieved when all other preferences have been accomplished, while the privacy value set for executives using tool 938 may be a requirement that must be met. While only one experiential characteristic (e.g., privacy) is shown in window 930, it should be appreciated that many other characteristics are contemplated and may be presented for consideration by the user.

Once the information specified in window 930 is submitted, server 12 may present a window akin to window 930 for each of the manager employee type and the general employee type so that preferences or requirements for each of those employee types can be set. Similarly, although not shown, server 12 may present a window similar to window 930 for a specially designated employee where personal preferences may be set. For instance, a specific executive like the president of a company may require a certain type of seat, desk and office wall structural combination that is different than all others and a window akin to window 930 could be used to specify the user specific unique combination.

Referring again to FIG. 38, a user may opt to only designate certain preferences via the tools in window 930 without designating others prior to submitting the specified information. Where some information sought via window 930 or at least some of the other windows described above for eliciting seed information is not provided, server 12 may simply use default information to configure a space affordances.

Referring again to FIG. 29, after seed information has been submitted and received by server 12 at 824, at process block 826 the server 12 accesses the design rules of thumb 800 (see again FIG. 6) and applies those rules to the seed information to populate the empty VW space representation with affordances and configuration typicals that in a way that best achieves the user's preferences and requirements.

Figure 39:
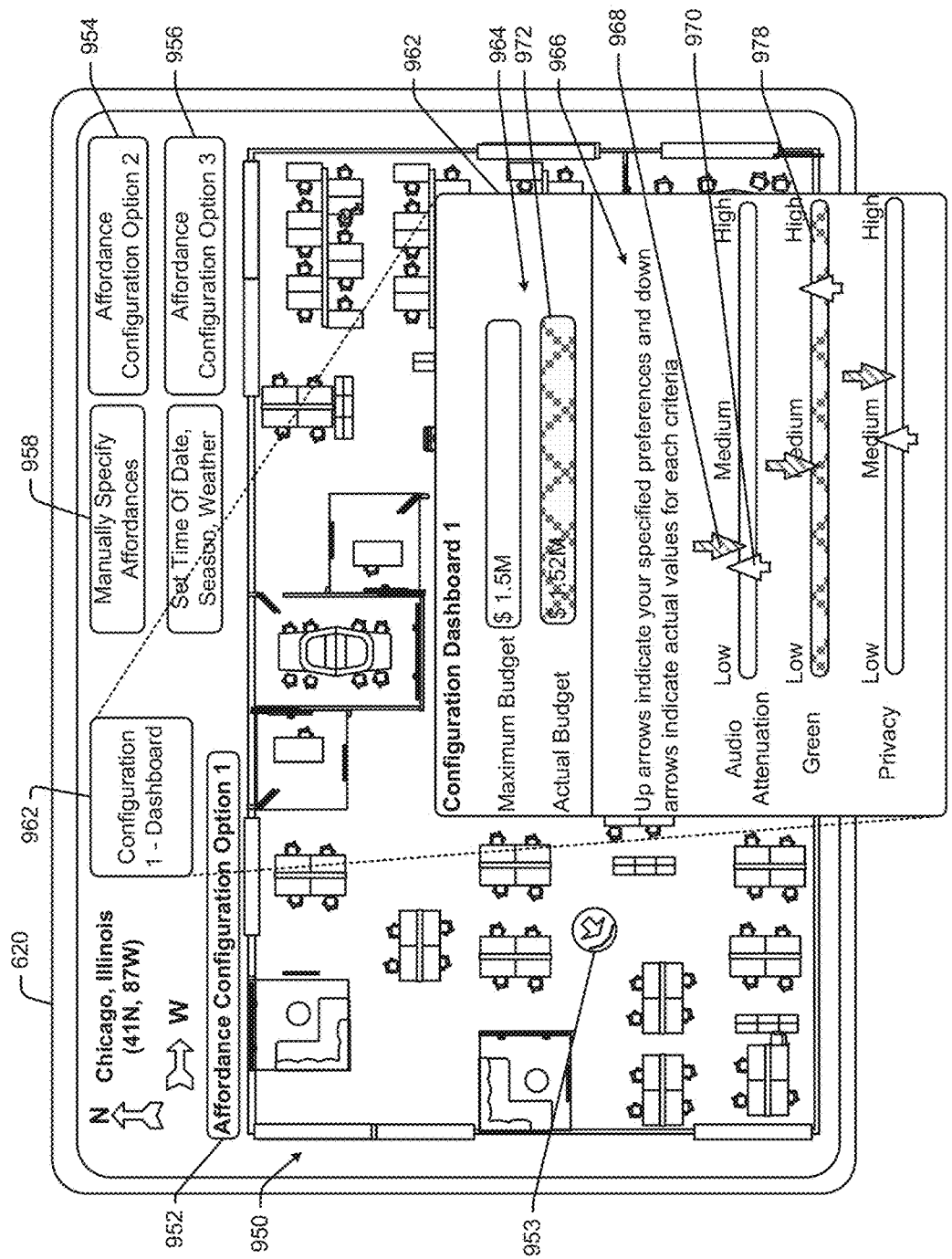
FIG. 39 is an interface that enables a user to specify various constraints and preferences to be used when automatically designing an affordance configuration.

Referring now to FIG. 39, an exemplary affordance and space configuration automatically generated by server 12 using seed information is shown in top plan view at 950. While not shown in FIG. 39, when view 950 is presented on surface 620, an associated 3D VW representation would likewise be shown on station surface 26a through 26c (see again FIG. 3) where the user's perspective would match the user's location at 953 in view 950. As described above, the user could then move about within the VW representation to experience different views and other experiential characteristics of the space and affordances therein. As the user moves about, if the user wants to manually change any aspect of the VW affordances, the user may select icon 958 in FIG. 39 to access tools akin to those described above to make edits which are then reflected in the top plan representation shown in FIG. 39 as well as in the 3D representation on surfaces 26a through 26c.

In at least some cases it is contemplated that where server 12 automatically generates at least an initial affordance configuration using user provided seed information including preferences and requirements, the server 12 may compare the preferences and requirements specified to characteristics associated with the automatically generated affordance configuration and generate at least some metrics regarding how the actual characteristics measure up to the specified preferences and requirements. To this end, see again FIG. 39 where the interface includes a metrics dashboard 962 for the configuration shown at 950. The exemplary dashboard includes comparative budget information at 964 and other specified criteria information at 966. The budget information includes the maximum or target budget indicating a value specified by the user as seed information and an actual budget value which the user can compare to see how the automated design budget compares to the target or maximum budget. The other information at 966 shows user specified target or preference values as upward pointing arrows and the actual values associated with the automated design as downwardly facing arrows for each of the audio attenuation, green and privacy criteria specified by the user via the FIG. 37 interface (compare 968 and 970). In at least some cases the server 12 may synthesize additional information as a result of the comparison and provide additional information. For instance, in FIG. 37 each design preference or requirement that has not been met by the automated design is shown double cross hatched to indicate that the criteria is visually distinguished in the dashboard 962 so that the user can quickly determine how well the design fits the specified requirements and where improvements may be made.

In some embodiments, instead of generating only one automated affordance configuration based on user provided seed information, server 12 may automatically generate two or more completely different affordance configurations to suggest to the user so that the user can experience two or more different configurations relatively quickly. Here it is contemplated that in many cases a user will quickly settle on one or another of the suggested configurations as a starting point for customizing affordance layout for her space. This is especially true in cases where server 12 is specifically programmed to present very different initial first, second, third, etc., automated configurations as opposed to very similar configurations as at least initial automated design options. For instance, in addition to providing affordances in different relative juxtapositions within a space, where first and second different workstation arrangements have very different appearances but each can be used to meet a user's specified seed preferences and requirements, server 12 may use the first workstation type in a first automated design configuration and the second workstation type in the second deign configuration. Similarly, server 12 may include many overhead canopies in a first automated design configuration and no such canopies in a second automated configuration.

Figure 40:
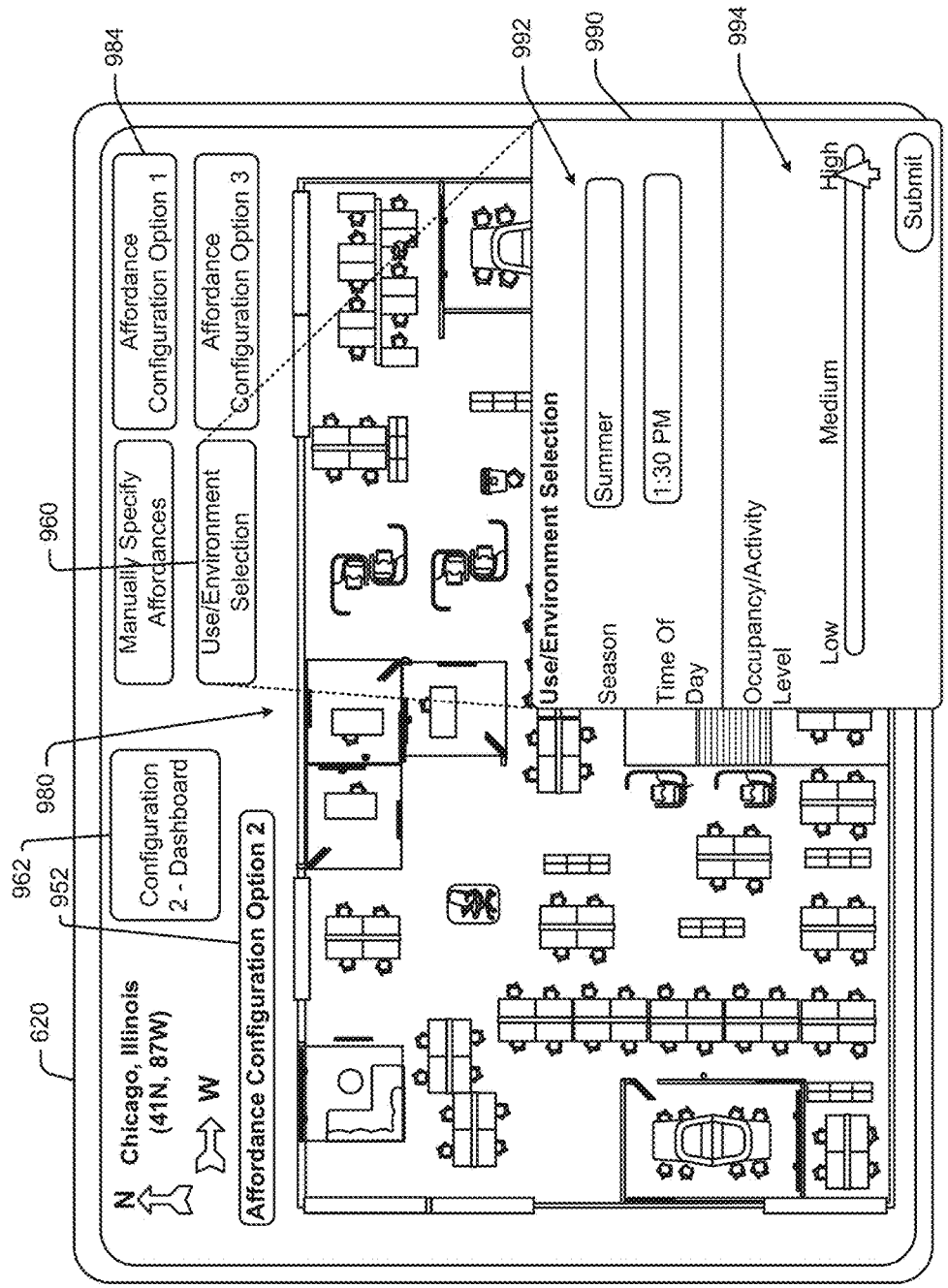
FIG. 40 is an interface that includes a pop up window that may be used to specify a season and a time of day as well as an activity level within a VW representation that is consistent with at least some aspects of the present disclosure.
Figure 49:
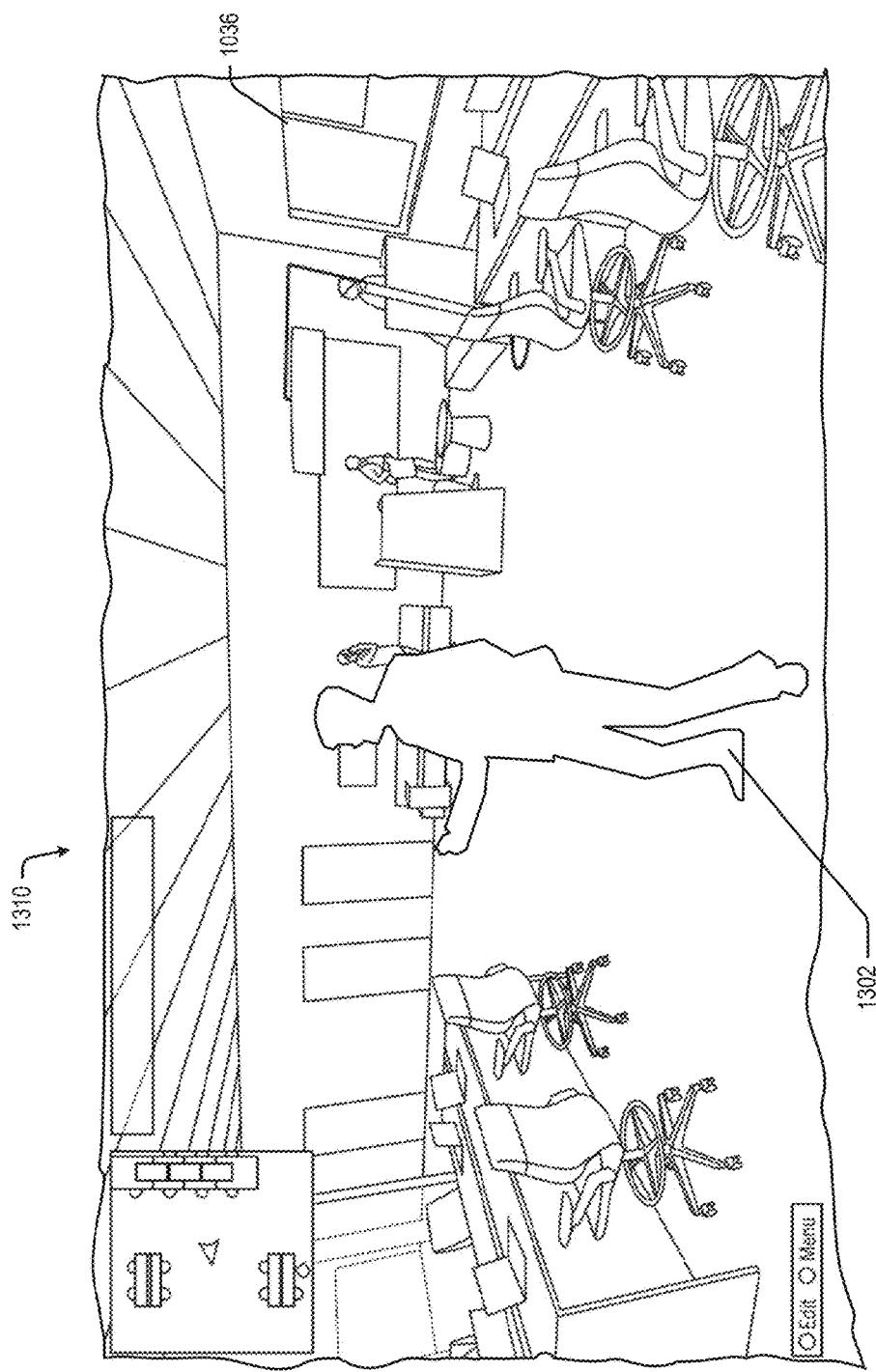
FIG. 49 is similar to FIG. 48, albeit showing the avatar walking away from a current VW location to a different location within the VWE dataset.

Referring again to FIG. 39, where server 12 generates second and third automated design configurations in addition to the first configuration shown at 950, icons for accessing the second and third VW representations may be presented as indicated at 954 and 956, respectively. In addition, to make clear that view 95 is of the first configuration, a label field is presented at 952. If the user selects icon 954 to access the second automated design configuration, the interface shown in FIG. 40 may be presented that includes the second automated design shown in top plan view at 980 and a different label (e.g., indicating the second configuration) in filed 952. Here, an icon 984 for returning to the first automated design configuration 950 in FIG. 49 is provided and the dashboard at 962 is updated to present information akin to that shown in FIG. 39, albeit where the information corresponds with the second automated configuration as opposed to the first.

Referring again to FIG. 39, if the user makes any manual modification to configuration 950, in addition to changing the top plan and 3D VW views to reflect any resulting visual changes, criteria values associated with dashboard 962 may be automatically updated if affected by the changes. For instance, if a user replaces all chairs in configuration 950 with a less expensive type or changes an attribute (e.g., leather is changed to a woven fabric) of all chairs to reduce overall configuration cost, the actual budget cost at 972 would be recalculated and automatically updated. If the actual budget drops to a level at or below the target budget, the double cross hatch at 972 would be removed to indicate that the budget target has been met. Similarly, other criteria values in dashboard area 966 would be automatically updated in essentially real time so that the user can appreciate how design changes are affecting important metrics.

In some cases a user may want to experience a VW representation under different sets of circumstances that occur within a space or within an environment that includes the space. For instance, an experience at a workstation in a VW representation may be very different at 5 AM in the morning when very few occupants may be present in a space than at 11 AM when a meeting in a proximate large conference room lets out and many occupants are moving about and conversing in the general vicinity of the workstation. As another example, many spaces and affordance configurations have a very light pattern at noon when the sun light intensity is often maximum than at 7 PM after the sun has set. Similarly, because sun location in the sky at any location varies with the season, many configurations have a different light pattern at noon in summer than at noon in winter.

In at least some cases server 12 will enable a user to select different use and environment circumstances so that the user can experience affordance configurations and experiential characteristics under different circumstances. To this end see again FIG. 40 that includes a Use/Environment Selection icon 960 that is selectable to access use and environment setting tools presented in a window 990. The tools in window 990 include season and time of day fields and a slider type selector for occupancy/activity level within a VW space akin to the slider type input tools described above with respect to other input interfaces. Once selections in window 990 are submitted, server 12 uses that information to control environment and the level of occupancy and activity within the VW space. Here, it should be appreciated that the VW representation is controlled to reflect a real world case and therefore changes to the use circumstances and environment of a VW space may have little if any change to experiential conditions at at least some locations within the VW representation. Thus, for instance, for a VW location that is completely remote from any external window, natural light changes as a function of season and time of day may have no effect on light patters at that location. Similarly, for a workstation that is remote from all large conference rooms, even if large meetings in each large conference room end at the same time, a user at the remote station may not perceive much change when the meetings end even though the activity level proximate those stations may increase appreciably.

Figure 41:
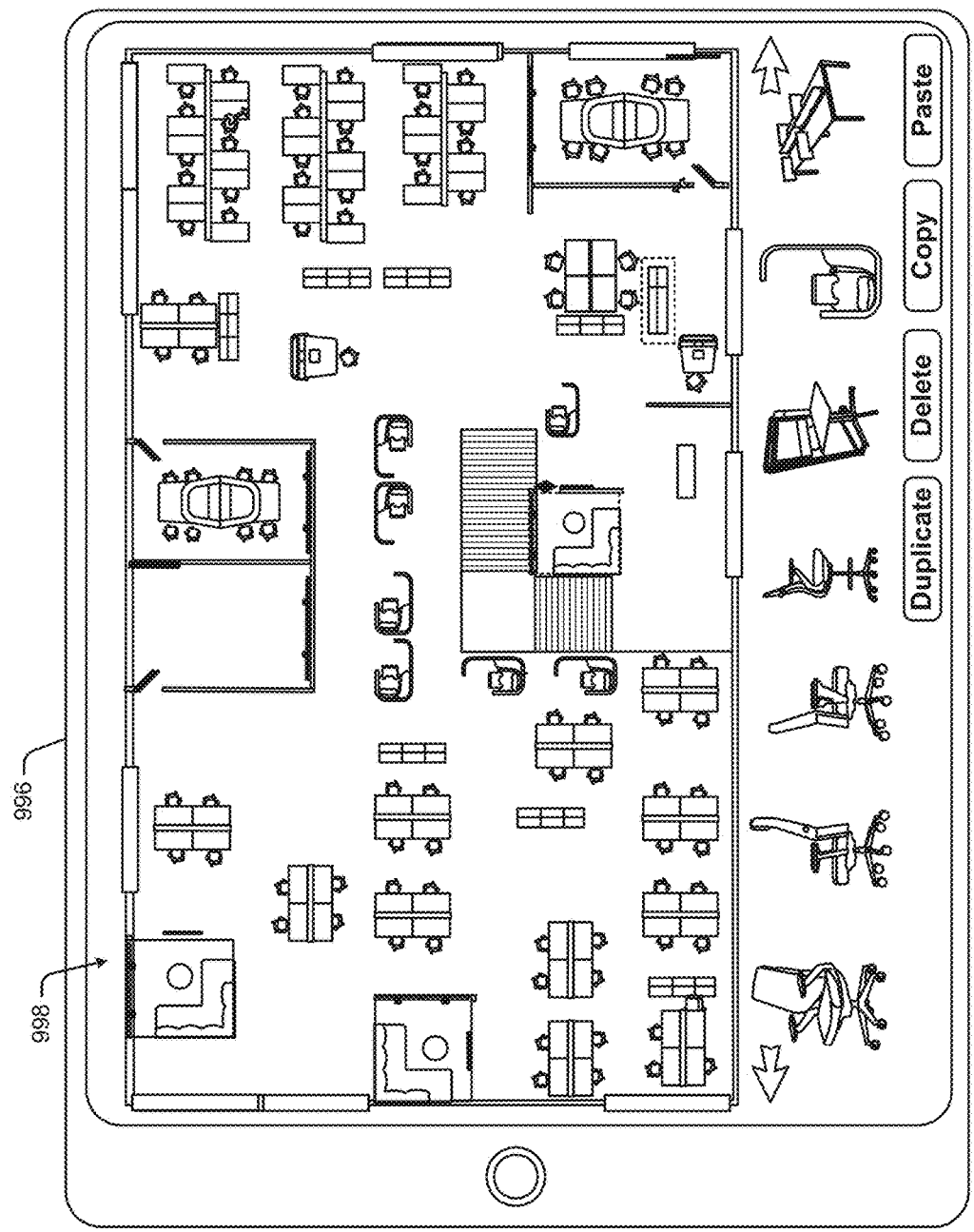
FIG. 41 shows a tablet type portable computing device with a 2D top plan view of a VW space that may be used as a control interface in the VW station shown in FIG. 3.

Any of the interface screen shots or tools that have been described above in the context of the emissive table top surface 620 may be rendered for a user on any flat or even a curved or flexible emissive surface. For instance, one exemplary type of useful and robust flat screen device currently on the market is the tablet type computing device that includes a built in flat panel touch sensitive display screen and a processor that can run many different types of software applications. It is contemplated that an interface application with any set of the functions described above of functions akin thereto could be loaded onto a tablet device and used to interface with the other station 14 hardware described above. To this end, see, for instance, the exemplary tablet computing device 996 shown in FIG. 41 that is shown presenting an interface similar to the interface described above with respect to FIG. 24, albeit with some of the interface tools arranged in a different relative juxtaposition more suitable to the shape of the tablet screen illustrated.

In at least some cases it is contemplated that at least some systems like the system shown in FIG. 3 and described above may be located in an office furniture sales or distributor's product showroom to be used in conjunction with affordance samples and configuration typicals as a design and sales aid. Thus, for instance, a potential customer may visit a product showroom and sit in each of ten different task chair options offered by a manufacturer to compare features, fit, adjustability, feel, etc., so that the customer can develop a hands on appreciation for which chair or chairs she likes the best. In addition, while the showroom may not include every chair type with every type and color of fabric seat and/or backrest cover, swatches of most if not all materials may be available for the customer to visually examine and touch so that the customer develops an informed sense of the qualities of each fabric and each available color. Similarly, the showroom may include an exemplary workstation of each type offered by the manufacturer, exemplary conference room configuration typicals, personal harbors, telepresence systems, lounge chairs, side chairs, screens, diver wall structures, glass wall assemblies of different types, content sharing table and screen assemblies, whiteboards, electronic whiteboards, large emissive surfaces for sharing content, etc., so that the customer can play with and explore how each of those affordances, and typicals might support the customer's employees.

As the customer moves about in the showroom and experiences real world instances of each affordance type, the customer may take notes on which affordances she likes best as well as materials and finishes she likes best and why. Then, after she has a good sense of her preferences, the customer may move to a station 14 in the showroom and start working with the tools described above to experience large scale representations of her favorite affordance combinations in the VW. To this end, in at least some cases it is contemplated that server 12 may query the user for her favorite affordances, configuration typicals, materials and finishes as well as some simple parameters like number of employees to support within a configuration and the importance of one or a small subset of experiential characteristics in a fashion similar to that described above with respect to FIGS. 35 through 38. Then, server 12 may automatically generate a VW affordance layout that is consistent with the customer's preferences. Here, the affordance layout may be in a nonspecific VW space as opposed to a space that the customer is thinking about re-affording. Thus, for instance, the customer may simply indicate favorite chairs, desks and conference room configuration typicals of type 1, type 2 and type 5, respectively. Teal leather for all chairs and brown walnut for desk top finishes and indicate that a space should be configured to support 25 employees including workstations, conference spaces and personal harbors. In this case, server 12 may again access design rules of thumb 800 in FIG. 6 and apply those rules to the customer's seed data to generate a 3D VW dataset 200 to drive surfaces 26a through 26c. As in the example described above related to automatic generation of a VW representation based on user seed information, here, the server 12 may also generate two or more different 3D VW datasets that define different VW affordance and typical configurations that are each consistent with the user's seed information, but that are each very different so that the system can help the user think about various options available that each meet at least the initially expressed user preferences.

In some cases it is contemplated that customers may be provided a form for tracking their preferences as they walk through the showroom so that the user has a way of memorializing her preferences in a way that will be required to answer seed information queries from the system server 12. For instance an exemplary form may include a task chair section where a user selects at least a preferred and, in some cases, second and third chair options as well as chair materials and finishes that are preferred. The form may also include workstation choices, materials and finishes, conference room typical options, materials and finishes, glass wall options, etc.

In some cases the form may require a use to make selections in a way that can be recognized by some type of system sensor at station 14 so that, once the form is filled out and presented to the sensor, the user's preferences can be automatically gleaned from the form. In addition to helping the user gather information about her preferences in a form that is useful to server 14, this type of form reduces the amount of customer work required to provide the seed information to the system that is required to generate a VW representation that is consistent with the user's preferences. Here, one exemplary particularly useful form type may be one where a user's preferences are indicated by filling in dots adjacent specific affordance and attribute or feature options and the sensor may include some type of scanner, a CCD camera, etc. In other cases, a user may simply circle options on a form and a camera at station 14 may be able to generate an image of the form useable by a machine vision processor to identify which options are circled by the user.

Figure 42:
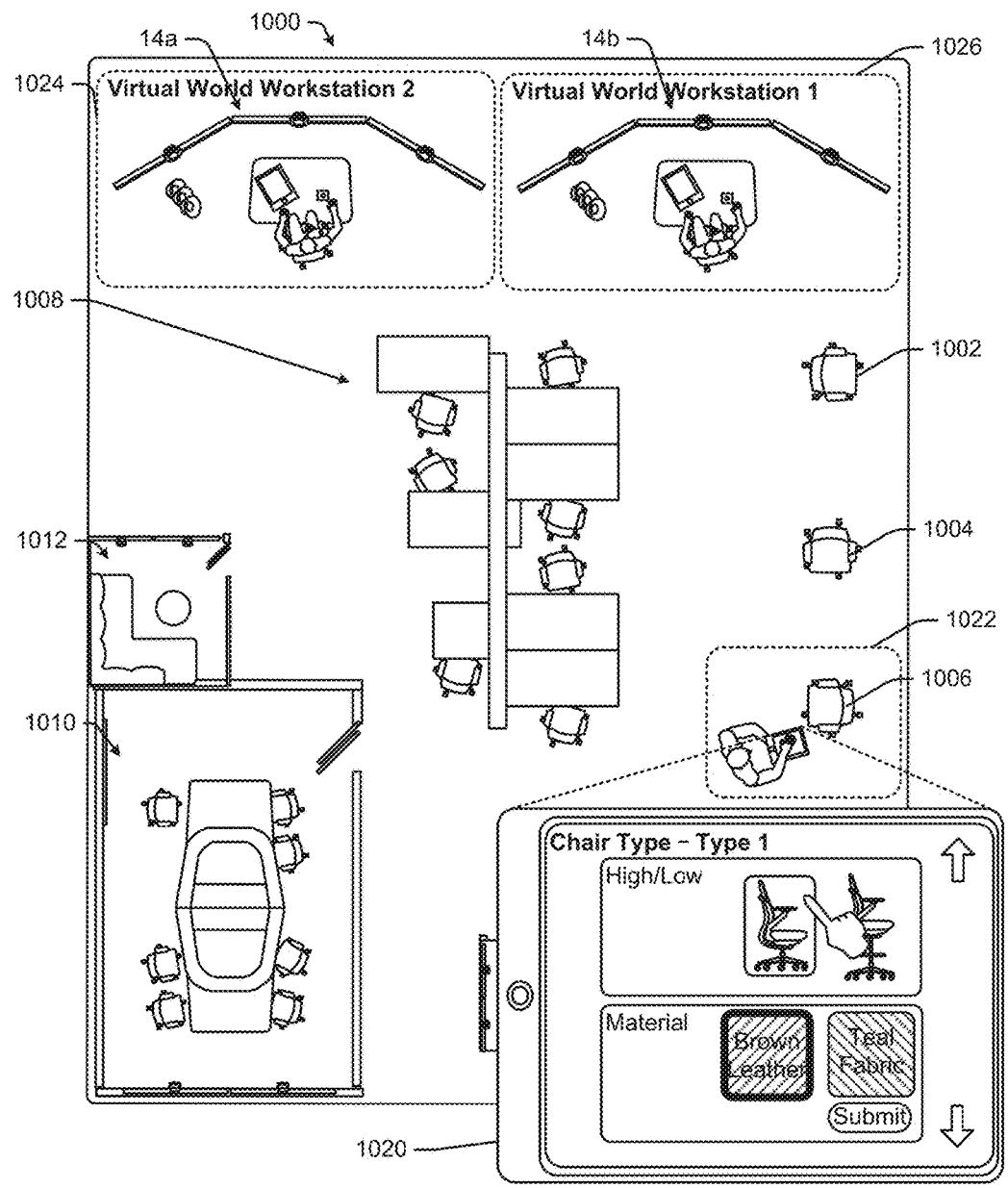
FIG. 42 is a schematic top plan view of an office furniture showroom and a tablet type computing device that is sued to gather customer preference information that is subsequently used as seed information by a system server to generate a 3D VW representation that is consistent with the user's preferences.

Instead of providing forms to customers that need to be filled out, in at least some cases where tablet, smart phone or other types of portable computing devices are available, it is contemplated that an application run thereon may gather preference information from a customer as the customer moves about in a showroom and the information collected may then automatically be provided to server 12 to automatically generate one or more VW affordance configurations for consideration by the user at station 14. To this end, see FIG. 42 that shows a simplified exemplary top plan view of a showroom 1000 that includes first and second VW workstations at 14a and 14b that are equipped with hardware similar to that described above with respect to FIG. 3. In addition, showroom 1000 includes exemplary affordances 1002, 1004, 1006 at different locations as well as several configuration typicals including a bench type multi-workstation assembly at 1008, an eight person conference room typical at 10010 and a telepresence room at 1012.

Customers in the showroom 1000 are either provided with portable tablet computing devices when they enter the showroom for use therein or they may use their own tablet devices 1020 while in the showroom. In either case, each tablet 1020 has a showroom application loaded thereon so that the tablet can be used in various ways within the showroom. The showroom may be virtually divided into separate zones (e.g., only three shown at 1022, 1024 and 1026) associated with different affordances, configuration typicals and stations VW stations and may be equipped with wireless access points (not illustrated in FIG. 42) that interact with the tablets to determine tablet locations within the showroom and, more specifically, when any one of the tablets is located within a specific one of the zones.

One feature of the tablets may be that when a tablet is located in a specific zone associated with a specific affordance type, the tablet presents useful information related to the affordance in the zone. Thus, for instance, where the affordance 10006 associated with zone 1022 is a type 1 task chair, tablet 1020 in zone 1022 may automatically present information indicating the chair type (e.g., Type 1), information about development of the chair, special chair features, fabric, material and finish options and accessories and options that may be included with the chair, etc. If the customer moves into a different zone associated with a different affordance, tablet 1020 may automatically replace the Type 1 chair information with information associated with the affordance in the next zone.

In addition to presenting affordance information, tablet 1020 may also present tools that can be used to memorialize customer preferences that can subsequently be used to drive a VW server at one of the stations 14*a* or 14*b*. For instance, see the exemplary simplified preference ranking interface on tablet 1020 in FIG. 42 that allows a customer to indicate preferences for the type 1 task chair. More complex ranking tools are contemplated and should enable a customer to indicate at least one and in some cases several types of each affordance in a ranked order (e.g., first, second, third preferred task chairs).

In cases where a customer indicates a preference for a specific affordance, if there are other affordances in the showroom that strongly compliment the preferred affordance for any reason, tablet 1020 may suggest the complimentary affordance and guide the customer to that affordance on the showroom floor for consideration. In addition, in this case, tablet 1020 may describe why the affordances are complimentary, present statistics on how often the two affordances are used together or purchased together, etc.

After the customer has finished examining showroom affordances and typicals and has gathered information on preferences via tablet 1020, the user may enter zone 1024 associated with station 14*a*. In at least some cases, immediately upon entering zone 1024, a system server may sense the customer's tablet 1020, access the customer's preferences and automatically generate a VW representation of an exemplary affordance layout that is consistent with the user's expressed preferences. Here, where a user has ranked several different types of each affordance (e.g., a first task chair preference, a second task chair preference, etc.), the system may, at least initially, generate and present a VW representation that includes first ranked preferences and offer VW representations using second and other preferences as other VW options to experience. At least initially the system may use default values for requirements that would not typically be specified in the preference selection process such as, for instance, number of employees to support, number of managers, experiential characteristic goals (e.g., privacy, sound attenuation, etc.). Thus, for example, a default number of employees and number of managers may be 25 and one, respectively, and privacy and sound attenuation targets may be 6 and 8, respectively. Thus, immediately upon entering zone 1024 or shortly thereafter, a VW representation that includes all of the customer's expressed preferences may be presented for consideration and to invite the customer to become engaged in the design and experiential process.

Figure 43:
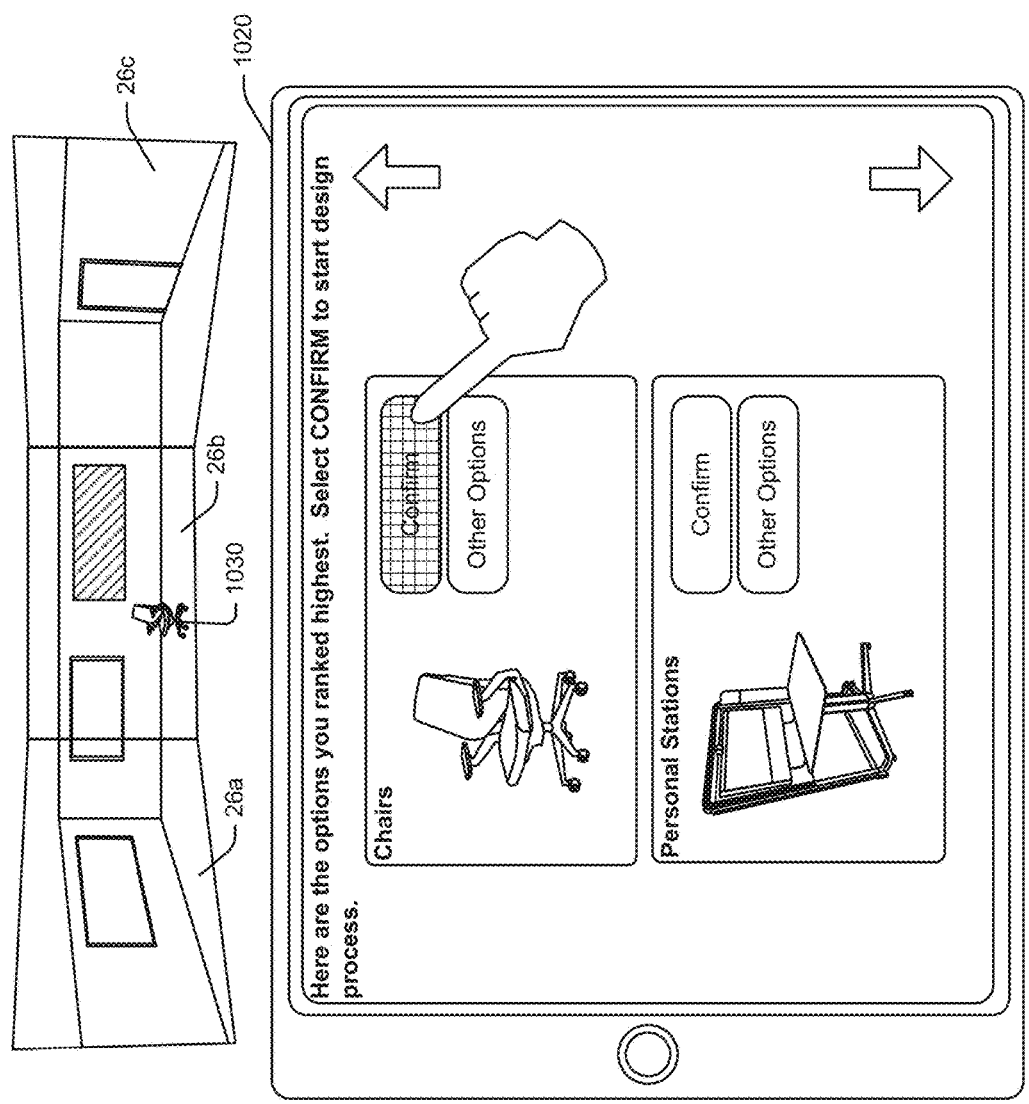
FIG. 43 is a schematic view showing the tablet of FIG. 42 being used to confirm user preferences at a VW station like the one shown in FIG. 3.

In other cases, when the customer enters zone 1024, station server 12 may initially present user preferences for confirmation by the user prior to presenting a VW representation. To this end see FIG. 43 where tablet 1020 is shown presenting preference confirmation tools that enable a customer to either confirm prior expressed preferences or to select other options or rank different preferences. As a preference is confirmed, in at least some cases an instance of the preference may be added to a VW representation on surfaces 26*a* through 26*c* as indicated at 1030 to start a manual affordance design process.

One advantage of employing portable tablets in a showroom space and, more specifically, customer owned tablets, is that when a customer leaves a showroom, the customer can take affordance information and preferences along to memorialize her experience. Thus, the customer can refer back to the preference information and other affordance information to reaffirm her VW experience at station 14*a*.

In some embodiments server 12 may enable a customer to take snap shots of various views within a VW representation to memorialize a customer's experience. To this end, see the snap shot icon 1034 in FIG. 8 that may be selected to generate an image of the VW representation for subsequent access. Similarly a customer may be able to have server 12 generate short videos of different VW scenes or a video of an entire VW experience via selection of a video icon 1036 option as shown in FIG. 8. Where VW images or video clips are generated, they may be stored in a file and rendered accessible to the customer via the customer's tablet after leaving the showroom 1000.

In particularly advantageous embodiments it is contemplated that a customer may be able to access a complete 3D VW dataset remotely via a tablet or the like after leaving a showroom 1000. Here, while the experience would not be immersive like the experience at one of the VW stations 14*a*, the customer would still be able to move about within the VW representation and experience various vantage points and other experiential characteristics therein.

While remote access to affordance and VW content is described above in the context of a customer's tablet, it should be appreciated that any of the remote access capabilities may also be provided to customers or other users via any type of remote computer like, for instance, a desktop workstations, a laptop, etc. In some cases remote access may be provided via a browser on a remote computer and in other cases dedicated applications may be used to facilitate remote access.

Figure 44:
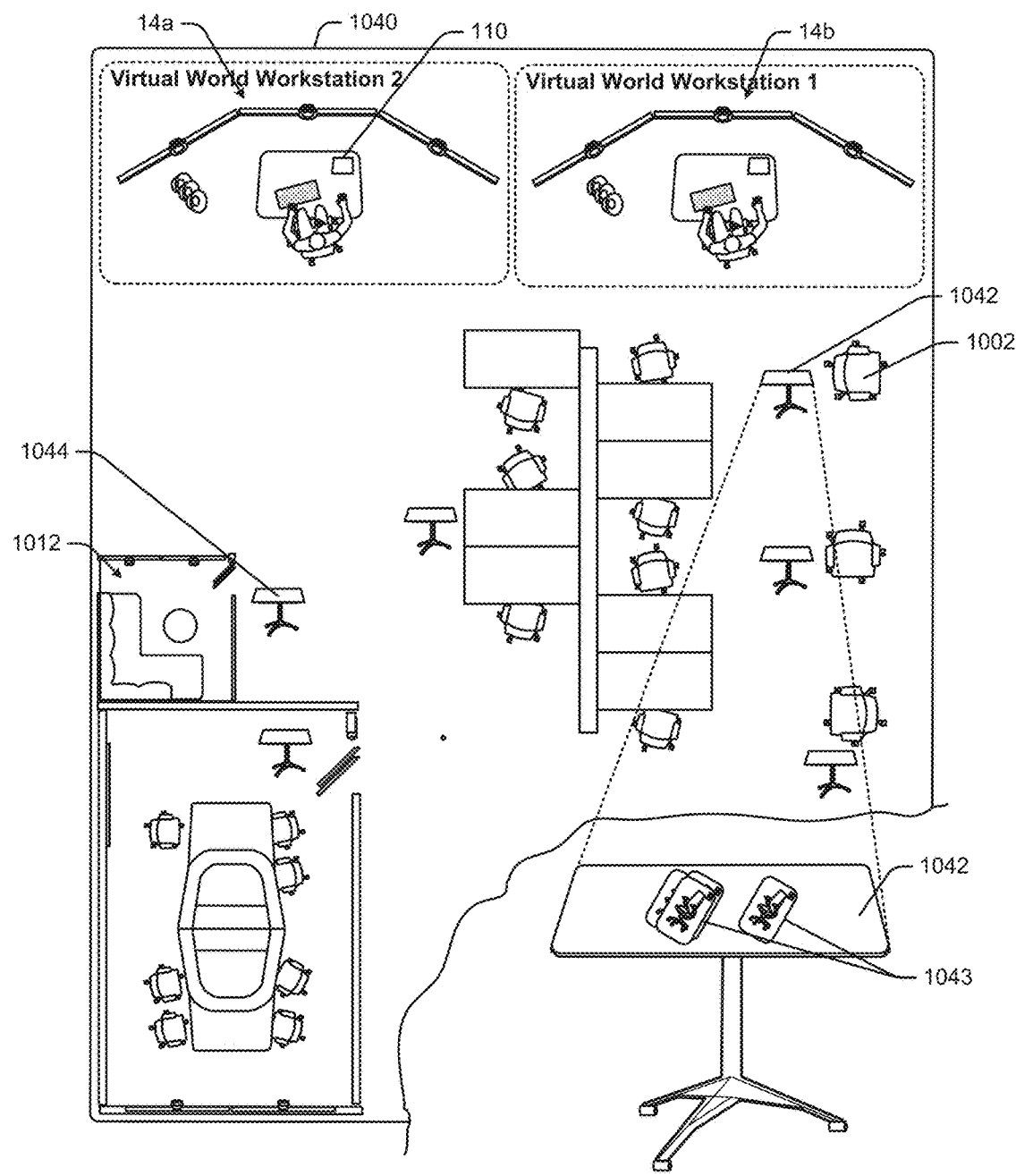
FIG. 44 is a view similar to the view shown in FIG. 42, albeit where product cards are gathered by a customer while experiencing affordances on a showroom floor where the cards are subsequently used to present seed data to a sever that automatically generates an affordance configuration.

In still other cases it is contemplated that affordance specific information cards may be included at locations in a showroom that are associated with different affordance types and that a customer may gather affordance preference information by collecting a card deck including a separate card for each affordance that is of interest to the customer. In the regard, see FIG. 44 where another exemplary showroom 1040 is illustrated that, like showroom 1000 in FIG. 42 includes affordances (e.g., 1002) and configuration typicals (e.g., 1012) arranged at different locations within the space as well as VW stations 14*a* and 14*b*. A table with affordance cards thereon is provided adjacent each of the affordances or configuration typicals. Thus, for instance, table 1042 with cards 1043 is located adjacent affordance 1002 while table 1044 with cards thereon (not illustrated) is located adjacent telepresence typical 1012, and so on. In at least some cases each card will include an image of an associated affordance along with its name and at least some text description of interesting features of the affordance. In addition, each card will include a code (e.g., bar code, matrix code) or a machine readable tag (e.g., near field RFID) that includes or enables database access to an affordance identifier. In some cases each card may be the size of and have a stiffness akin to a conventional poker playing card so that the user can stack multiple cards to form a deck and the deck will fit easily into a pant or jacket pocket.

A user interested in a specific affordance on the showroom floor takes a card 1043 from the associated station as the user moves about from one station to the next. As the user moves through the showroom, the user accumulates a deck of cards, one for each affordance type of interest. When the user wants to experience an affordance configuration in the VW, the user moves to station 14*a*. Referring still to FIG. 44 and also again to FIG. 14, a card reader device 110 is provided at the station which includes a sensor for reading the codes or tags on each the cards. Here, in some cases a user may present one card at a time to the sensor device to be read and server 12 may use the affordance identifying information on the cards to recognize user preferences and then generate a 3D VW representation for the customer to experience via surfaces 26*a* through 26*c*.

Figure 45:
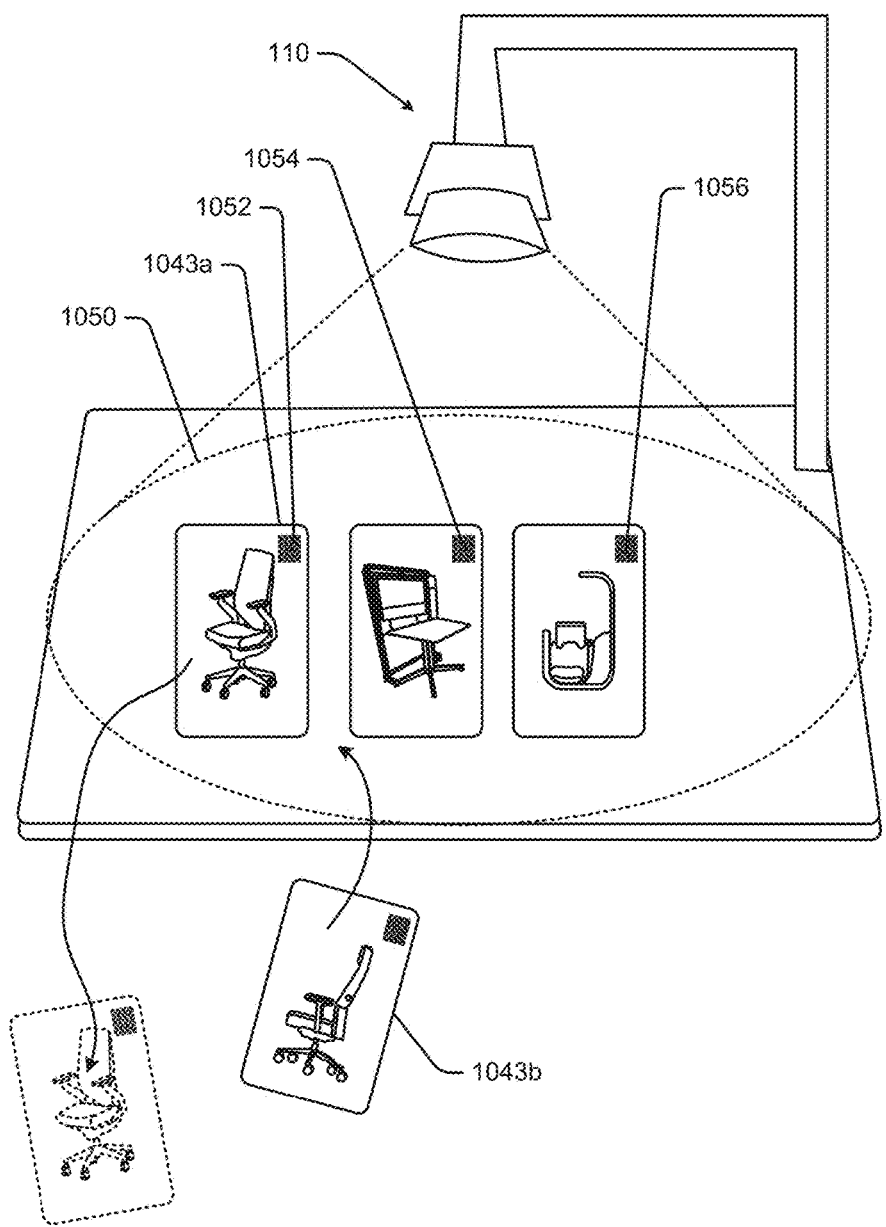
FIG. 45 is a schematic view of a card reader device at a VW station for reading product cards.

In some cases the reader device 110 may accept several cards at once and the user may be able to swap cards in and out of a sensor reading field to swap different affordance types in and out of the VW representation. To this end, see for instance the exemplary reader device 110 in FIG. 45 that includes a camera sensor with a field of view at 1050 large enough to read several ID codes 1052, 1054 and 1056 off a subset of a customer's card deck simultaneously. A first card 1043*a* is associated with a first task chair type while a second card 1043*b*, shown outside the camera's FOV, is associated with a second task chair type. In this example, a VW representation would include chairs of the first type because card 1043*a* is sensed in the FOV. To swap chairs of the second type for chairs of the first type in the VW representation, the customer may simply remove card 1043*a* from the FOV as indicated in phantom and replace that card with card 1043*b* associated with the second type of chair.

In at least some cases it is contemplated that two people may want to simultaneously view a VW representation at the same time to experience an affordance configuration together. For instance, where a space design expert is working with a customer, the design expert may want to participate in at least some of the customer's VW experience to either identify customer preferences or guide the customer within a VW representation for some reason. Thus, for instance, a design expert may want to present different finish options to a customer in the VW or may want to help the customer experience the difference between workstations with and without overhead canopy accessories.

Figure 46:
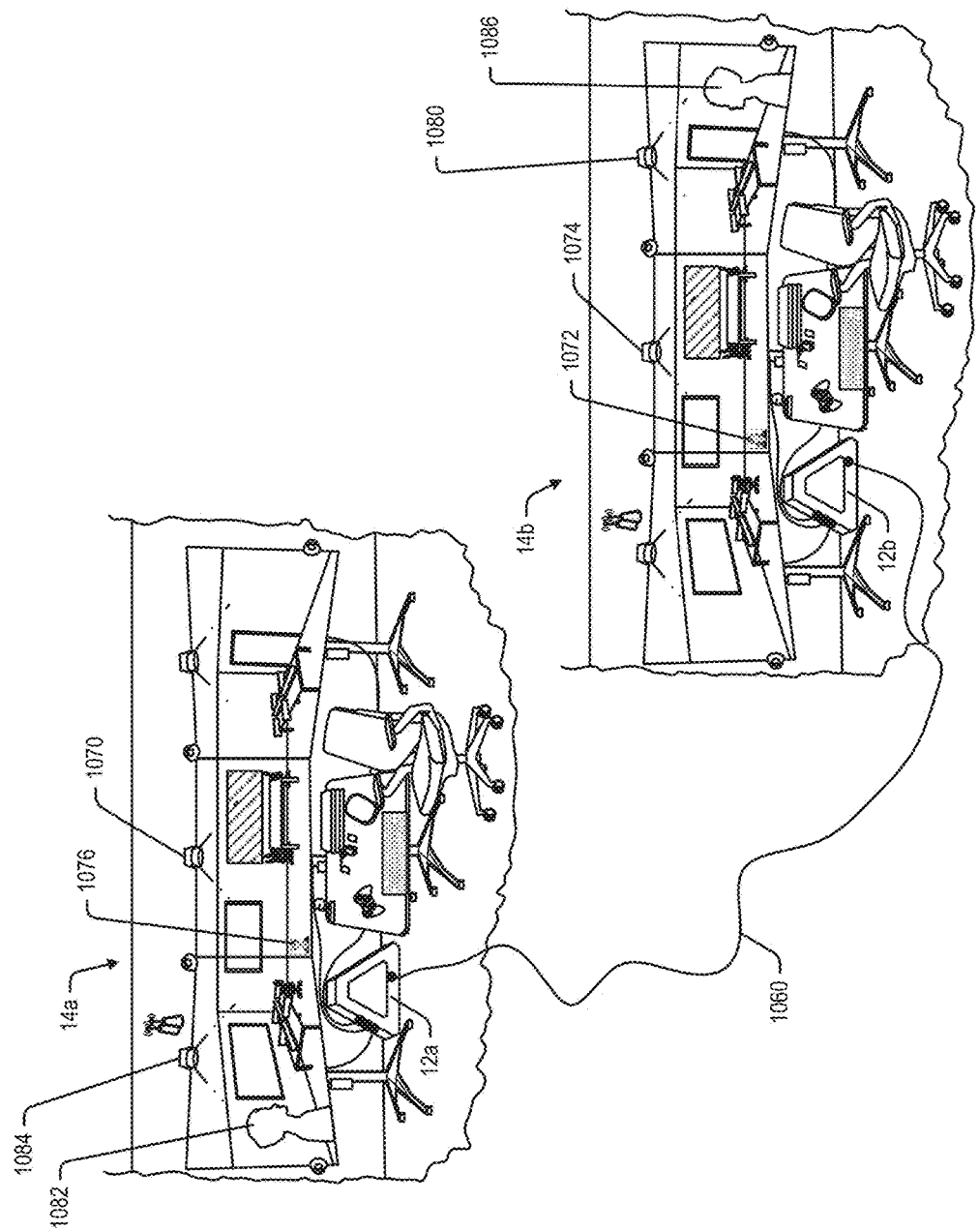
FIG. 46 is a schematic view showing first and second remotely located W stations that are linked together so that two system users can simultaneously experience a VW representation.

Referring to FIG. 46, to allow two or more users to simultaneously experience a VW together, in at least some cases two or more servers 12*a* and 12*b* at remote stations 14*a* and 14*b* may be linked via the internet or some other type of communication network 1060 so that the emissive surfaces at each station present identical VW views during a sharing session. Thus, where a customer or the design expert moves from one VW location to another in the VW representation at station 14*a*, the other of the customer and design expert would simultaneously move to the same VW location at station 14*b*. Similarly, where the design expert swaps out all type 1 chairs in a VW representation for type 2 chairs, each of stations 14*a* and 14*b* would show the results of the swapping action simultaneously.

In at least some cases it is contemplated that where two or more stations 14*a* and 14*b* are driven with the same VEW representations so that two users can experience the VW simultaneously, each station 14*a* and 14*b* may also present a representation of the user at the other station so that each of the two users has the sense that users are collocated in the VW. For instance, referring still to FIG. 46, at least one camera at each station 14*a* and 14*b* may generate real time video of the user present at that station and may present a representation of that user at the other station. For example, central camera 1070 at station 14*a* may record a front view of a first user at station 14*a* and present the video of that user at station 14*b* as indicated at 1072 while front camera 1074 at station 14*b* records a video of the user at station 14*b* and presents that video at station 145*a* as indicated at 1076.

In other cases one of the side cameras at each station may generate a side video of the user threat and the side video may be presented on one of the lateral emissive surfaces at the other station to give the two user's a sense of being side by side as they experience the VW. In this regard, see again FIG. 46 where right side camera 1080 at station 14*b* generates a video of the user at that station and presents the video at 1082 on the left side emissive surface at station 14*a* and left side camera 1084 at station 14*b* generates a video of the user at that station and presents the video at 1086 on the right side emissive surface at station 14*b*. When aligned in this fashion, the first and second users at stations 14*a* and 14*b* are oriented in the VW at the same location and left and right views are aligned so that when the user's look at each others side surface video image, they will have a face to face experience.

While not shown, it is contemplated that a tablet, laptop or other single screen computer device may be used as a remote device linked to a station 14 where a first user at the station has an immersed 3D view at the station and a second remotely linked user has a single screen view into the VW that is, in at least some cases, a mirror image of the VW view presented by the central emissive surface 26*b* at the station 14. In this way, if a design experts customer has access to a station 14 and the design expert does not, the two users can still participate together in viewing and experiencing the VW representation in a meaningful way.

As described above, in some cases a user may either have access to data or will be able to generate data with the help of system server 12 that can be used to develop a virtual representation of their real world space that is to be afforded or they will not and, instead, will operate in either an open virtual space (e.g., no walls or fixtures) or in some type of default virtual space when specifying or viewing affordance configurations. In at least some cases it is contemplated that a user will work in a default or open virtual space at least initially to generate VW representations of preferred affordance characteristics and will only subsequently be able to generate or provide data required to develop the virtual representation of their real world space. Here, in at least some cases it is contemplated that server 12 will be able to take a VW representation developed in an open or default virtual space and attempt to "fit" that representation into a subsequently specified virtual space that has different limitations (e.g., dimensions, shape, etc.). Thus, for instance, assume that a user develops a preferred affordance configuration for a square default virtual space and later provides data to server 12 that defines a rectangular virtual space that mirrors a real space to be afforded. Here, server 12 can back the user's preferences out of the preferred affordance configuration and use those preferences to generate a configuration that is similar to the preferred configuration, albeit changed minimally to fit within the rectangular space.

Where the fitting feature is employed, in at least some cases configuration aspects that change appreciably when fitting an original configuration into a different space may be determined by the server 12 and indicated to the user. For instance, if a number of workstations has to be reduced from 80 to 60 when fitting an original configuration designed for the default square space into a later defined rectangular space, server 12 may provide a notice that 20 stations had to be eliminated due to space constraints. Similarly, experiential characteristics that change appreciably when fitting one configuration into a subsequently defined space may be indicated to the user. For instance, where an overall personal privacy characteristic changes from an 8/10 value to a 4/10 value, that change may be indicated to the user for consideration.

In many cases a customer may have many different business facilities at various locations and the customer may want to have a same look and feel in at least a sub-set of their facility spaces as a sort of branding tool. In at least some cases it is contemplated that affordance, configuration typical and attribute preferences in one space may be received by server 12 along with data defining a virtual space layout corresponding to a second real world facility and the server will be able to generate affordance configurations for the second space that to, in effect, smear the look and feel of the first space into the second space. In this case, using pre-defined preferences from the first space to generate a VW representation of the second space can expedite the process of developing the affordance configuration for the second space.

In at least some embodiments it is contemplated that a user may be able to view a VW representation of affordance configurations in an associated real world space to get a sense of how affordances would change the real world space if installed. To this end, see FIG. 47 where a portable tablet computing device 1020*b* is being held up in a real world space 1100 that includes fixed walls, windows (e.g., 1102) and other fixtures. As shown, a VW representation is being provided by tablet 1020*b* at 1110 to show a virtual affordance configuration that has been developed for the real world space. In this case, it is contemplated that a server at the real world location and linked to access points 32 therein can use a triangulation method as well as tablet sensors (e.g., accelerometers, gyroscopes, etc.) to determine the exact location and juxtaposition or orientation of tablet 1020*b* in space 1100 and can present a view into the VW at 1110 that is aligned with the real world 1100. Thus, a user can use tablet 1020*b* in her real world space in at least some cases to see how affordances will appear within that space once installed.

Figure 47:
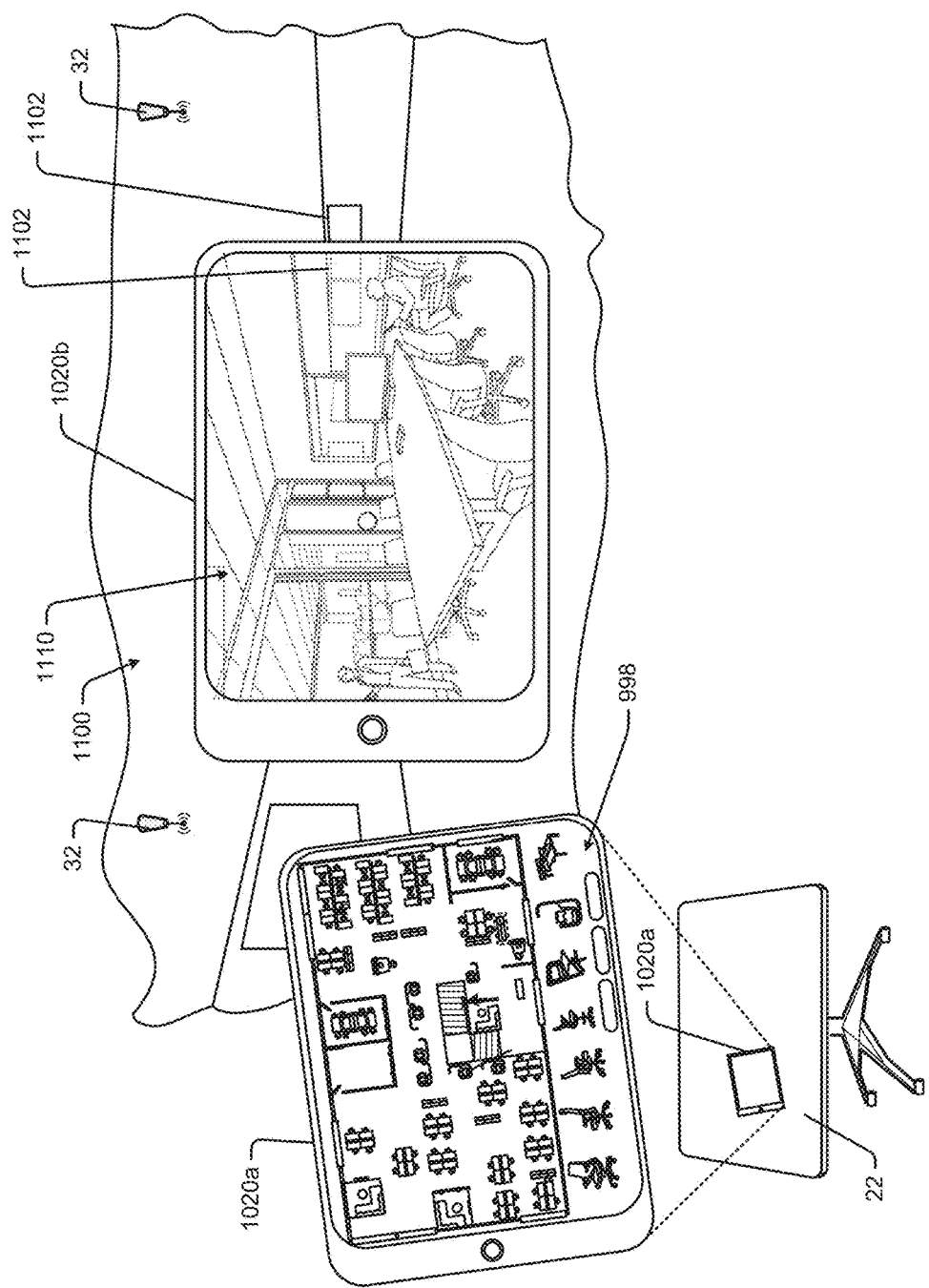
FIG. 47 is a perspective view of a portable tablet device being used to view a VW representation within a real world space associated with the VW where the representation on the tablet is aligned with the real world representation

Referring still to FIG. 47, in at least some embodiments the interface presented by the portable tablet device may change automatically between the 3D VW representation shown at 1110 and a 2D top plan view representation as shown at 998 on device 1020*a* based on portable device orientation. For instance, where tablet 1020*a* is horizontally oriented as indicated by placement on the table top surface 22, a gyroscope or other sensor in the tablet 1020*a* may detect orientation and may automatically present a 2D representation 998 for editing the VW configuration as shown in greater detail in FIG. 41. If a user picks up the tablet and holds the tablet up in space as shown at 1020*b*, the 3D VW representation as shown at 1110 may be automatically presented.

In FIG. 47 representation 1110 may be completely virtual. In other cases where tablet 1020*b* includes a camera, representation 1110 may present an image of the real world in real time on the tablet display screen and may overlay the VW affordance representations to create an augmented reality view of the affordance configuration in the real world video.

In at least some cases in FIG. 47, as the user moved about within the real world or changes tablet orientation therein, the VW representation at 1110 would change to remain aligned with the real world fixtures and space generally.

Referring yet again to FIG. 47, as in other systems described above, it is contemplated that a user may be able to switch back and forth between the 2D top plan view for editing the VW configuration and the 3D VW representation on the tablet surface when the tablet is moved from horizontal to vertical orientation. The 2D to 3D switch may also occur as a function of the user selecting one or the other option in a more affirmative way. In addition, in some cases a user may be able to use interface tools on the 3D tablet view to modify the VW configuration. For instance, a user may be able to swap out a second task chair option for a first option and see that effect ripple through the VW represen-tation. Again, any VW modification that results in a configuration that does not meet user specified objectives (e.g., the cost exceeds a maximum value, the "greenness" of the configuration dips below some desired measure, etc.), the system may indicate the failure to meet the objective.

Within the space design industry there are many rules of thumb regarding affordance configurations such as typical table top heights, typical spaces required between affordances (e.g., the distance between a desk and a rear credenza should be at least a minimum threshold value), widths of high volume travel paths through a configuration, maximum acceptable noise levels, etc. As described above, these rules of thumb can be used by a system server to generate exemplary VW representations or configurations for a user to experience. In some cases it is contemplated that where a user either manually specifies a VW configuration or modifies an exemplary VW configuration generated by the system server, the server may be programmed to enforce the rules of thumb and simply not let a user specify arrangements that would be invalid in light of the rules. Here, in at least some cases design options that are inconsistent with one or more rules of thumb may simply not be offered to a user during the manual specification or modification process. For instance, where a first affordance cannot be used with a second affordance that has already been specified, the server may not offer the first affordance as a selectable option.

In other cases the server may use the rules of thumb to generate warnings for a user whenever a rule is broken by a design selection but may allow a user to make any modifications that the user wants even if they are not valid under the rules. Here, for instance, even if a second affordance cannot be used with a first affordance, the server may present the second affordance as a selectable option despite the first affordance already existing in a VW representation. When the second affordance is selected in this example, the server may present a warning about the incompatibility of the second affordance with the first and allow the user to override the warning.

In still other cases it is contemplated that all options to modify a VW may be presented to a user, albeit where options that are invalid in light of rules of thumb are somehow distinguished for the user. For instance, in some cases options may be presented in a dual list format including valid options and invalid options given a current VW configuration. In other cases invalid options may be visually distinguished in some fashion such as, for instance, being uniquely highlighted, grayed out, etc. Here, while the options may be presented, invalid options that are visually distinguished may not be selectable despite being presented. In this case, the user would not be confused by an option not being offered and instead could surmise that the grayed or distinguished option cannot be selected. Similar customer or user rules may be reflected in options presented to a system user.

Figure 48:
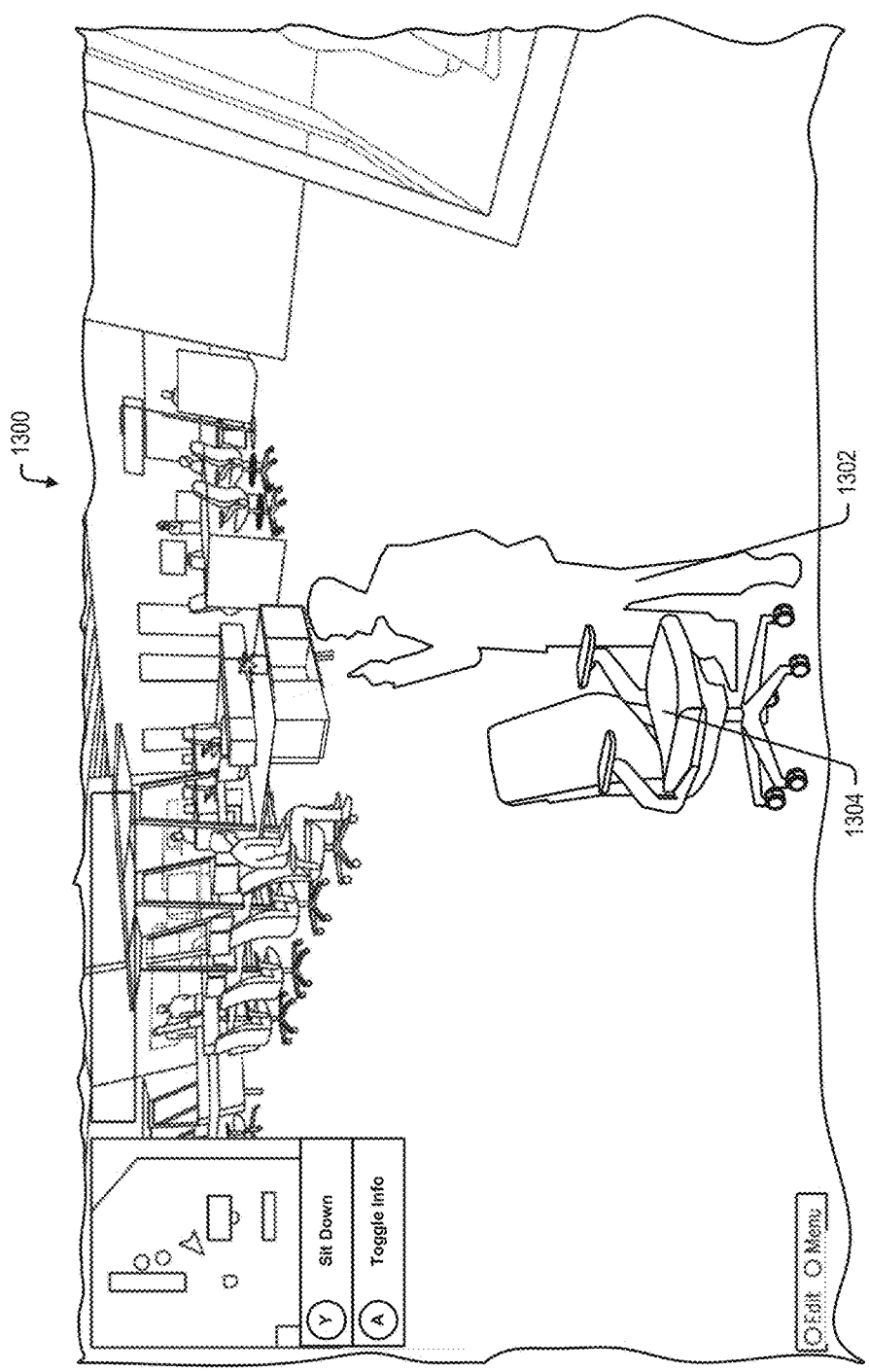
FIG. 48 is a VW view that may be presented via the FIG. 3 system that includes a front facing avatar associated with a remote system user that is experiencing the VW along with a local user.

Referring yet again to FIG. 47, while a sales representative or a second user may be able to experience a VW simultaneously with a user by presenting the representative or second user on a side surface as at 1083, in other cases it is contemplated that a sales representative or second user avatar may be provided within the VW representation to represent the sales representative's presence. To this end, see, for instance, FIG. 48 that shows an exemplary sales representative's avatar at 1302 in a VW representation 1300 that may be presented via the station of FIG. 3, a tablet device as in FIG. 47, or via some other interface device. Here, the avatar 1302 may have an appearance that mirrors the appearance of an associated sales representative. For instance, the avatar's face may have the appearance of the associated representative, the body style may be similar to the body style of the representative, etc.

In some cases the avatar may perform natural movements that mimic a person's movements as the VW view is changed to simulate walking or otherwise moving through the VW space. For instance, assume that a sales representative at a first station (e.g., see 14*a* in FIG. 46) uses and interface device to change position in the VW representation that is presented at that station. In that case, the FIG. 48 avatar 1302 may turn around from the position shown (e.g., the position facing the user at a second station 14*b* in FIG. 46) in FIG. 47 and "walk" through the VW representation to the target location under control of the user interface device so that the rear side of the avatar is facing the user as in FIG. 49 while walking. Whenever the user stops moving the avatar, the avatar may again turn around (see again FIG. 48) to face the user at the second station 14*b* to simulate face to face communication. Thus, each time the system sales representative moves within the VW, the avatar would simulate that movement and each time the representative stops at a location in the VW, the avatar would automatically turn around and face the user at the second station.

In at least some cases it is contemplated that either of first and second users that are experiencing a VW simultaneously may move within a 3D VW dataset to a different location or orientation and that the other of the first and second users may be dragged along. Here, there may be some rules on who can control movement at any specific time so that both users do not try to move and drag the other user along at the same time. For instance, control may be egalitarian in that either user may be able to move within the VW representation as long as the other user is not currently moving within the VW. In this example, in at least some cases whenever neither user is moving and dragging the other user along in space, both avatars may face the other user so that communication feels like it is face to face. If the first user starts to move in the VW representation, the first user leading the movement would move out in front of the second user's avatar so that the second user's avatar would be behind the first user's location in the VW and therefore would not be seen during movement. Here, the second user being behind the first in the VW would again see a rear view of the first user's avatar. Then, when the first user stops at a target VW location, the first user's avatar would turn around in the VW and face the second user's location so that the second user has a front view of the first user's avatar. Similarly, because the first user rotates around to face the second user's VW location when the first user stops, the first user would have a front view of the second user's avatar.

Similarly, assuming the first user is not currently moving in the VW dataset, if the second user starts to move in the VW representation, the second user leading the movement would move out in front of the first user's avatar so that the first user's avatar would be behind the second user's location in the VW and therefore would not be seen during movement. Here, the first user being behind the second in the VW would again see a rear view of the second user's avatar. Then, when the second user stops at a target VW location, the second user's avatar would turn around in the VW and face the first user's location so that the first user has a front view of the second user's avatar. Similarly, because the second user rotates around to face the first user's VW location when the second user stops, the second user would have a front view of the first user's avatar.

In at least some embodiments, in addition to mimicking movement in the real world, the avatar may be controlled to automatically mimic various activities of a user or sales representative that is associated with the avatar. For instance, referring again to FIG. 46, one or more of the cameras 1070 at station 14*a* may generate user images that can be used to breath life into the avatar 1302 in FIG. 47. For example, at least some of a user's facial expressions may be captured by camera 1070 and used to drive facial expressions of avatar 1302. As another example, where a user lifts her arm and points at a specific location in the VW, the avatar's arm may similarly be lifted and pointed at the same location or affordance in the VW. Many other automated avatar actions may be caused by information sensed by camera 1070 or other system devices.

In at least some cases it is contemplated that where first and second users simultaneously experience a VW at the same time as in the case of a sales representative and a customer, the system may present avatars for each of the first and second users for the other user to see. Thus, for instance, while the sales representative avatar 1302 is presented to a customer (e.g., a second user), an avatar representing the customer would similarly be presented to the sales representative. For instance, in FIG. 46, the first user's avatar may be presented on the central screen at station 14*b* and the second user's avatar may be presented on the central screen at station 14*a*. Here, again, facial expressions, simulated talking, arm movements, etc., may all be shown.

Where first and second users at different interfaces are represented by first and second different avatars on the other user's interfaces, in at least some cases the different interfaces may present different perspective views in the VW representation that are aligned with the positions and orientations of the user's avatars. For instance, referring again to FIG. 48 where an avatar 1302 is shown that corresponds to a user at a different interface or station (e.g., 14*a* in FIG. 46), the VW view presented via the interface employed by the user associated with avatar 1302 may be in the opposite direction of the view presented at 1300 (e.g., a view into the VW that exists behind the user that is observing view 1300). Thus, for instance, the user associated with avatar 1302 may see an avatar associated with a second user and the VW area or configuration that exists virtually behind the second user. In this case, if the user associated with avatar 1302 starts to move to a different VW location, in addition to the avatar 1302 turning away as in the FIG. 49 view 1310 during movement, the VW view of the moving user would rotate about a vertical axis in the VW so that both users have the same view during travel, albeit where the user leading the travel only sees the VW without the avatar associated with the other user (e.g., the avatar associated with the other user is behind the traveling user in the VW) while the user being lead in the VW sees the rear view of the leading user's avatar. Again, upon the leading user stopping in the VW, the leading user's avatar would rotate about and face the user being led, the leading user's view would include the avatar for the user that was lead and the VW view behind the avatar that was being led and that is 180 degrees opposed to the view of the other user.

VW stations may be equipped with various types of sensors for sensing user gestures and for using those gestures to control activities within the VW. In at least some cases it is contemplated that where first and second users use stations that are linked together so that the users can share a common experience in a VW, sensed user activities at a first station may automatically drive a representation of the user at the second station so that communications between the users seem more life like. For instance, where the user at the first station raises his hand, an avatar that represents that user at the second station may automatically be shown to raise the same hand (e.g., left hand raised, left hand raised in the VW). Where a user at the first station points to some affordance in the VW, the avatar may be presented pointing at the same affordance in the VW representation at the second station. Many other gesture simulations are contemplated. Similarly, in at least some cases, sensors may be provided at the second linked station and used to drive an avatar at the first station that represents the user at the second station.

Figure 50:
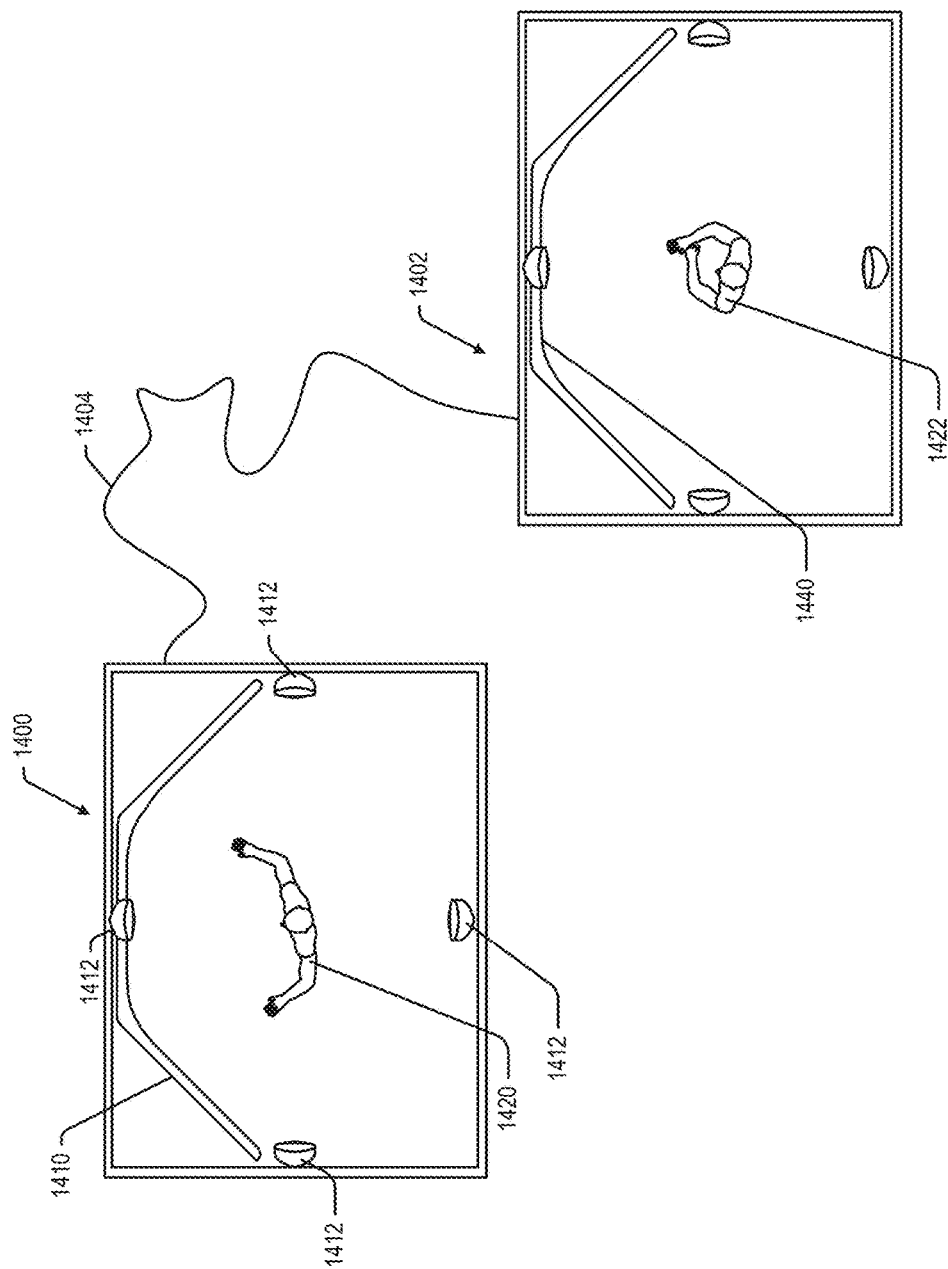
FIG. 50 is a top plan view of two VW stations linked by a network that include gesture sensor subsystems.

Referring to FIG. 50, a system that includes first and second linked VW stations 1400 and 1402 is shown in top plan view where each of the stations is similarly afforded. As shown, station 1400 is linked to station 1402 via a communication network that is represented by link 1404 and a second user 1422 is located at the second station 1402. In the interest of simplifying this explanation, only station 1400 is described in any detail. Station 1400 includes an emissive surface assembly 1410 as well as sensor devices 1412 arranged about a user space or station location. Emissive surface 1410 includes a curved surface structure having three planar portions and curved sections between each two adjacent portions so that a continuous emissive surface is presented to the user 1420 at the station location. The sensors 1412 are only exemplary and are representative of sensors generally for sensing user movements or gestures within the station 1400. For instance, sensors 1412 may include a plurality of camera devices (e.g., Kinect cameras from Microsoft) that collect images useable by a system server to discern hand, arm, head, leg, etc., gestures within the station. In at least some cases the camera images will be sufficiently detailed that facial expressions of a user at the station can be identified.

Figure 51:
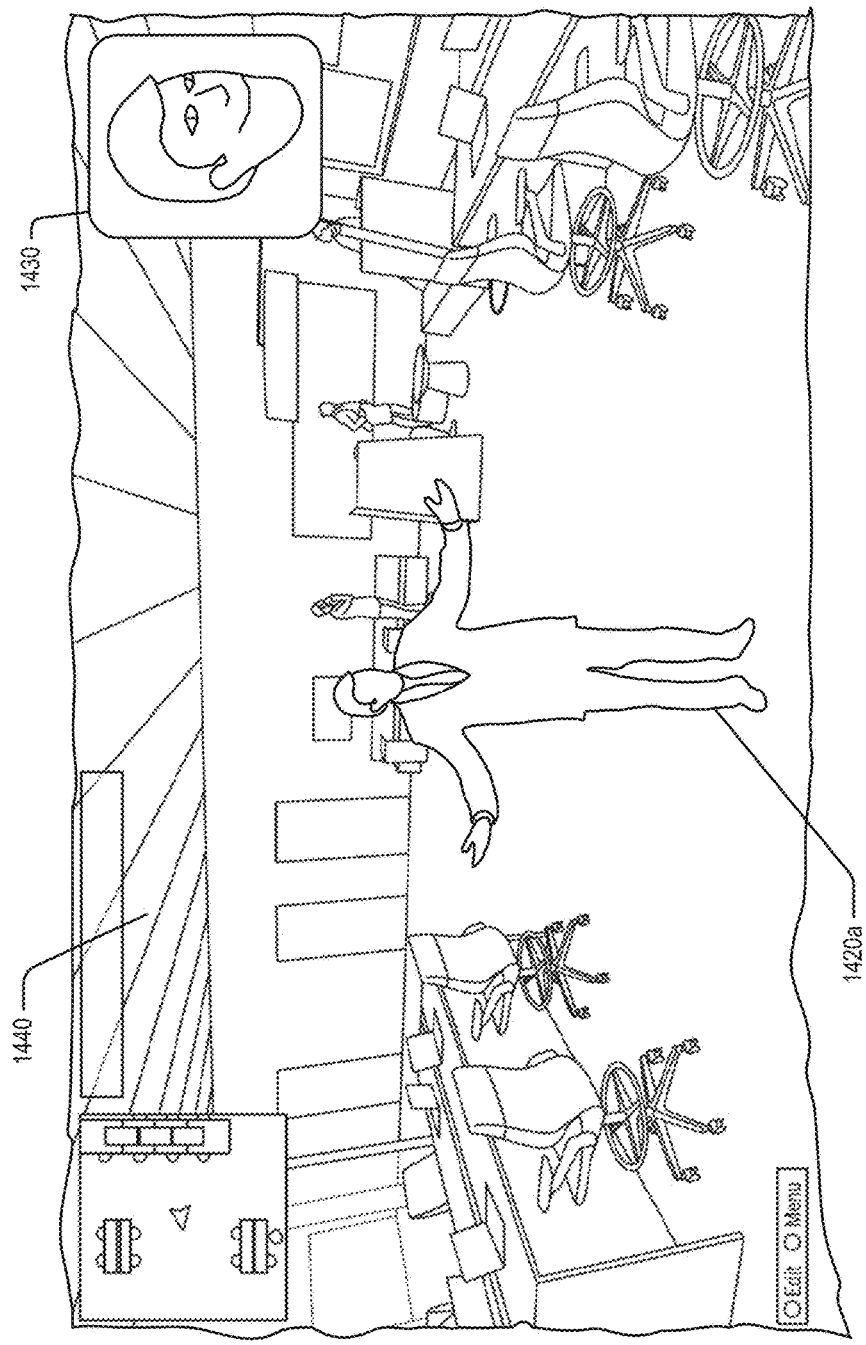
FIG. 51 is a VW view of one of the system users at one of the stations in FIG. 50 that may be presented to the user at the other linked station where an avatar shows at least a subset of user gestures performed by the user at the one station.

Referring still to FIG. 50 and now also to FIG. 51, an avatar 1420*a* that is driven by user 1420 gestures at station 1400 is shown within a VW representation at station 1402 on emissive surface 1440. Here, the avatar 1420*a* may be a virtual representation that mirrors or attempts to replicate the actual user 1420 at station 1400 including simulating user 1420 gestures and, in at least some cases, even sensed facial expressions. Thus, for instance as seen in FIG. 50, when user 1420 raises his arms, the avatar 1420*a* may simultaneously be shown raising arms on surface 1440. If user 1420 smiles at station 1400, the avatar 1420*a* may also be shown to smile on surface 1440.

In at least some cases it may be difficult for a second user 1422 at station 1402 to discern facial expressions on an avatar 1420*a* that is fit into the VW. In some cases a separate image of the first user's upper torso or head may be presented as at 1430 where user expressions can be better identified by the second user. Here, while the avatar 1420*a* may be virtual, the image presented at 1430 may be an actual live video of the first user's torso or head so that expressions are real and not simply simulated.

In some embodiments a subset of characteristics or movements of avatar 1420*a* may simulate similar movements by a first station 1400 user while others are driven by first station user input. For instance referring again to FIGS. 50 and 51, camera images from cameras 1412 may be used to drive head, arm and hand movements of avatar 1420*a* while user leg movements are not used to drive the avatar's legs. Instead, other user input such as via a controller or the like may be used to change avatar and user location within the VW. In some cases only certain user movements or gestures may be used to drive the avatar while other gestures or movements are not reflected in avatar movements or cause the avatar to move in some other way that is different than the sensed user movement. For instance, where a user moves his arm upward to point at an affordance in the VW, the avatar's arm may raise to point at the affordance in a similar fashion. However, if the user picks up a tablet device at a station to use that tablet device to change location within the VW, the server may be programmed to simply park the avatar's arms at its side and not to show the movements associated with picking up the tablet. Similarly, where a user uses the tablet to change the VW location, the avatar may simulate walking through the VW to the new location by turning around in the VW representation and walking along a trajectory that takes the avatar to the new location. Thus, here, the avatar's legs would simulate a walking action despite the fact that the user being simulated in not walking in the real world. Thus, again, some user actions or gestures may be mimicked by the avatar while others are either ignored or are represented by the avatar performing some other activity or action to simulate user intent.

Where two station users are linked together, various operating modes are contemplated. For instance in a delinked mode, each station user may be able to move about within the VW representation independent of the other user just like in the real world. Here, the first and second users may head off in different directions to experience different VW locations and local affordance sets. In some cases when two users are in different locations in the VW, their ability to audibly communicate may be affected by their virtual separation in the VW. Thus, for instance, where users are on different sides of a large office space, they may not be able to hear each other talking but if they are at the same location, clear audio communication may occur over microphones and speakers at the stations.

In the delinked mode, optionally, either user may find or follow the other user within the VW representation so that each has a similar view or so that both users are generally at the same location or in the same area of the VW representation simultaneously. When proximate each other, either user may be able to turn within the VW representation to face the other user's location at which point a view of the other user would be presented. Here, if the other user is facing the turned user, each user would have a front facing view of the other.

In this delinked mode, in at least some cases either user may be able to control or modify the VW representation and the other user may experience the modification. For instance, either of first and second linked users may be able to change the time of day presented in the VW causing the amount of avatar activity within each of the first and second stations to change (e.g., more busy at noon than at 5 AM). As another instance, each of the first and second users may be able to change task seat covering material and both users may see the change ripple through their VW views simultaneously.

In other delinked mode cases, while each of first and second users may be able to control or modify a VW representation, the modifications may be personal to the specific user and not, at least initially, shared with the other of the users. For instance, where first and second users are in linked VWs that are initially identical, if the first user changes task seat material covers to a different color, the change may only initially appear in the VW representation presented to the first user and not in the second user's view. Here, the first user may continue to make VW changes without affecting the second user's view even though the first and second VW stations used by the first and second users are linked. Similarly, the second user may make changes to the second user's VW representation without making those changes to the first user's VW view. These changes may be made even if the first and second users have views of each other within the VW. Here, where changes have been made to one user's view and not the second user's view, there should be some indication via the user's stations that there is at least some difference between the VW representations they are viewing.

If one of the users wants to share their VW representation with the other, an interface icon or the like may allow sharing to occur. Here, after sharing, each VW representation may revert back to the prior representation so that a shared representation is not reversible. This feature which allows users in the same VW space to independently change features and aspects of the VW without affecting the other user's view until desired, allows users in the same VW space to experiment with different options and design considerations privately until some new insight develops and then to share that insight with the other user when appropriate.

A second mode contemplated is a single leader mode where a first of two users controls the view of both the first and second users. In this case, whenever the first user moves or turns in the VW, the second user view would mirror the view of the first user so that each user has the exact same VW view all the time. Here, in at least some cases no avatar representation would be provided. Here, the second user has no ability to control movement or rotation in the VW and instead only the first user controls movement and rotation. Similarly, here, in at least some cases only the first user is able to change the VW representation by changing affordances, affordance attributes (e.g., materials, options, etc.) fixtures, operating characteristics (e.g., time of day, weather outside, etc.) and the second user simply experiences the changes.

A third mode is a single leader avatar mode, in this mode, the second leader again controls views by both the first and second users but the first and second user views are different. To this end, the single leader avatar mode is similar to the mode described above with respect to FIGS. 48 and 49 where the leading user's avatar is always located in front of the other user and the avatar either faces the other user when the two users are stationary in the VW or faces away from the other user when the leading user is moving through the VW and the other user is being dragged along.

A fourth mode is an egalitarian mode wherein either user can lead the other user within a VW representation and there is no avatar present. Here, whenever a second user is not leading, a first linked user may lead and whenever the first user is not leading, the second user may lead. In this mode, the views of the first and second leaders are always identical as the non-leading user always follows the leading user.

A fifth mode is an egalitarian avatar mode. This mode is similar to the fourth mode except that avatars are presented in user views at least some of the time. For instance, when the users are not moving in the VW, first and second avatars may face the second and first users to simulate a face to face conversation. Then when either one of the users leads, the avatar associated with the leading user may turn and face the direction of travel in the VW so that the other avatar is behind the leading avatar in the VW. Here, because the following avatar is behind the leading avatar, the view of the user associated with the leading avatar would not have a view of the following avatar while traveling but the view of the user associated with the following avatar would have a rear view of the leading avatar. In this case either of the first or second users cold lead in an egalitarian fashion (e.g., when one user is not leading, the other user may lead.

A sixth mode is a preferred user mode. In this mode it is contemplated that there may be one user that can always assume leadership in the VW regardless of whether or not a second ort another user is currently leading. Thus for instance if a second user is currently leading a first user about within the VW, the first and preferred user may be able to take the lead in the VW and, in effect, drag the second user about within the VW representation. Here, there may be versions that include user avatars and other versions that do not include user avatars.

The disclosure describes particular embodiments, but one of skill in the art will appreciate that various modifications can be made without departing from the spirit of the disclosure. Thus, the invention is to cover all modifications, equivalents, and alternatives falling within the spirit and scope of the invention as defined by the following appended claims. For example, although the system is described above for use as furniture in an office environment, in some applications, the furniture can be used in medical applications, such as, for example, a table carrying surgical tools, a bed sensing and altering patient characteristics, and the like, or in a home environment, such as a sofa, a bed, a table, and the like. The furniture can also be used in waiting rooms, cafeterias, show rooms, classrooms, and various other locations. As another example, while some embodiments of the VW system will prohibit a user from moving through affordances that are presented in the VW, in other cases the system may include a mode where a user's virtual perspective can move through virtual affordances and/or fixtures located in the virtual workspace. This mode is similar to the "god mode" from the field of video game design. Moreover, in some cases the server can track the identity of users and the role of the users within a particular organization, and can provide information based on the user's interests and role within the VW representation. For example, a human resource individual might receive information that is more tailored to occupational health and safety, whereas a secretary might receive information that is more tailored to features relating to the use of a virtual affordance.

In addition, in some cases it is contemplated that, in addition to presenting a VW representation to a user at a station, server 12 may enable a user to search for stations in the representation characterized by at least a specific experiential characteristic value. For instance, a user may want to see a 2D top plan view map that shows all work stations that have a personal privacy value of 8/10 or greater or a different map that shows all work stations that have a natural light value of 5/10 or lower. Here, an interface may enable a user to specify one or more experiential characteristic threshold values and have server 12 generate and present an associated color coded map akin to the maps shown in FIGS. 26 through 28.

The system may report other metrics as well as those contemplated above. For instance, the system may present metrics related to distance from a natural light window, distance from a nearest restroom, distance to a nearest refreshment alcove, distance to nearest affordance typical such as a large conference space, a dedicated high end telepresence system, a cafeteria, etc.

While the systems described above have been described in the context of flat panel display screens that are spaced from a user, in at least some embodiments it is contemplated that virtual reality goggles or glasses may be worn by a user to provide a similar and, in some cases, even a better 3D VW effect. In these cases, as a user's view into the VW would enable the user to rotate about to see 360 degrees of viewing angle into the VW and to pan up and down to see other perspectives into the VW representation. In at least some cases the user may be able to actually walk about in a real world space and see virtual representations of fixtures, affordances, etc., laid out in that space.

In many cases where a space and affordances therein are to be redesigned, the boundaries associated with the new space fixtures and affordances will be different than those associated with an existing fixture and affordance set in the real world. For instance a real world wall that exists in a space may be removed in the VW representation that reworks the space or a desk or chair in the real world may not exist in a reworked space. Here, it is contemplated that in cases where a user employs VR goggles or glasses to visually observe a VW representation, as the user walks through the real world, the VW representation may be augmented with information about boundaries that exist in the real world even if they are not present in the VW. For instance, where a real world wall does not exist in a VW representation, the goggles may present the real world in phantom lines in the VW representation so that the user can perceive where the wall exists and can avoid walking into the wall while travelling in the VW. In some cases goggles may be fitted out with haptic feedback (e.g., a vibrator or other type device) to provide other feedback to a user as they approach a fixture or affordance in the real world.

In still other cases it is contemplated that when a user wearing VR goggles to see a VW representation is free to move about within an existing real world space, the VW representation may only be presented to the user when the user is substantially still in the real world and may be replaced by a view of the real world automatically when the user starts to move in the real world. Her, any type of sensor may be used to assess when the goggles and hence user are moving in the real world and to trigger presentation of the real world view. When the user stops moving in the real world, the VW representation may gain be automatically presented for the user to see. In some cases the virtual to real world change may only occur when the user is near real world fixtures or affordances which may be identified by cameras or other sensors on the goggles themselves, that are mounted within a real world space, etc.

U.S. provisional patent application Ser. No. 62/270,898 which is titled "Virtual World Method And System For Affecting Mind State" which was filed on Dec. 22, 2015 and which is commonly owned with the present application describes various aspects of a VW environment, many of which may be used to enhance the systems and methods described above and is incorporated herein in its entirety by reference and any combination of components or features from that specification may be included within the systems described above to yield other useful embodiments.

To apprise the public of the scope of this invention, the following claims are made:

We claim:

1. A system for generating a virtual world (VW) representation of an office space affordance configuration, the system comprising:
    (i) a database comprising:
        a plurality of affordance models, each affordance model including a 3D dataset that represents an instance of the associated model;
        at least a first virtual space representation, the first virtual space representation including fixtures arranged to mimic at least one real world space layout;
        at least a first affordance specification that includes a list of affordance types and, for each type, includes a list of instances of the affordance type in a VW representation, for each instance, indicates the location in and orientation of the at least a first virtual space representation at which the instance is located and the orientation of the instance;
        an ambient environment database that models at least one non-appearance experiential aspect of a VW representation;
    (ii) an interface including at least a first emissive display surface and an input device;
    (iii) an input device for providing input to the system;
    (iii) a processor linked to the database, the input device and the interface, the processor programmed to perform the steps of:
        (a) using the first virtual space representation, affordance specification and affordance models to generate a three dimensional VW dataset;
        (b) for a specific location within the three dimensional dataset, using the ambient environment database to model the at least one non-appearance aspect of the VW representation at at least a first location within the three dimensional dataset;
        (c) presenting a VW view into the VW dataset at the at least a first location and along a first trajectory via the at least a first emissive surface; and
        (d) presenting at least some indication of the non-appearance aspect to a user using the interface.

2. The system of claim 1 wherein the non-visual experiential characteristic includes an indication of the amount of personal visual privacy at the user's current VW location.

3. The system of claim 1 wherein the interface includes at least first, second and third large flat panel display screens arranged at a VW station and wherein the processor presents a different view into the three dimensional VW representation on each of the three emissive surfaces.

4. The system of claim 3 wherein the VW station includes a user location at which a user is located while using the station and wherein the three different views presented on the three different surfaces is aligned with a perspective at the user location at the station.

5. The system of claim 4 wherein the three surfaces include a central surface and first and second lateral surfaces that are located on either side of the central surface, each lateral surface arranged to form an obtuse angle with respect to the central surface and to generally face the user location at the station.

6. The system of claim 1 wherein the processor is further programmed to receive movement commands from the input device selecting a different view into the VW dataset, in response to the movement commands, the processor presenting a different VW view via the emissive surface and using the ambient environment database to model the at least one non-appearance aspect of the VW representation corresponding to the new VW view and presenting at least some indication of the non-appearance aspect to a user using the interface.

7. The system of claim 1 wherein the non-visual experiential characteristic includes an indication of an amount of noise experienced within the VW representation at the user's current VW location.

8. The system of claim 1 wherein the indication of the non-visual experiential characteristic includes a dashboard indicating a plurality of different non-visual experiential characteristics at the user's current VW location.

9. The system of claim 8 wherein the values indicating the plurality of different non-visual experiential characteristics change as the user moves about from one location to another within the VW representation.

10. The system of claim 1 wherein the at least one non-appearance experiential characteristic includes sound and wherein the system further includes at least one speaker, the step of presenting at least some indication of the non-appearance aspect includes presenting sound via the at least one speaker for the user to experience.

11. The system of claim 1 wherein the at least one non-appearance experiential characteristic changes as a function of a time of day associated with the VW representation and wherein the interface enables a user to change the time of day associated with the VW representation.

12. The system of claim 1 wherein the at least one non-appearance experiential characteristic changes as a function of a time of year associated with the VW representation and wherein the interface enables a user to change the time of year associated with the VW representation.

13. The system of claim 1 wherein the non-appearance experiential characteristic is different at different locations within the VW representation and wherein the processor visually indicates different zones within the VW representation to indicate different values for the non-appearance experiential characteristic.

14. The system of claim 13 wherein the VW representation includes a floor representation and wherein the processor visually indicates different zones by visually distinguishing boundaries between adjacent zones on the floor representation.

15. The system of claim 1 wherein the emissive surface is presented in a set of virtual reality goggles.

16. The system of claim 1 wherein the processor is further programmed to perform the steps of, receiving changes to the affordance configuration in the VW representation via the interface, changing the VW representation to reflect the received changes, remodeling the at least one non-visual experiential characteristic and representing at least some indication of the re-modeled non-visual experiential characteristic to the system user.

17. The system of claim 16 wherein the changes to the affordance configuration includes globally swapping a first affordance type for a second affordance type that appears within the VW representation.

18. The system of claim 1 wherein the interface enables a user to indicate a desired value for at least a first non-visual experiential characteristic and wherein the processor is programmed to present at least one suggested change to the VW representation that is consistent with the desired value.

19. A system for representing non-visual experiential characteristics associated with a VW representation, the system comprising:
at least a first emissive surface;
a user interface;
a processor linked to the emissive surface and the interface and programmed to perform the steps of:
presenting a VW representation via the at least a first emissive surface, the VW representation including an affordance configuration;
modeling a non-appearance experiential characteristic associated with a VW corresponding to the VW representation;
visually indicating the non-appearance experiential characteristic within the VW representation so that a user can perceive the non-appearance experiential characteristic along with a visual presentation of the VW;
enabling a user to specify a desired value for at least a first non-appearance experiential characteristic; and
presenting at least a first suggested modification to the VW representation that is consistent with the non-appearance experiential characteristic.

20. The system of claim 19 wherein the step of visually indicating includes presenting a dashboard on the at least a first emissive surface that visually indicates the non-appearance experiential characteristic and wherein the non-appearance experiential characteristic changes as a location within the VW representation is changed via the user interface.

21. A method for use with an emissive surface and a user interface, the method for representing non-visual experiential characteristics associated with a VW representation, the method comprising the steps of:
providing a processor linked to the emissive surface and the interface and using the processor to perform the steps of:
presenting a VW representation via the at least a first emissive surface, the VW representation including an affordance configuration;
modeling a non-appearance experiential characteristic associated with a VW corresponding to the VW representation;
visually indicating the non-appearance experiential characteristic within the VW representation so that a user can perceive the non-appearance experiential characteristic along with a visual presentation of the VW;
enabling a user to specify a desired value for at least a first non-appearance experiential characteristic; and
presenting at least a first suggested modification to the VW representation that is consistent with the non-appearance experiential characteristic.

* * * * *